(12) United States Patent
Abedini et al.

(10) Patent No.: US 11,533,679 B2
(45) Date of Patent: Dec. 20, 2022

(54) ASSISTING NODE DISCOVERY AND OPERATION IN A WIRELESS COMMUNICATION NETWORK

(71) Applicant: QUALCOMM Incorporated, San Diego, CA (US)

(72) Inventors: Navid Abedini, Basking Ridge, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/191,595

(22) Filed: Mar. 3, 2021

(65) Prior Publication Data
US 2022/0286946 A1  Sep. 8, 2022

(51) Int. Cl.
| | |
|---|---|
| *H04W 48/16* | (2009.01) |
| *H04L 5/00* | (2006.01) |
| *H04W 72/04* | (2009.01) |
| *H04L 5/14* | (2006.01) |
| *H04W 74/08* | (2009.01) |
| *H04W 48/20* | (2009.01) |

(52) U.S. Cl.
CPC .......... *H04W 48/16* (2013.01); *H04L 5/0048* (2013.01); *H04L 5/14* (2013.01); *H04W 48/20* (2013.01); *H04W 72/04* (2013.01); *H04W 74/0833* (2013.01)

(58) Field of Classification Search
CPC .... H04L 5/001; H04W 8/005; H04W 40/244; H04W 40/246
See application file for complete search history.

(56) References Cited

U.S. PATENT DOCUMENTS

| | | | |
|---|---|---|---|
| 9,986,442 B2 * | 5/2018 | Redana | ................. H04W 48/08 |
| 2016/0286471 A1 | 9/2016 | Zisimopoulos et al. | |
| 2017/0142653 A1 | 5/2017 | Qi et al. | |
| 2021/0036762 A1 | 2/2021 | Abedini et al. | |

FOREIGN PATENT DOCUMENTS

WO   WO-2022047654   *  3/2022

OTHER PUBLICATIONS

International Search Report and Written Opinion—PCT/US2022/015351—ISA/EPO—dated May 11, 2022.

* cited by examiner

*Primary Examiner* — Kevin Kim
(74) *Attorney, Agent, or Firm* — Loza & Loza, LLP/Qualcomm Incorporated

(57) ABSTRACT

A network node (e.g., base station, user equipment (UE)) in a wireless communication network may not be aware of the presence and/or availability of assisting nodes deployed in a wireless communication network to assist the network node. The aspects described herein include a method of wireless communication for an apparatus (e.g., an assisting node). The apparatus transmits an availability signal to enable discovery of the apparatus and indicate an availability of the apparatus to assist at least one network node. The availability signal includes an identifier of the apparatus. The apparatus relays at least one wireless communication between the at least one network node and a network entity.

27 Claims, 33 Drawing Sheets

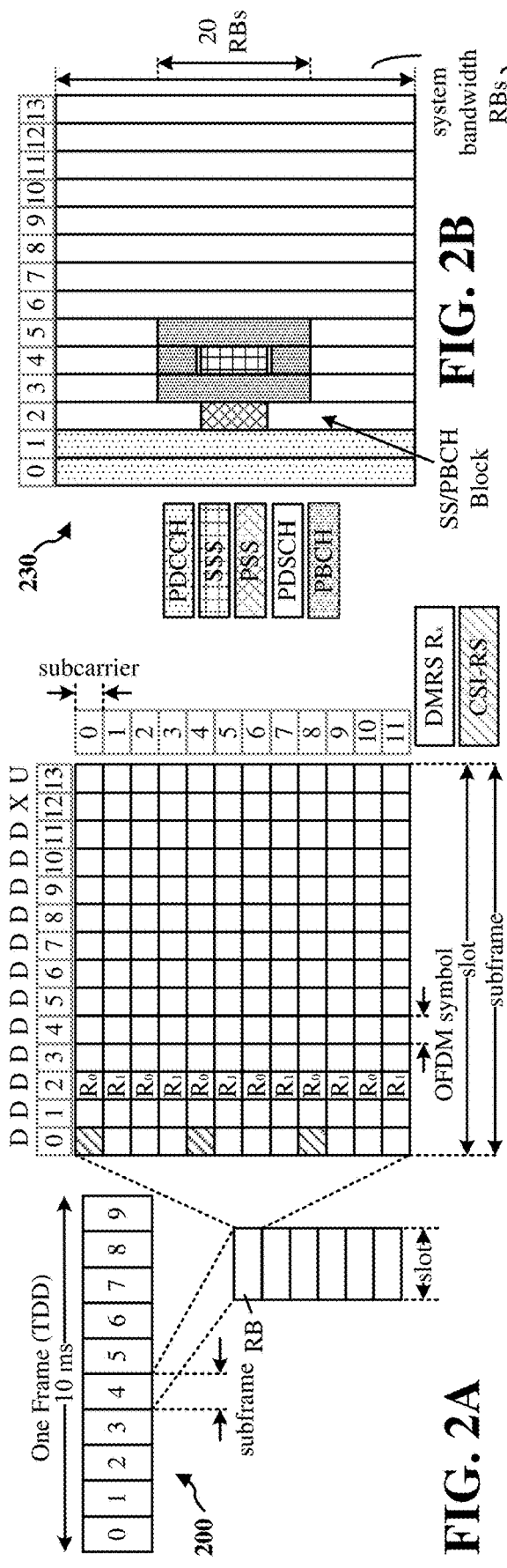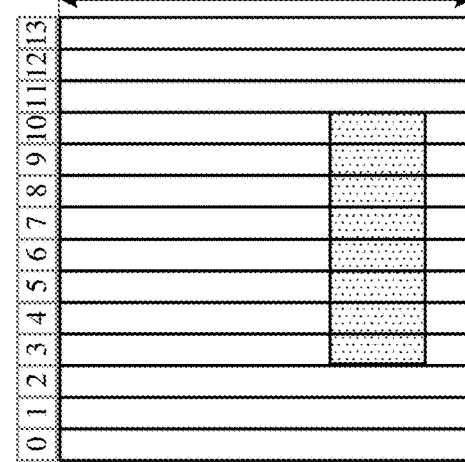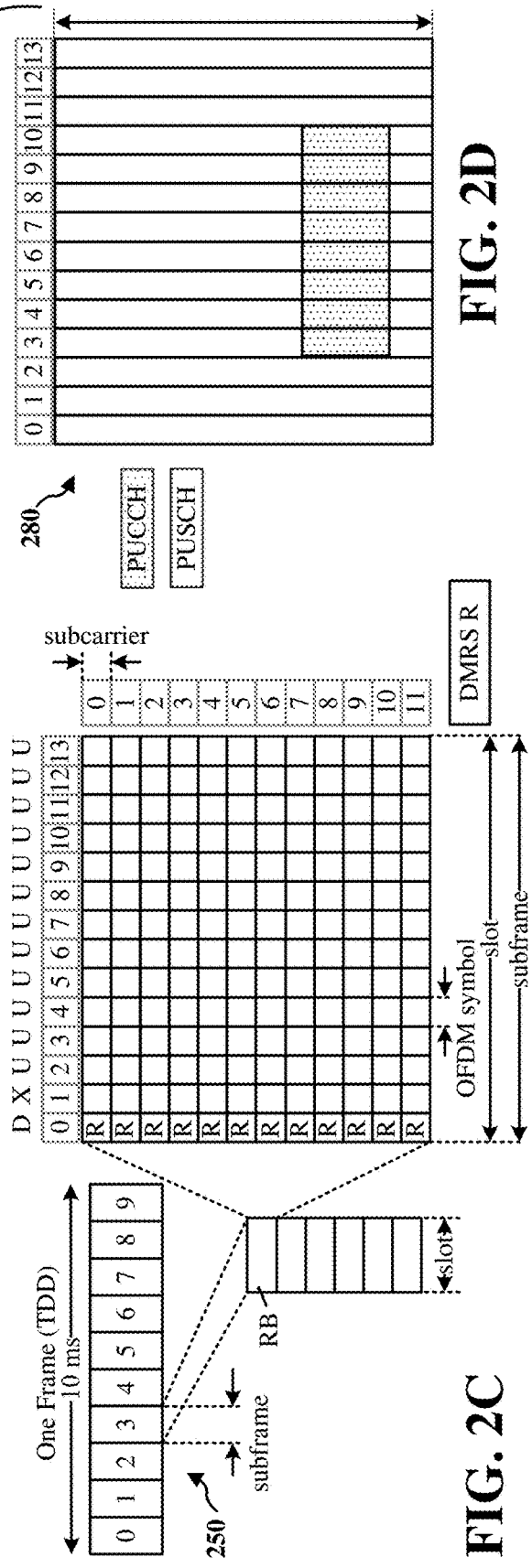
FIG. 2A  FIG. 2B  FIG. 2C  FIG. 2D

ASSISTING NODE DISCOVERY AND OPERATION IN A WIRELESS COMMUNICATION NETWORK

BACKGROUND

Technical Field

The present disclosure relates generally to communication systems, and more particularly, to assisting node discovery and operation in a wireless communication network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Assisting nodes may be deployed in a wireless communication network to improve the performance of the wireless communication network. For example, an assisting node may relay one or more signals to extend the coverage of one or more network nodes (e.g., base stations) and/or to provide spatial diversity. An assisting node may provide spatial diversity by providing at least a secondary wireless signal path between two network nodes, such as a base station and a UE. These improvements to the wireless communication network may increase the reliability and/or improve the capacity of the wireless communication network.

As the complexity of wireless communication networks continues to increase, the incorporation and use of assisting nodes in a wireless communication network may be difficult for network operators. For example, network nodes (e.g., base stations, user equipments (UEs), may need to be preconfigured with information that indicates the presence and/or availability of assisting nodes, as well as configuration information of the assisting nodes to enable communication with the assisting nodes. Moreover, network nodes may not be aware of dynamic changes as to the presence and/or availability of assisting nodes deployed in a wireless communication network. The aspects described herein may overcome these issues.

In an aspect of the disclosure, a method, a computer-readable medium, and an apparatus are provided. For example, the apparatus may be an assisting node included in a wireless communication network to assist at least one network node. The apparatus transmits an availability signal to enable discovery of the apparatus and indicate an availability of the apparatus to assist the at least one network node, wherein the availability signal includes an identifier of the apparatus. The apparatus relays at least one wireless communication between the at least one network node and a network entity.

In an aspect of the disclosure, a method, a computer-readable medium, and an apparatus are provided. For example, the apparatus may be a network node. The apparatus receives, from an assisting node, an availability signal indicating an availability of the assisting node to assist the network node, wherein the availability signal includes an identifier of the assisting node. The apparatus transmits a signal intended for a network entity toward the assisting node based on the availability of the assisting node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
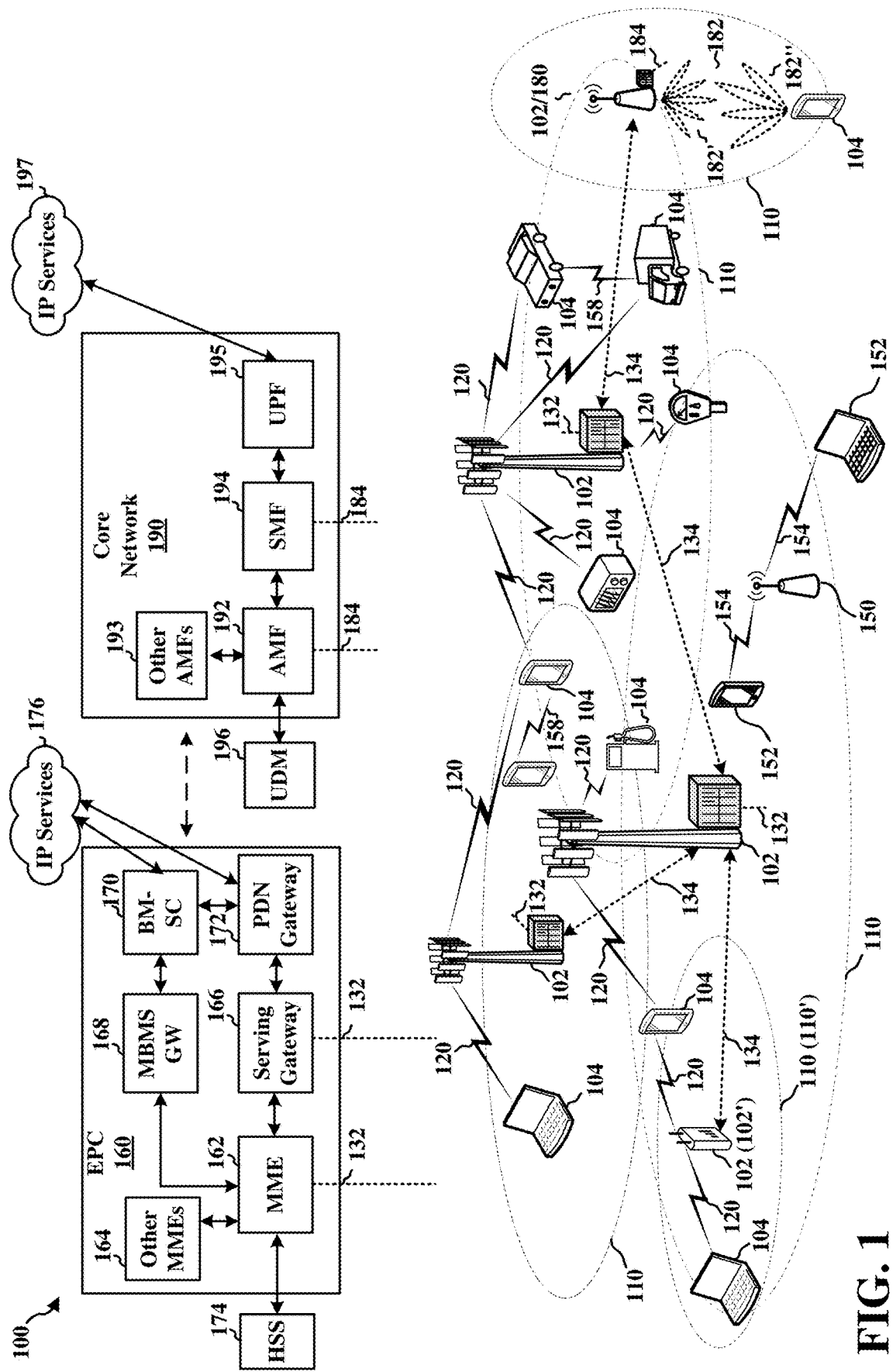
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
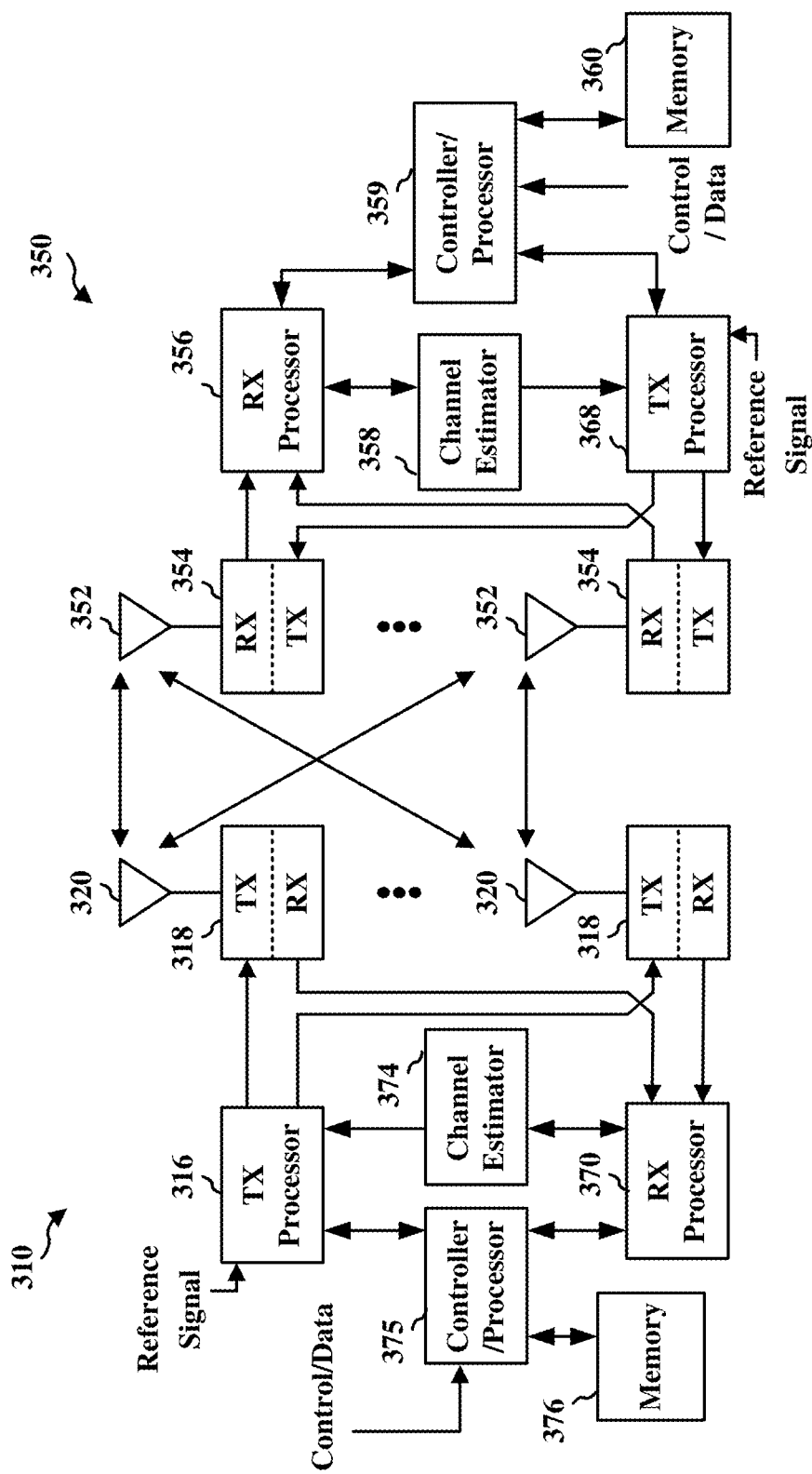
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Assisting nodes may be deployed in a wireless communication network to improve the performance of the wireless communication network. For example, an assisting node may relay one or more signals to extend the coverage of one or more network nodes (e.g., base stations) and/or to provide spatial diversity. An assisting node may provide spatial diversity by providing at least a secondary wireless signal path between two network nodes, such as a base station and a UE. These improvements to the wireless communication network may increase the reliability and/or improve the capacity of the wireless communication network. The term "assisting node" as used herein may refer to a repeater device, a reflector device, or other suitable device deployed in a wireless communication network to assist one or more network nodes. The term "network node" as used herein may refer to a base station (e.g., gNB), a core node (CN), a distributed unit (DU), an integrated access and backhaul node (IAB-node), a side-link UE, or a roadside unit (RSU).

In some examples, an assisting node may be implemented as an intelligent assisting node (also referred to as a smart assisting node) or a non-intelligent assisting node (also referred to as a dumb assisting node). For example, a configuration of an intelligent assisting node may be changed remotely (e.g., dynamically changed after deployment using remote signaling), whereas a configuration of a non-intelligent assisting node may be fixed (e.g., non-configurable) or semi-fixed. A configuration of an assisting node may refer to one or more wireless communication settings. For example, if the assisting node is implemented as a repeater node, the configuration of the assisting node may include one or more wireless communication settings, such as a transmission power, a transmit and/or receive beam configuration, an uplink (UL) and/or downlink (DL) relaying direction, and/or other suitable wireless communication settings for a repeater device. As another example, if the assisting node is implemented as a reflector node, the configuration of the assisting node may include one or more reflecting coefficients, one or more reflecting directions, and/or other suitable wireless communication settings associated with a reflector device.

In some examples, an intelligent assisting node may be implemented as an autonomously intelligent assisting node or a network-controlled intelligent assisting node. An autonomously intelligent assisting node may learn and change its configuration as needed, whereas a network-controlled intelligent assisting node may be controlled by a control node. For example, the network-controlled intelligent assisting node may be in communication with the control node via a control interface, and the control node may remotely control the network-controlled intelligent assisting node. For example, the control node may obtain information from the wireless communication network, determine a proper configuration for the network-controlled intelligent assisting node based on the information, and configure the network-controlled intelligent assisting node according to the determined configuration.

In some examples, if the assisting node is a repeater device (also referred to as a relay node), the assisting node may be capable of receiving a signal from a network node (e.g., a wireless signal transmitted from a base station) and may relay (e.g., forward or re-transmit) the signal in the same form as received. In these examples, the assisting node may perform minimal processing on the signal received from the network node, regenerate the signal, and transmit the signal. Therefore, the assisting node may effectively amplify signals from the network node and enhance the coverage area of the network node.

In some examples, if the assisting node is a reflector device, the assisting node may be capable of relaying a signal from a network node (e.g., a wireless signal transmitted from a base station) by reflecting the signal toward a specific direction. In these examples, the assisting node may not be able to perform any processing on the signal from the network node. Therefore, in these examples, the assisting node may provide spatial diversity to enhance the coverage area of the network node. In some examples, a non-intelligent assisting node implemented as a reflector device may include a metal surface positioned to reflect a signal from a network node back or toward a specific direction. In other examples, an intelligent assisting node may be implemented as a configurable reflector device. In these examples, the configurable reflector device may include a controllable reflecting surface, the position of which may be dynamically changed to reflect a signal from a network node in a desired direction.

Non-intelligent assisting nodes and autonomously intelligent assisting nodes may be deployed in a manner that is transparent to the network nodes in a wireless communication network. In some examples, non-intelligent assisting nodes and autonomously intelligent assisting nodes may be strategically deployed to transparently improve the performance of at least one network node. In one scenario, if a gap in coverage is detected in a part of a wireless communication network (e.g., through measurements), a network operator may deploy an assisting node (e.g., a reflector device or a repeater device) to cover the detected gap. For example, the assisting node may extend the coverage of a network node to cover the detected gap.

In some examples, one or more of the configurations of the non-intelligent assisting nodes and autonomously intelligent assisting nodes may be manually set at the time of deployment to achieve a desired performance. For example, a non-intelligent assisting node or an autonomously intelligent assisting node may be manually configured with the desired beam configurations, power setting, uplink (UL)/downlink (DL) symbol patterns, etc. In some examples, an autonomously intelligent assisting node may not need to be deployed with a proper initial configuration, since the autonomously intelligent assisting node has the ability to learn (e.g., collect and process network information) and reconfigure itself after deployment. For example, an autonomously intelligent assisting node may determine a new transmit or receive beam that may perform better than a current transmit or receive beam, and may monitor and change its beamforming configuration over time to improve performance.

In some examples, a network-controlled intelligent assisting node may be strategically deployed with a proper (e.g., optimal) initial configuration. In other examples, a network-controlled intelligent assisting node may be deployed with an initial configuration that is less than optimal (e.g. in a plug-and-play fashion) with the assumption that the network-controlled intelligent assisting node will be remotely reconfigured after deployment.

In some examples, a control interface may be established between a network-controlled intelligent assisting node and a network node, where the control interface enables the network node to use and/or configure the network-controlled intelligent assisting node. In these examples, the network node may not be aware of the network-controlled intelligent assisting node and/or may not be able to contact the network-controlled intelligent assisting node prior to establishment of the control interface. The network-controlled intelligent assisting node may initiate a procedure for establishing the control interface between the network-controlled intelligent assisting node and the network node.

In some examples, the procedure for establishing the control interface may be similar to an initial network access procedure initiated by a UE (e.g., a random access channel (RACH) procedure) and performed between the UE and a network node.

Network nodes may be provided with some information about available assisting nodes (e.g., assisting nodes in the vicinity of a network node) so that the network nodes may efficiently utilize the assisting nodes. In some examples, the wireless communication network (e.g., a control node, such as CN or CU) may provide this information to the network nodes. In some examples, network nodes may know about the existence and configurations of non-intelligent assisting nodes and autonomously intelligent assisting nodes. For example, a network node may know the forwarding direction and/or the reflecting direction of non-intelligent assisting nodes and autonomously intelligent assisting nodes. In some examples, network nodes may know the configurations and/or capabilities of network-controlled intelligent assisting nodes deployed in a wireless communication network and may determine whether and/or how efficiently to use them.

Figure 4:
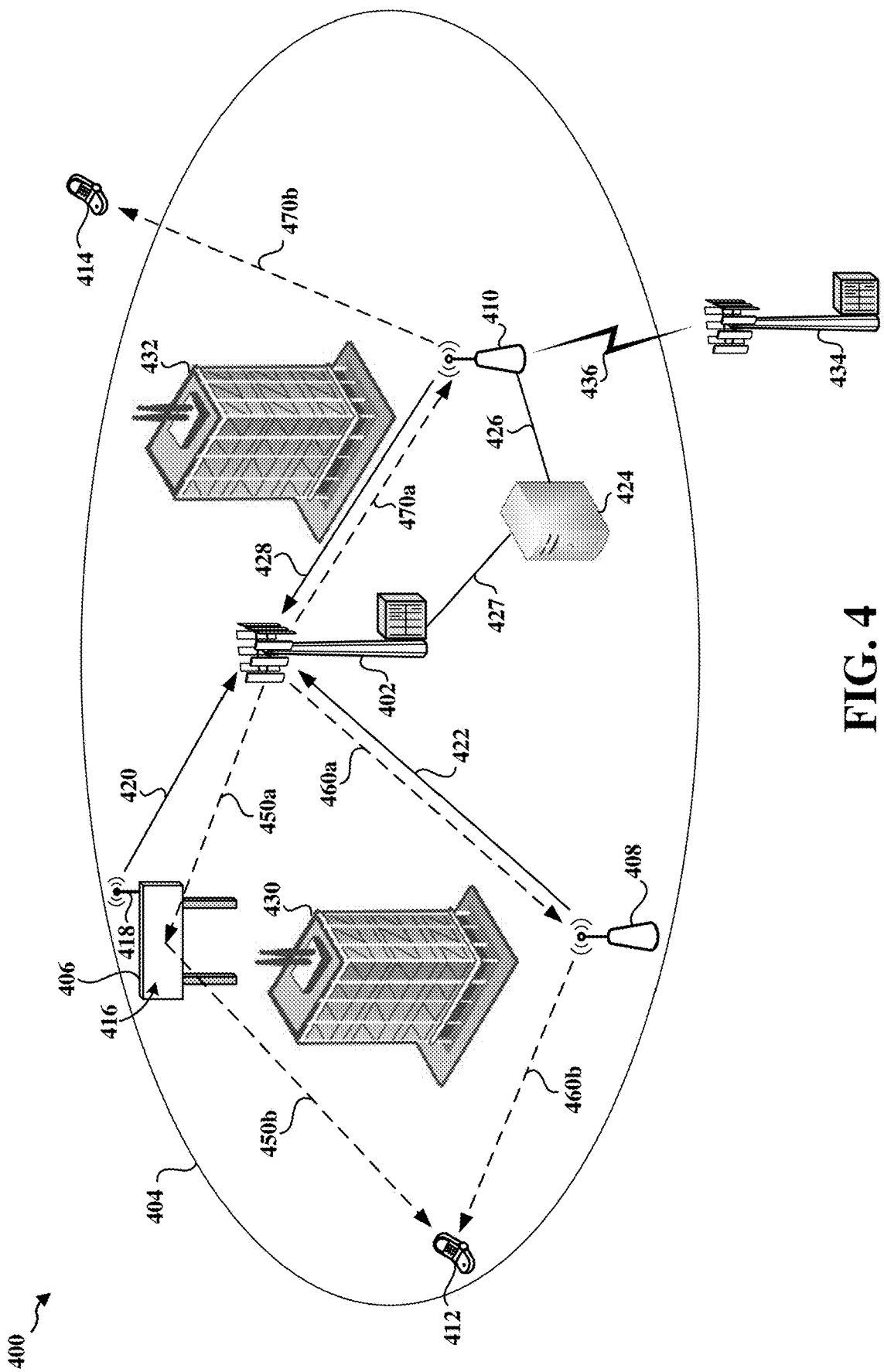
FIG. 4 illustrates a wireless communication network including network nodes and assisting nodes in accordance with various aspects of the disclosure.

FIG. 4 illustrates a wireless communication network 400 including network nodes and assisting nodes in accordance with various aspects of the disclosure. The wireless communication network 400 may include network nodes 402, 434, a first assisting node 406, a second assisting node 408, a third assisting node 410, a first user equipment (UE) 412, and a second user equipment (UE) 414. In some examples, the network node 402 (also referred to as a first network node 402) may be a base station serving a cell 404, and the network node 434 (also referred to as a second network node 434) may be a base station serving a cell different from the cell 404.

The first assisting node 406 may be a non-intelligent assisting node including a reflective surface 416 and a transceiver device 418. The second assisting node 408 may be an autonomously intelligent assisting node and the third assisting node 410 may be a network-controlled intelligent assisting node. The third assisting node 410 may be coupled to a control node 424 via a communication interface 426. The control node 424 may be coupled to the network node 402 via the communication interface 427. The first, second, and third assisting nodes 406, 408, 410 may be deployed in the cell 404 to assist the network nodes 402, 434. For example, the cell 404 may include obstructions (e.g., buildings 430, 432) which may reduce signal coverage in areas of the cell 404 and degrade the performance of some UEs (e.g., first and second UEs 412, 414).

In some aspects of the disclosure, one or more of the first, second, and third assisting nodes 406, 408, 410 may transmit an availability signal. For example, the first assisting node 406 may transmit an availability signal 420, the second assisting node 408 may transmit an availability signal 422, and the third assisting node 410 may transmit an availability signal 428. In some aspects of the disclosure, an assisting node may periodically transmit (e.g., broadcast) an availability signal to identify itself to one or more network nodes (e.g., the network node 402) and enable the network nodes to discover the assisting node. For example, the availability signal may include an identifier of the assisting node and may indicate the availability of the assisting node to assist the at least one network node.

In some examples, an assisting node (e.g., assisting node 408, 410) may transmit the availability signal in one more beams using a beam sweep operation. An assisting node may transmit an availability signal on preconfigured time-frequency resources. The network node 402 may be configured to scan the preconfigured time-frequency resources to receive an availability signal from an assisting node.

In some examples, the availability signal (e.g., the availability signal 420, 422, 428) may be a beacon. The beacon may be a wireless signal transmission, which may or may not carry data, on the previously described preconfigured time-frequency resources. For example, if the beacon is a periodic wireless signal transmission on the preconfigured time-frequency resources and does not carry data, the network node 402 may be configured to recognize the wireless signal transmission received on the preconfigured time-frequency resources as a beacon signal indicating that an assisting node is available.

In some examples, the availability signal (e.g., the availability signal 420, 422, 428) may be a reference signal, such as a channel state information reference signal (CSI-RS), a sounding reference signals (SRS), a random access channel (RACH) preamble, or other suitable type of reference signal. For example, the reference signal may carry a relatively small amount of information, such as an n-bit sequence. In some examples, the availability signal (e.g., the availability signal 420, 422, 428) may be a synchronization signal, such as a primary synchronization signal (PSS) or a secondary synchronization signal (SSS). In some examples, the availability signal (e.g., the availability signal 420, 422, 428) may be a signal carrying information regarding the availability of the assisting node (e.g., the assisting node 406, 408, 410) transmitted on a physical data channel (e.g., a transmission on PDSCH), on a physical control channel (e.g., a transmission on PCCH), a discovery channel, or other suitable channel capable of carrying a data payload.

In some examples, the availability signal (e.g., the availability signal 420, 422, 428) may be any combination of the previously described types of signals. For example, the availability signal may include a reference signal, followed by a transmission on a control channel (e.g., PDCCH) or a data channel (e.g., PDSCH). As another example, the availability signal may be a beacon which is mapped to another channel that may provide information regarding the availability of the assisting node.

In some aspects of the disclosure, an availability signal may not impact the normal operation of UEs in a wireless communication network. In some examples, an availability signal may include an off-synchronization raster synchronization signal (SS)/PBCH block (also referred to as an off-synchronization raster SSB or an off-sync raster SSB). A synchronization raster may indicate the frequency positions of a synchronization block that a UE (e.g., UE 412, 414) may use for system acquisition when explicit signaling of the synchronization block position is not provided. For example, a synchronization raster may include a list of synchronization raster frequencies where a PSS and/or SSS signal may be transmitted. Therefore, a UE trying to obtain initial access to the wireless communication network may be configured to search these synchronization raster frequencies and may not search other frequencies.

In some examples, an assisting node (e.g., the assisting node 406, 408, 410) may transmit the availability signal (e.g., the availability signal 420, 422, 428) using an off-sync raster SSB. In these examples, the wireless communication network 400 may allocate a set of off-sync raster frequencies for transmission of an availability signal. This set of off-sync raster frequencies may include frequencies on which UEs may not search for SSBs. This may prevent UEs from detecting SSBs from the assisting nodes and attempting to establish a communication with the assisting nodes. The off-sync raster SSBs, therefore, may avoid confusing the UEs with SSBs from assisting nodes.

In some examples, an assisting node may transmit an availability signal in an extended SSB. An extended SSB may include a PSS and/or an SSS indicating a new physical cell identity (PCID) assigned to an assisting node, where the new PCID is not discoverable by UEs. For example, a pool of 1008 different PCIDs for network nodes may be extended to allow for new PCIDs (e.g., PCIDs in addition to the 1008 different PCIDs) that may be assigned to assisting nodes.

In some examples, the wireless communication network may partition the pool of PCIDs and may allocate some PCIDs to assisting nodes. In these examples, access control flags in an SSB may be set to prevent UEs from attempting to camp on the PCIDs allocated to the assisting nodes.

In some aspects of the disclosure, an assisting node may obtain a set of preconfigured resources and/or a set of transmission configurations for the availability signal and may transmit the availability signal based on at least a portion of the set of preconfigured resources and/or the set of transmission configurations. For example, the set of preconfigured resources may include time-frequency resources. The time-frequency resources may include an offset, a periodicity, a number and location of candidate locations within a period, and other appropriate parameters and values.

For example, the set of transmission configurations for the availability signal may include spatial information and/or a power configuration. For example, the spatial information may include a number of beams to be used for transmission of the availability signal and/or one or more beam configurations (e.g., one or more directions in which a beam should be transmitted) to be used for transmission of the availability signal. The power configuration may include a transmit power to be used when transmitting the availability signal.

In some examples, the set of preconfigured resources and/or the set of transmission configurations for the availability signal may be preconfigured at the assisting node (e.g., preconfigured by an operations, administration and maintenance (OAM) entity at the time of deployment of the assisting node), may be indicated to an assisting node by an entity in the wireless communication network 400, or may be specified in a standard specification implemented by an assisting node.

An assisting node may be assigned an identifier (ID). The identifier (ID) may be preconfigured at the assisting node at or after the time of deployment of the assisting node, or may be provided to the assisting node from an entity in the wireless communication network 400. For example, the identifier (ID) may be a unique m-bit value. In some aspects of the disclosure, an assisting node may generate an availability signal based on the identifier (ID). For example, if an assisting node is to broadcast a reference signal as the availability signal, the assisting node may generate a scrambling sequence for the availability signal using the identifier (ID).

In some aspects of the disclosure, an assisting node may select a resource and/or a transmission configuration for transmission of an availability signal based on the identifier (ID). For example, the identifier (ID) of an assisting node may be mapped to one or more resources in a pool of resources for transmitting an availability signal, and the assisting node may use the identifier (ID) to identify the corresponding resources.

In some aspects of the disclosure, an assisting node may include configurations needed to generate an availability signal, such as a scrambling identifier (ID), occupied tones, and/or other suitable configurations. In some examples, the identifier (ID) of the assisting node may be used as the scrambling ID for the availability signal.

In some aspects of the disclosure, the assisting node may obtain the specific resources and transmission configuration to be used for transmission of an availability signal from an entity in the wireless communication network. In these aspects, the assisting node may not need to perform any operations to determine the resources and transmission configuration for transmission of the availability signal. The may reduce complexity for assisting nodes in some cases.

In some aspects of the disclosure, an assisting node may select resources and/or a transmission configuration from a provided set of resources and/or transmission configurations. In these aspects, the assisting node may have some flexibility with respect to the resources and/or transmission configurations that may be used for transmission of an availability signal. In some examples, an assisting node may select resources and/or a transmission configuration based on different criteria.

In one example, an assisting node may randomly select resources and/or a transmission configuration for transmission of an availability signal. In another example, an assisting node may select resources and/or a transmission configuration based on resources and/or a transmission configuration used by other assisting nodes. For example, an assisting node may be monitoring for availability signals from other assisting nodes and, if an availability signal is detected, the assisting node may select resources and/or a transmission configuration different from the resources and/or the transmission configuration used by the detected availability signal. In another example, an assisting node may select resources and/or a transmission configuration for transmission of an availability signal based on other parameters if the selection of resources and/or a transmission configuration may indicate some information.

In some examples, one of the parameters for selecting resources and/or a transmission configuration for transmission of an availability signal may include a type of the assisting node. For example, if a first assisting node is of a first type (e.g., a non-intelligent assisting node), the first assisting node may select a first subset of resources and/or a transmission configuration for transmitting an availability signal. If a second assisting node is of a second type (e.g., an autonomously intelligent assisting node), the second assisting node may select a second subset of resources and/or a transmission configuration for transmitting an availability signal. If a third assisting node is of a third type (e.g., a network-controlled intelligent assisting node), the third assisting node may select a third subset of resources and/or a transmission configuration for transmitting an availability signal.

In some aspects of the disclosure, an assisting node may periodically transmit an availability signal when it is available to assist a network node. Therefore, in these aspects, when a network node receives an availability signal from an assisting node, the network node may consider the assisting node to be available to assist the network node. In some scenarios, when the assisting node is already assisting a network node or is presently assigned to a network node, the assisting node may not have the resources and/or the capability to assist other network nodes. In these scenarios, the assisting node may no longer transmit the availability signal. In some aspects of the disclosure, a network node may transmit a dissociation signal to the assisting node if the network node no longer needs assistance from the assisting node. The assisting node may start transmitting the availability signal upon receiving the dissociation signal.

An assisting node may provide different types of information in the availability signal. In some examples, the availability signal may include information indicating whether the assisting node is available to assist a network node and/or whether the assisting node is capable of assisting the network node. In some examples, the availability signal may include information indicating whether the assisting node is already assisting a network node assigned to the assisting node. In some examples, the availability signal may include an identifier (ID) of the network node assigned to the assisting node.

In some aspects of the disclosure, the availability signal may indicate one or more wireless communication configurations of the network node assigned to the assisting node. For example, the one or more wireless communication configurations of the network node assigned to the assisting node may include at least one beamforming configuration and/or a transmission power associated with the network node. The beamforming configuration may indicate a number of beams and a direction of each beam, for example.

The one or more wireless communication configurations of the network node indicated in the availability signal may enable coordination with other network nodes. In one example scenario, if a first cell is being served by a first network node and a second network node serving a second cell needs to communicate with the first network node, the second network node may know from the availability information that the assisting node is associated with the first cell and may communicate with the first cell through the assisting node. In another example scenario, the one or more wireless communication configurations of the network node indicated in the availability signal may enable interference coordination with other network nodes. If a first cell is being served by a first network node and the assisting node is assisting the first network node, a second network node serving a second cell may know from the availability information that the assisting node is assisting the first cell by transmitting a number of beams in certain directions. The second network node may use this information to avoid transmitting signals in directions (e.g., toward the first network node) that may cause interference in the first cell.

In some aspects of the disclosure, an availability signal may include a type of the network node assigned to the assisting node, one or more capabilities of the network node assigned to the assisting node, one or more beamforming configurations of the network node assigned to the assisting node, a power configuration of the network node assigned to the assisting node, or one or more resources to be used for communication with the assisting node. For example, the one or more capabilities may include a capability to repeat a signal from a network node, a capability to perform a denoising operation, a capability to perform a filtering operation, a capability to change a timing, and/or other suitable capabilities of the assisting node.

In some aspects of the disclosure, an availability signal may include or one or more wireless communication configurations of the assisting node. For example, the one or more wireless communication configurations may include a beamforming configuration of the assisting node. The beamforming configuration may indicate a number of beams and a direction of each beam, for example. In some aspects of the disclosure, the availability signal may include a power configuration of the assisting node. For example, the power configuration may include a transmission power of the assisting node, a maximum amplification gain of the assisting node, and/or a current amplification gain being applied to transmissions from the assisting node.

In some examples, the one or more resources to be used for communication with the assisting node may include time-frequency resources and/or a transmission configuration (e.g., a maximum number of beams an assisting node is permitted to use and a direction of each beam). A network node may use the one or more resources to transmit signals to the assisting node and the assisting node may search the one or more resources to detect transmissions, such as a paging signal, from the network node. In some examples, the paging signal may request the assisting node to initiate a procedure for establishing a connection with the network node. For example, the procedure for establishing a connection with the network node may be a four-step random access channel (RACH) procedure or a two-step RACH procedure.

Detection and Use of Assisting Nodes

A network node (e.g., network node 402) may obtain at least a portion of a set of pre-configured resources and/or a set of transmission configurations which may be used by an assisting node (e.g., assisting node 406, 408, 410) to transmit an availability signal. For example, the set of pre-configured resources may include time-frequency resources, and the set of transmission configurations may include one or more beamforming configurations, an identifier (ID) of an assisting node, a periodicity of an availability signal, and/or other suitable configuration information.

The network node may search at least a portion of the set of pre-configured resources based on the set of transmission configurations to detect an availability signal from an assisting node. In some examples, the network node may blindly search the set of pre-configured resources (or a portion thereof) for availability signals including a specific identifier (ID) of an assisting node at a certain periodicity. In some aspects of the disclosure, at least a portion of the set of pre-configured resources and/or the set of transmission configurations may be preconfigured at the network node (e.g., preconfigured by an operations, administration and maintenance (OAM) entity), may be indicated to the network node by an entity in the wireless communication network, or may be specified in a standard specification implemented by the network node.

Figure 5:
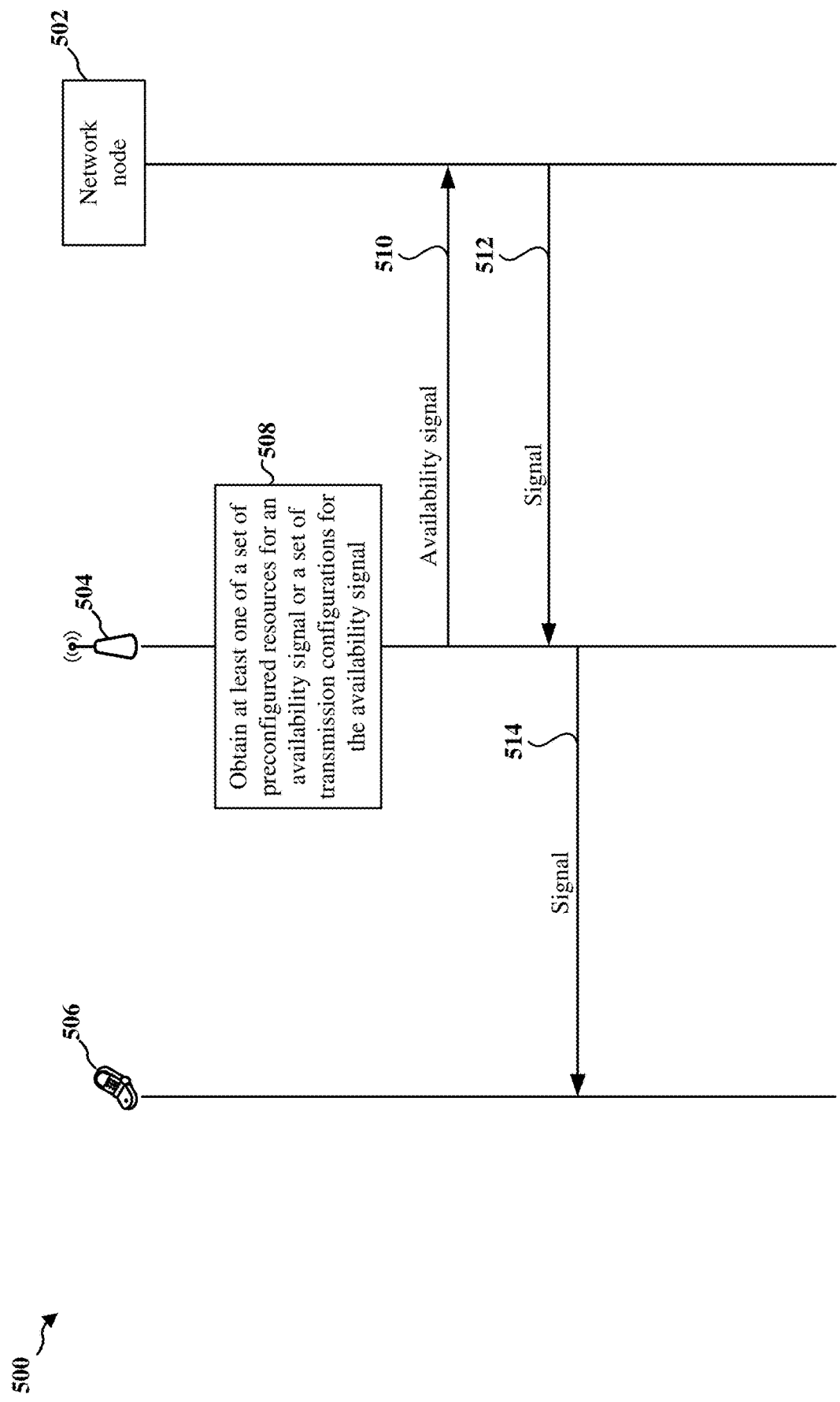
FIG. 5 illustrates a signal flow diagram in accordance with various aspects of the disclosure.

In some aspects of the disclosure, and as described in detail in FIGS. 4 and 5, a network node (e.g., network node 402) may detect an availability signal from an assisting node, such as a non-intelligent assisting node or an autonomously intelligent assisting node, and may attempt to use the assisting node. For example, if the availability signal includes sufficient information about the assisting node, such as information indicating that the assisting node is available, one or more wireless communication configurations of the assisting node, and/or one or more capabilities of the assisting node, a network node may transmit signals based on the information in the availability signal to extend the coverage of the network node. In one example scenario, the network node may transmit synchronization signals in beams directed toward an assisting node and on time-frequency resources used by the assisting node with the expectation that the assisting node will receive and retransmit the synchronization signals.

In one example, with reference to FIG. 4, the network node 402 may transmit a first signal intended for the first UE 412 toward the first assisting node 406 (e.g., in the direction 450*a*). The first assisting node 406 may relay the first signal toward the first UE 412 (e.g., in the direction 450*b*). The first assisting node 406 may relay the first signal by reflecting the first signal off the reflective surface 416.

In another example, the network node 402 may transmit a second signal intended for the first UE 412 toward the second assisting node 408 (e.g., in the direction 460*a*). The second assisting node 408 may relay the second signal toward the first UE 412 (e.g., in the direction 460*b*). The second assisting node 408 may relay the second signal by receiving the second signal from the network node 402, regenerating the second signal and transmitting (e.g., forwarding) the second signal to the first UE 412.

In another example, the network node 402 may transmit a third signal intended for the second UE 414 toward the third assisting node 410 (e.g., in the direction 470*a*). The third assisting node 410 may relay the third signal toward the second UE 414 (e.g., in the direction 470*b*). The third assisting node 410 may relay the second signal by receiving the second signal from the network node 402, regenerating the third signal and transmitting (e.g., forwarding) the third signal to the second UE 414. In this example, the third assisting node 410 may extend the coverage of the network node 402 to the location of the second UE 414, which may have moved out of the range of the network node 402 (e.g., outside the boundary of the cell 404) as shown in FIG. 4. The third assisting node 410 may also provide spatial diversity by providing a signal path (e.g., indicated with arrows 470*a*, 470*b*) around the structure 432.

FIG. 5 illustrates a signal flow diagram 500 in accordance with various aspects of the disclosure. The signal flow diagram 500 includes a network node 502, an assisting node 504, and a UE 506. In some examples, the network node 502 may be the network node 402 in FIG. 4, the assisting node 504 may be the second assisting node 408 in FIG. 4, and the UE 506 may be the first UE 412 in FIG. 4.

At 508, the assisting node 504 may obtain at least one of a set of preconfigured resources (e.g., time-frequency) for an availability signal or a set of transmission configurations for the availability signal. The assisting node 508 may transmit an availability signal 510 based on the set of preconfigured resources and/or the set of transmission configurations. For example, the availability signal 510 may be the availability signal 422 in FIG. 4. The network node 502 may receive the availability signal 510 and may transmit a signal 512 intended for the UE 506 toward the assisting node 504 if the assisting node 504 is available to assist the network node 502. For example, the assisting node 504 may receive the signal 512 from the network node 502, may regenerate the signal 512 to obtain the signal 514, and may transmit the signal 514 in the direction of the UE 506.

Referring back to FIG. 4, in some aspects of the disclosure, the network node 402 may transmit a signal to the assisting node (e.g., the assisting node 408, 410) in response to the availability signal (e.g., the availability signal 422, 428), where the signal includes configuration information for the operation and/or utilization of the assisting node. For example, the configuration information may indicate a time domain division (TDD) configuration (e.g., a UL/DL pattern), a beam configuration, and/or a transmission power. The network node 402 may then transmit a signal intended for a network entity (e.g., the UE 412, 414). The assisting node may receive the signal intended for the network entity and may proceed to transmit the signal intended for the network entity based on the configuration information. For example, the assisting node may use the time domain division (TDD) configuration, beam configuration, and/or the transmission power indicated in the configuration information to transmit the signal intended for the network entity.

In some examples, the signal from the network node including the configuration information may be a broadcast or a group-common message. In these aspects, it should be noted that a communication link between the network node and the assisting node may not be needed for the network node to employ the assisting node to extend the coverage of the network node. This is described herein in detail with reference to FIG. 6.

Figure 6:
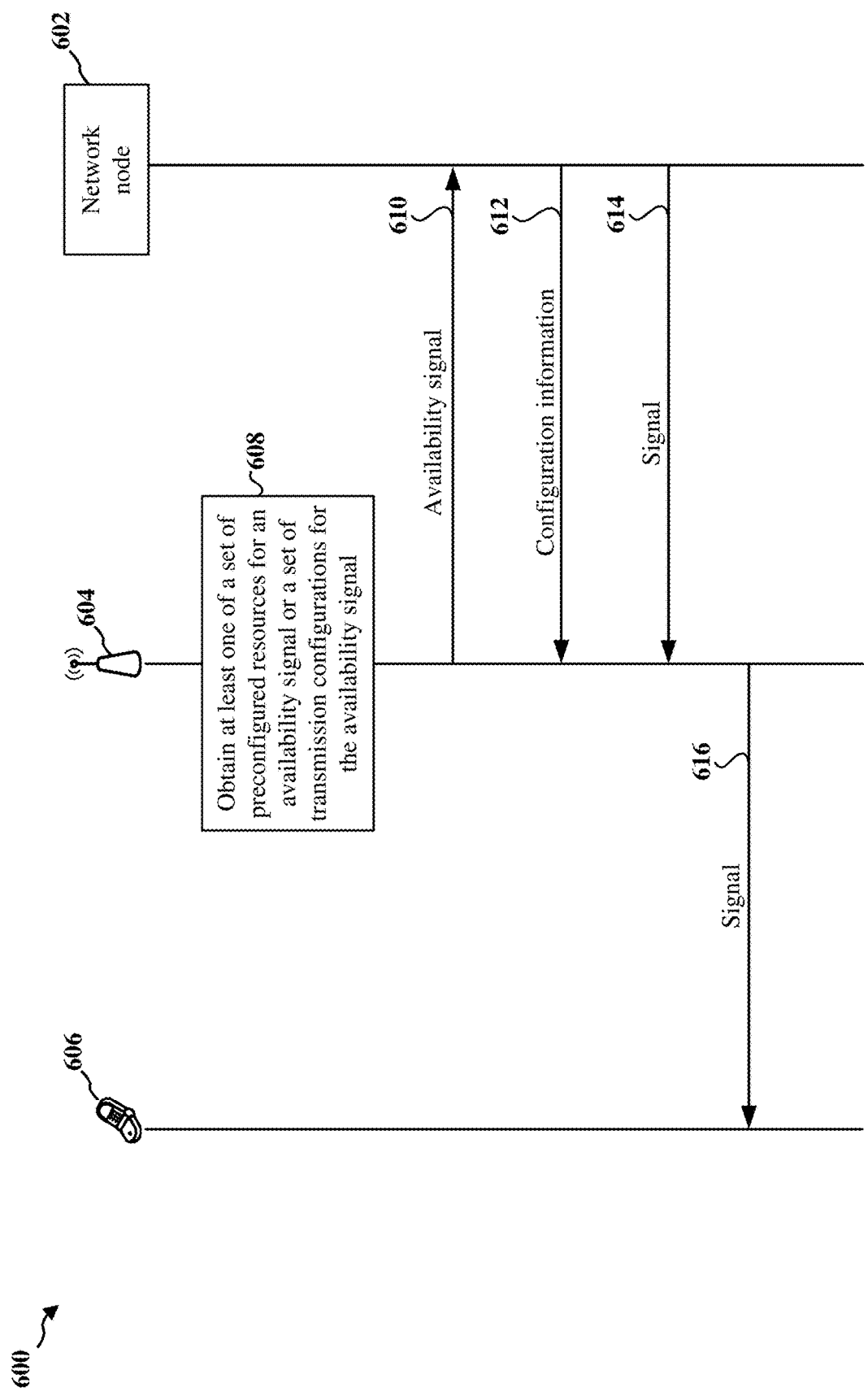
FIG. 6 illustrates a signal flow diagram in accordance with various aspects of the disclosure.

FIG. 6 illustrates a signal flow diagram 600 in accordance with various aspects of the disclosure. The signal flow diagram 600 includes a network node 602, an assisting node 604, and a UE 606. In some examples, the network node 602 may be the network node 402 in FIG. 4, the assisting node 604 may be the second assisting node 408 in FIG. 4, and the UE 606 may be the first UE 412 in FIG. 4.

At 608, the assisting node 604 may obtain at least one of a set of preconfigured resources (e.g., time-frequency resources) for an availability signal or a set of transmission configurations for the availability signal. The assisting node 608 may transmit an availability signal 610 based on the set of preconfigured resources and/or the set of transmission configurations. For example, the availability signal 610 may be the availability signal 422 in FIG. 4. The network node 602 may receive the availability signal 610 and may transmit a configuration signal 612 including configuration information for the operation and/or utilization of the assisting node. For example, the configuration information may indicate a TDD configuration (e.g., a UL/DL pattern), a beam configuration, and/or a transmission power. The network node 602 may then transmit a signal 614 intended for the UE 606.

The assisting node 604 may receive the signal 614 intended for the UE 606 and may proceed to relay the signal 614 to the UE 606 based on the configuration information. For example, the assisting node 604 may regenerate the signal 614 to obtain the signal 616, and may use the TDD configuration, beam configuration, and/or the transmission power indicated in the configuration information to transmit the signal 616 in the direction of to the UE 606. In some examples, the configuration signal 612 from the network node 602 including the configuration information may be a broadcast or a group-common message. In these aspects, it should be noted that a connection (e.g., a connection established with a RACH procedure) between the network node 602 and the assisting node 604 may not be needed for the network node 602 to employ the assisting node 604 to extend the coverage of the network node 602.

In another example, referring back to FIG. 4, the network node 402 may transmit a request signal to an assisting node in response to an availability signal, where the request signal requests the assisting node to initiate a procedure for establishing a connection with the network node. The request signal may include an identifier (ID) associated with the network node 402 and configuration information associated with the network node 402. The configuration information may enable the assisting node to establish a connection with the network node 402. In one example scenario, the assisting node may proceed to initiate a procedure for establishing a connection with the network node 402. In this scenario, the assisting node may transmit a first message of a random access procedure in response to the request signal. This is described herein in detail with reference to FIG. 7.

Figure 7:
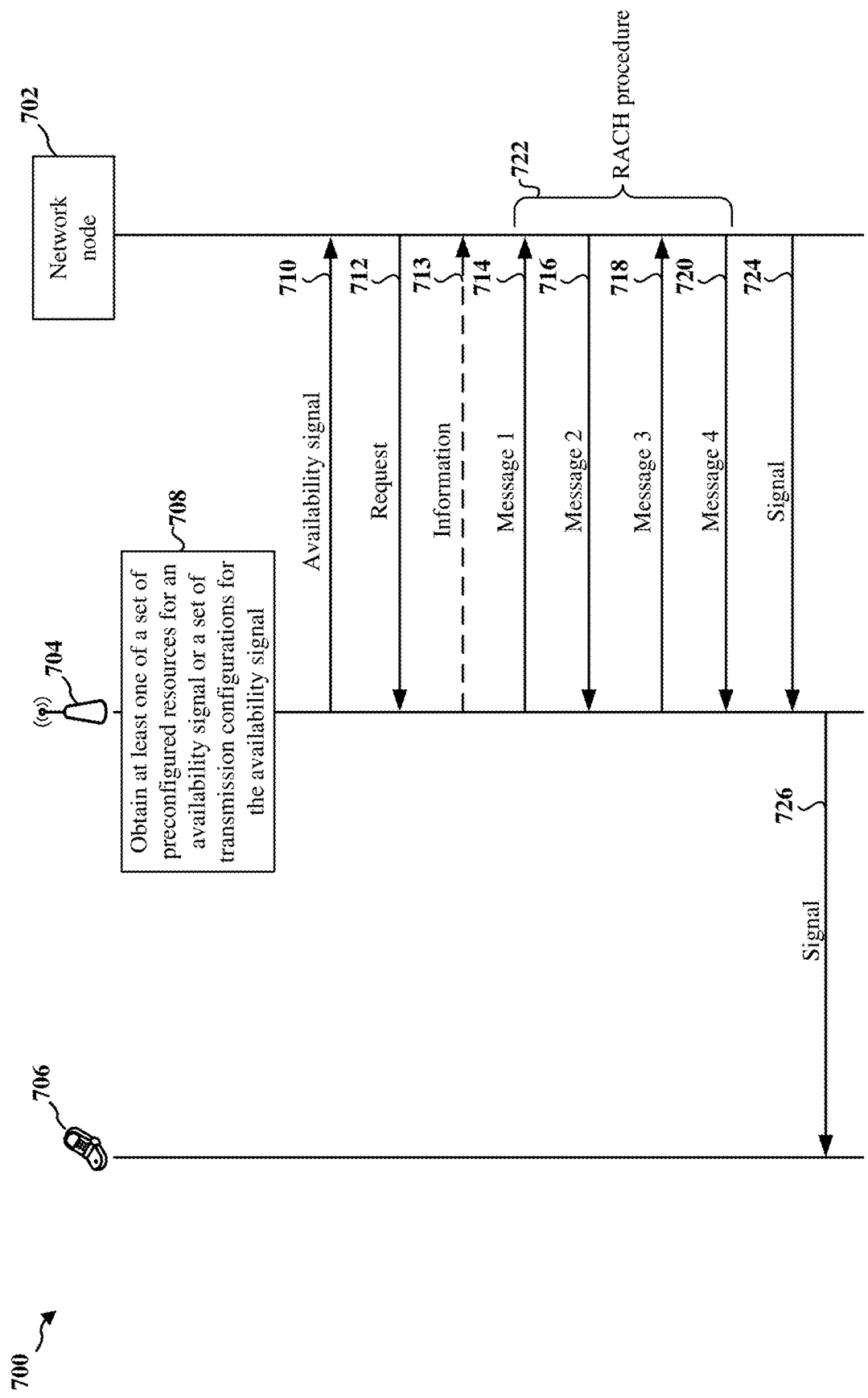
FIG. 7 illustrates a signal flow diagram in accordance with various aspects of the disclosure.

FIG. 7 illustrates a signal flow diagram 700 in accordance with various aspects of the disclosure. The signal flow diagram 700 includes a network node 702, an assisting node 704, and a UE 706. In some examples, the network node 702 may be the network node 402 in FIG. 4, the assisting node 704 may be the second assisting node 408 in FIG. 4, and the UE 706 may be the first UE 412 in FIG. 4.

At 708, the assisting node 704 may obtain at least one of a set of preconfigured resources (e.g., time-frequency) for an availability signal or a set of transmission configurations for the availability signal. The assisting node 704 may transmit an availability signal 710 based on the set of preconfigured resources and/or the set of transmission configurations. For example, the availability signal 710 may be the availability signal 422 in FIG. 4.

The network node 702 may receive the availability signal 710 and may transmit a request signal 712 in response to the availability signal 710. The request signal 712 may request the assisting node 704 to initiate a RACH procedure (e.g., the RACH procedure 722) for establishing a connection with the network node 702. In some examples, the request signal 712 may include a message of a random access procedure. In some examples, the request signal 712 may include an identifier (ID) associated with the network node 702 and configuration information associated with the network node 702. The configuration information may enable the assisting node 704 to establish a connection with the network node 702. In some examples, the request signal 712 may request information that was not included in the availability signal 710.

As shown in FIG. 7, the assisting node 704 may optionally transmit a message 713 including information (e.g., one or more wireless communication configurations of the assisting node) that was not included in the availability signal 710 in response to the request signal 712. The assisting node 704 may initiate a RACH procedure by transmitting a signal 714, which may include a first message (e.g., message 1) of a four-step random access channel (RACH) procedure (e.g., the RACH procedure 722), in response to the request signal 712. Accordingly, the signal 714 may include message 1 of the RACH procedure 722 and may carry a PRACH preamble. The network node 702 may detect the PRACH preamble and may respond with a signal 716, which may include a second message (e.g., message 2) of the RACH procedure 722. The second message (e.g., message 2) of the RACH procedure 722 may include a random access response (RAR). The assisting node 704 may transmit a signal 718, which may include a third message (e.g., message 3) of the RACH procedure 722. The signal 718 including the third message (e.g., message 3) of the RACH procedure 722 may be time synchronized with respect to the network node 702 and may include a unique identity of the assisting node 704. The network node 702 may transmit a signal 720, which may include a fourth message (e.g., message 4) of the RACH procedure 722. The fourth message (e.g., message 4) of the RACH procedure 722 may include a contention resolution. It should be understood that in other examples, the RACH procedure 722 may be a two-step RACH procedure instead of a four-step RACH procedure.

Upon establishing a connection with the assisting node 704, the network node 702 may transmit a signal 724 intended for the UE 706 toward the assisting node 704. For example, the assisting node 704 may receive the signal 724 from the network node 702, may regenerate the signal 724 to obtain the signal 726, and may transmit the signal 726 in the direction of the UE 706.

Referring back to FIG. 4, in some aspects of the disclosure, an assisting node may camp on the cell served by the network node 402 after establishing a connection with the network node 402. In other aspects of the disclosure, after establishing a connection with the network node 402, an assisting node may enter a power saving mode and may not camp on any cell. In these aspects, whenever the assisting node is paged by the network node 402, the assisting node may search for a cell in its vicinity, select a suitable cell, and camp on the selected cell.

In some aspects of the disclosure, with reference to FIG. 4, an assisting node (e.g., the third assisting node 410) may forward the request signal from the network node 402 to a control node (e.g., the control node 424) of the assisting node. The control node may transmit one or more instructions to the assisting node in response to the forwarded request signal and the assisting node may perform the one or more instructions. The one or more instructions may include an instruction to perform an initial access procedure (e.g., a four-step RACH procedure or a two-step RACH procedure) with the network node 402. Accordingly, the one or more instructions may include an instruction to transmit a first message of a random access procedure to the network node 402. This is described in detail herein with reference to FIG. 8.

Figure 8:
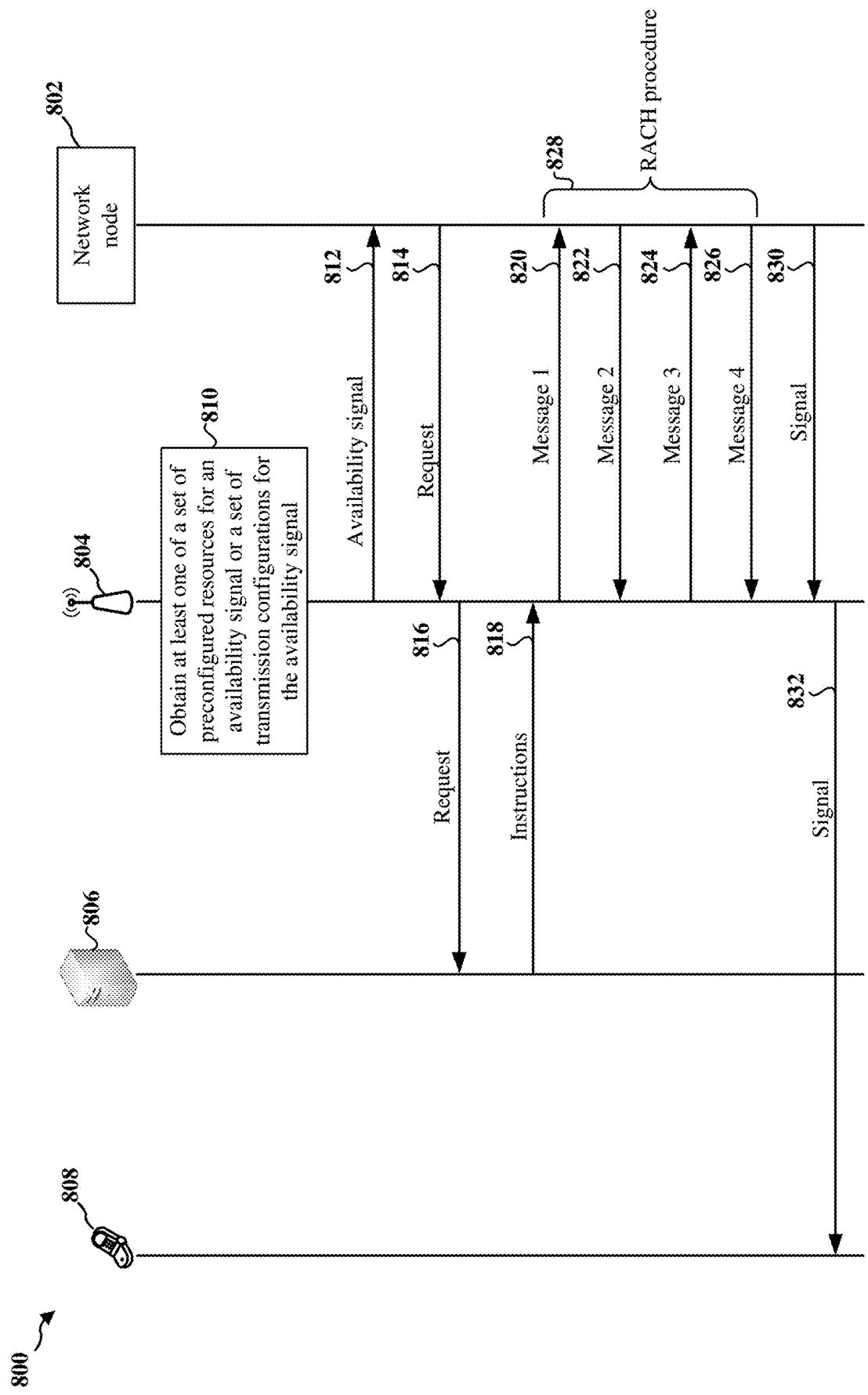
FIG. 8 illustrates a signal flow diagram in accordance with various aspects of the disclosure.

FIG. 8 illustrates a signal flow diagram 800 in accordance with various aspects of the disclosure. The signal flow diagram 800 includes a network node 802, an assisting node 804, a control node 806 associated with the assisting node 804, and a UE 808. In some examples, the network node 802 may be the network node 402 in FIG. 4, the assisting node 804 may be the third assisting node 410 in FIG. 4, the control node 806 may be control node 424 in FIG. 4, and the UE 808 may be the second UE 414.

At 810, the assisting node 804 may obtain at least one of a set of preconfigured resources (e.g., time-frequency resources) for an availability signal or a set of transmission configurations for the availability signal. The assisting node 804 may transmit an availability signal 812 based on the set of preconfigured resources and/or the set of transmission configurations. For example, the availability signal 812 may be the availability signal 428 in FIG. 4.

The network node 802 may receive the availability signal 812 and may transmit a request signal 814 in response to the availability signal 812. The request signal 814 may request the assisting node 804 to initiate a RACH procedure (e.g., the RACH procedure 828) for establishing a connection with the network node 802. The request signal 814 may include an identifier (ID) associated with the network node 802 and configuration information associated with the network node 802. The configuration information may enable the assisting node 804 to establish a connection with the network node 802. The assisting node 804 may forward the received request signal 814 to the control node 806. The assisting node 804 may forward the request signal 814 by regenerating the request signal to obtain a request signal 816, and transmitting the request signal 816. The control node 806 may transmit one or more instructions 818 to the assisting node 804 in response to the request signal 816, and the assisting node 804 may perform the one or more instructions 818. In the example of FIG. 8, the one or more instructions 818 may instruct the assisting node 804 to initiate a four-step RACH procedure with the network node 802.

The assisting node 804 may initiate a RACH procedure by transmitting a signal 820, which may include a first message (e.g., message 1) of a four-step random access channel (RACH) procedure (e.g., the RACH procedure 828), in response to the one or more instructions 818. Accordingly, the signal 820 may include message 1 of the RACH procedure 828 and may carry a PRACH preamble. The network node 802 may detect the PRACH preamble and may respond with a signal 822, which may include a second message (e.g., message 2) of the RACH procedure 828. The second message (e.g., message 2) of the RACH procedure 828 may include a random access response (RAR). The assisting node 804 may transmit a signal 824, which may include a third message (e.g., message 3) of the RACH procedure 828. The signal 824 including the third message (e.g., message 3) of the RACH procedure 828 may be time synchronized with respect to the network node 802 and may include a unique identity of the assisting node 804. The network node 802 may transmit a signal 826, which may include a fourth message (e.g., message 4) of the RACH procedure 828. The fourth message (e.g., message 4) of the RACH procedure 828 may include a contention resolution. It should be understood that in other examples, the RACH procedure 828 may be a two-step RACH procedure instead of a four-step RACH procedure.

Upon establishing a connection with the assisting node 804, the network node 802 may transmit a signal 830 intended for the UE 808 toward the assisting node 804. For example, the assisting node 804 may receive the signal 830 from the network node 802, may regenerate the signal 830 to obtain the signal 832, and may transmit the signal 832 in the direction of the UE 808.

Referring back to FIG. 4, in some aspects of the disclosure, an assisting node (e.g., the third assisting node 410) may be associated with a control node (e.g., the control node 424), and a network node (e.g., the network node 402) may need to obtain permission to use the assisting node from the control node. The control node may grant a network node permission to use the assisting node or may assign the assisting node to the network node. In some examples, an assisting node may need to be assigned to a network node before assisting the network node. In these examples, a control node associated with the assisting node may be in control of assigning the assisting node to a network node.

In some aspects of the disclosure, an assisting node may be in communication with and under the control of a control node. In these aspects, a network node may communicate with the control node to gain the assistance of the assisting node. For example, a control node may receive (e.g., via the assisting node or a communication interface) a request signal from a network node requesting the assisting node to initiate a procedure for establishing a connection with the network node. In a first scenario, the control node may forward the request signal to the assisting node. In this scenario, the assisting node may transmit a signal including a first message of a random access procedure.

In a second scenario, the control node may transmit configuration information and/or one or more instructions to the assisting node. In this scenario, the configuration information may enable the assisting node to establish a connection with the network node and the one or more instructions may instruct the assisting node to establish a connection to the requesting network node. For example, the assisting node may establish a connection with the network node based on the configuration information. Therefore, in this scenario, the assisting node may be handed over to the requesting network node. The previously described first and second scenarios are described in detail with reference to FIG. 9.

Figure 9:
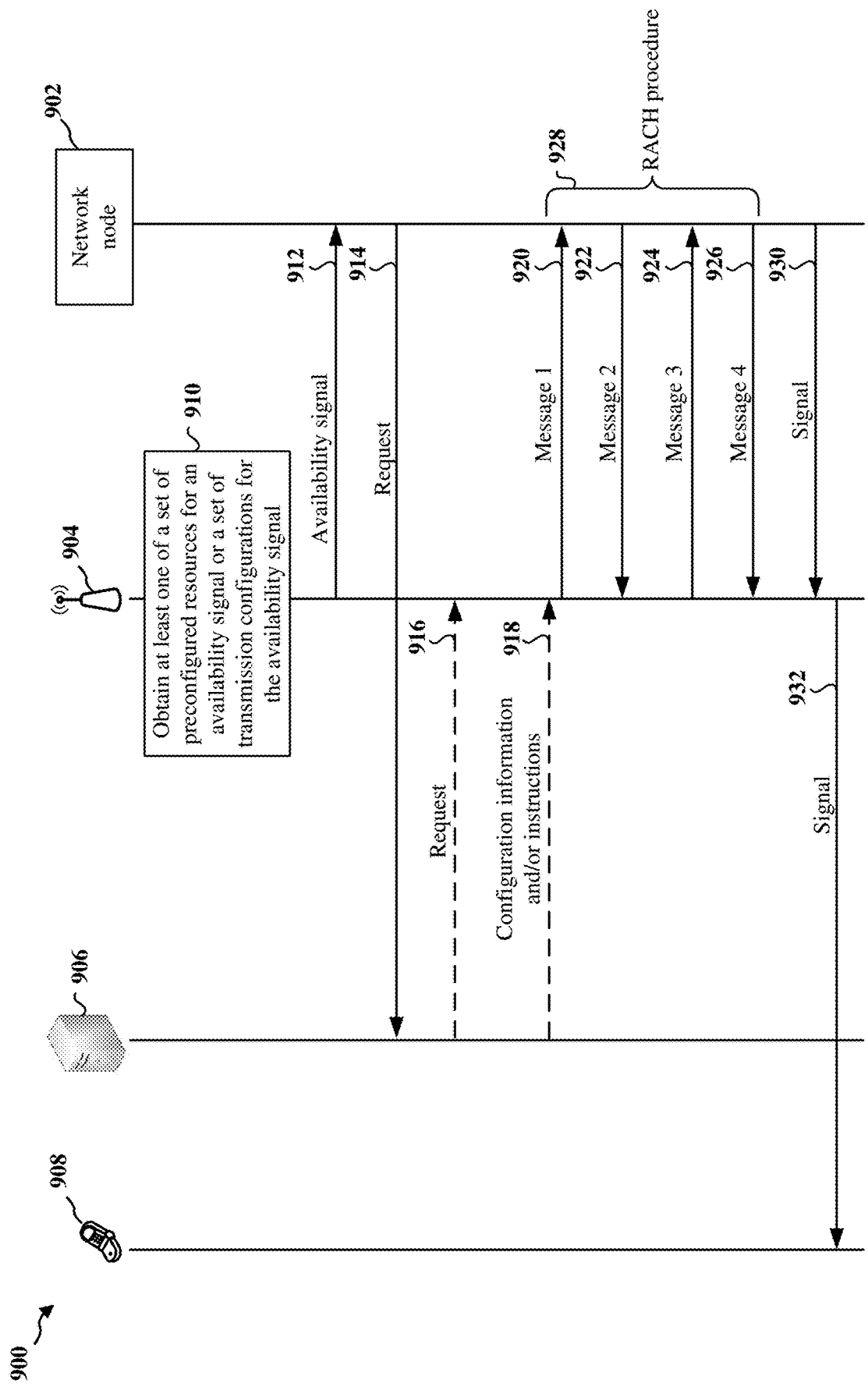
FIG. 9 illustrates a signal flow diagram in accordance with various aspects of the disclosure.

FIG. 9 illustrates a signal flow diagram 900 in accordance with various aspects of the disclosure. The signal flow diagram 900 includes a network node 902, an assisting node 904, a control node 906 associated with the assisting node 904, and a UE 908. In some examples, the network node 902 may be the network node 402 in FIG. 4, the assisting node 904 may be the third assisting node 410 in FIG. 4, the control node 906 may be the control node 424 in FIG. 4, and the UE 908 may be the second UE 414 in FIG. 4.

At 910, the assisting node 904 may obtain at least one of a set of preconfigured resources (e.g., time-frequency resources) for an availability signal or a set of transmission configurations for an availability signal. The assisting node 904 may transmit an availability signal 912 based on the set of preconfigured resources and/or the set of transmission configurations. For example, the availability signal 912 may be the availability signal 428 in FIG. 4.

The network node 902 may receive the availability signal 912 and may transmit a request signal 914 to the control node 906 in response to the availability signal 912. The request signal 914 may request the assisting node 904 to initiate a RACH procedure (e.g., the RACH procedure 928) for establishing a connection with the network node 902. The request signal 914 may include an identifier (ID) associated with the network node 902 and configuration information associated with the network node 902. The configuration information may enable the assisting node 904 to establish a connection with the network node 902.

In one aspect of the disclosure, the control node 906 may forward the received request signal 914 to the assisting node 904 via the message 916. The assisting node 904 may initiate a RACH procedure by transmitting a signal 920, which may include a first message (e.g., message 1) of a four-step random access channel (RACH) procedure (e.g., the RACH procedure 928), in response to the message 916. Accordingly, the signal 920 may include message 1 of the RACH procedure 828 and may carry a PRACH preamble. The network node 902 may detect the PRACH preamble and may respond with a signal 922, which may include a second message (e.g., message 2) of the RACH procedure 928. The second message (e.g., message 2) of the RACH procedure 928 may include a random access response (RAR). The assisting node 904 may transmit a signal 924, which may include a third message (e.g., message 3) of the RACH procedure 928. The signal 924 including the third message (e.g., message 3) of the RACH procedure 928 may be time synchronized with respect to the network node 902 and may include a unique identity of the assisting node 904. The network node 902 may transmit a signal 926, which may include a fourth message (e.g., message 4) of the RACH procedure 928. The fourth message (e.g., message 4) of the RACH procedure 928 may include a contention resolution. It should be understood that in other examples, the RACH procedure 828 may be a two-step RACH procedure instead of a four-step RACH procedure.

The assisting node 904 may transmit the message 920, which may be a first message of a four-step random access channel (RACH) procedure (e.g., the RACH procedure 928). Accordingly, the message 920 may be referred to as message 1 of the RACH procedure 928 and may include a PRACH preamble. The network node 902 may detect the PRACH preamble and may respond with a second message 922 (e.g., message 2) of the RACH procedure 928. The second message 922 may include a random access response (RAR). The assisting node 904 may transmit a third message 924 (e.g., message 3) of the RACH procedure 928. The third message 924 may be time synchronized with respect to the network node 902 and may include a unique identity of the assisting node 904. The network node 902 may transmit a contention resolution to the assisting node 904 via a fourth message 926 (e.g., message 4) of the RACH procedure 928. It should be understood that in other examples, the RACH procedure 928 may be a two-step RACH procedure instead of a four-step RACH procedure.

In another aspect of the disclosure, the control node 906 may transmit a message 918 including configuration information and/or one or more instructions 918 to the assisting node 904 instead of forwarding the request signal 914 to the assisting node 904. The configuration information in the message 918 may enable the assisting node 904 to establish a connection with the network node 902. The one or more instructions in the message 918 may instruct the assisting node 904 to establish a connection with the network node 902 based on the configuration information in the message 918. The assisting node 904 may perform the one or more instructions in the message 918. For example, the assisting node 904 may initiate the RACH procedure 928 with the network node 902 in response to the message 918.

Upon establishing a connection with the assisting node 904, the network node 902 may transmit a signal 930 intended for the UE 908 toward the assisting node 904. The assisting node 904 may receive the signal 930 from the network node 902, may regenerate the signal 930 to obtain the signal 932, and may transmit the signal 932 in the direction of the UE 908.

Referring back to FIG. 4, in some aspects of the disclosure, a network node (e.g., the network node 402) may transmit a request signal to a control node (e.g., the control node 424) associated with an assisting node (e.g., the third assisting node 410) in response to an availability signal from the assisting node (e.g., the third assisting node 410). The request signal may indicate that the network node requests assistance from the assisting node. The control node may receive the request signal from the network node and may transmit configuration information and/or one or more instructions to the assisting node. The configuration information may enable the assisting node to relay (e.g., forward) signals from the network node intended for a network entity (e.g., another network node, such as the UE 414). For example, the configuration information may include a time domain division (TDD) configuration, a beam configuration and/or a transmission power.

When the assisting node (e.g., the third assisting node 410) receives a signal intended for a network entity (e.g., the UE 414) from the network node (e.g., the network node 402), the assisting node may transmit the signal based on the configuration information. In these aspects, it should be noted that a connection (e.g., a connection established with a RACH procedure) between the network node (e.g., the network node 402) and the assisting node (e.g., the third assisting node 410) may not be needed for the network node to employ the assisting node to extend the coverage of the network node. These aspects are described in detail with reference to FIG. 10.

Figure 10:
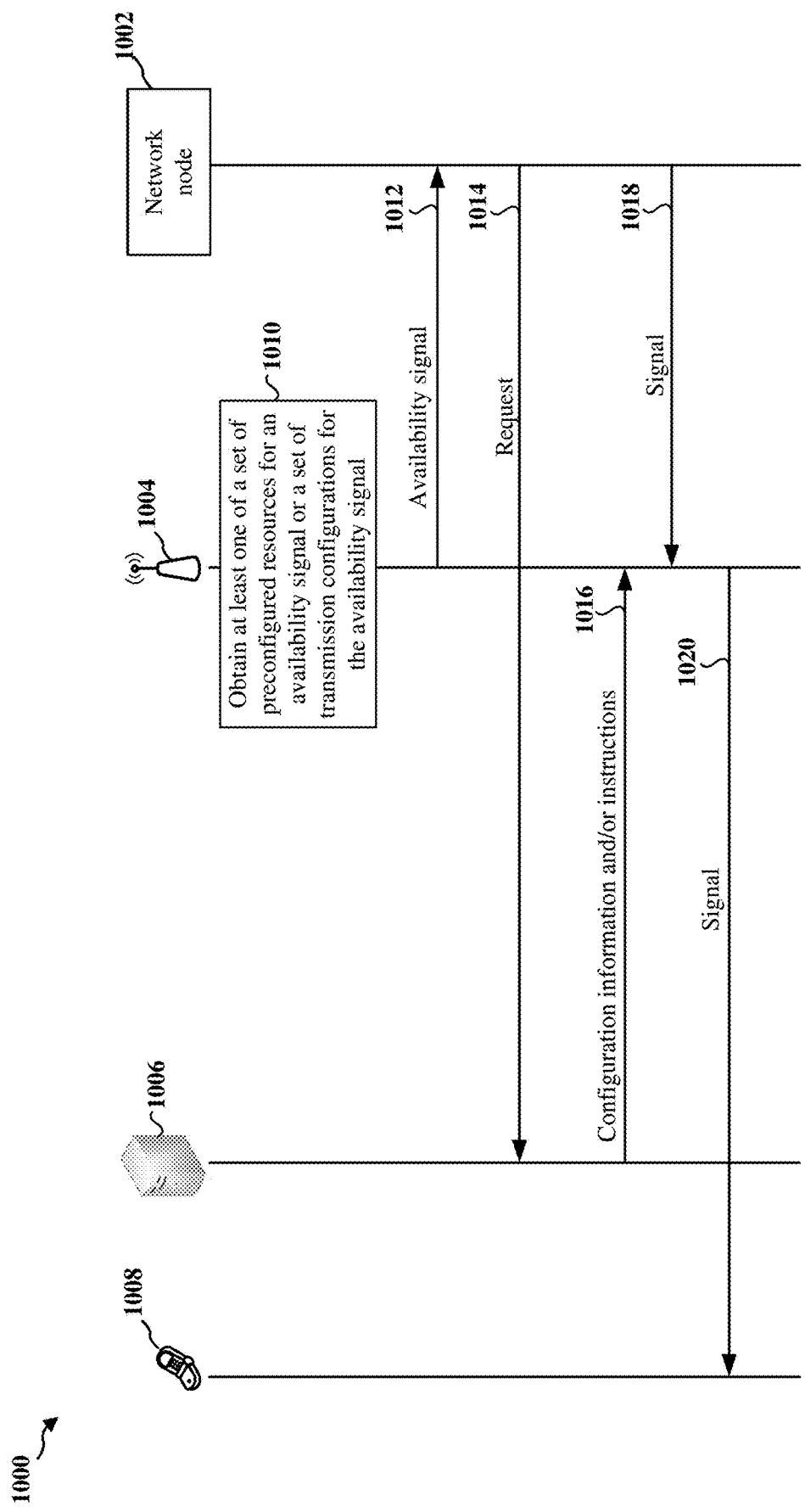
FIG. 10 illustrates a signal flow diagram in accordance with various aspects of the disclosure.

FIG. 10 illustrates a signal flow diagram 1000 in accordance with various aspects of the disclosure. The signal flow diagram 1000 includes a network node 1002, an assisting node 1004, a control node 1006 associated with the assisting node 1004, and a UE 1008. In some examples, the network node 1002 may be the network node 402 in FIG. 4, the assisting node 1004 may be the third assisting node 410 in FIG. 4, the control node 1006 may be control node 424 in FIG. 4, and the UE 1008 may be the second UE 414 in FIG. 4.

At 1010, the assisting node 1004 may obtain at least one of a set of preconfigured resources (e.g., time-frequency resources) for an availability signal or a set of transmission configurations for the availability signal. The assisting node 1004 may transmit an availability signal 1012 based on the set of preconfigured resources and/or the set of transmission configurations. For example, the availability signal 1012 may be the availability signal 428 in FIG. 4.

The network node 1002 may receive the availability signal 1012 and may transmit a request signal 1014 to the control node 1006 associated with the assisting node 1004 in response to the availability signal 1012. The request signal 1014 may request the assistance of the assisting node 1004. In some examples, the request signal 1014 may include configuration information associated with the network node 1002. In some examples, the request signal 1014 may include configuration information (also referred to as forwarding configuration information) for the assisting node 1004. For example, the configuration information associated with the network node 1002 and/or the configuration information for the assisting node 1004 may enable the assisting node 1004 to relay (e.g., forward) a signal from the network node 1002 to the UE 1008. In some examples, the configuration information associated with the network node 1002 and/or the configuration information for the assisting node 1004 may indicate a time domain division (TDD) configuration, a beam configuration, a transmission power, and/or other suitable configuration parameters and values.

The control node 1006 may transmit a message 1016 including configuration information and/or one or more instructions to the assisting node 1004. In some examples, the configuration information in the message 1016 may include the configuration information associated with the network node 1002 and/or the configuration information for the assisting node 1004 included in the request signal 1014. In some examples, the one or more instructions may instruct the assisting node 1004 to relay (e.g., forward) communications from the network node 1002 to the UE 1008. In some aspects of the disclosure, the assisting node 1004 may consider these instructions as an assignment to the network node 1002.

The network node 1002 may transmit a signal 1018 intended for the UE 1008 toward the assisting node 1004 based on the configuration information (e.g., the configuration information in the message 1016). For example, the assisting node 1004 may receive the signal 1018 from the network node 1002, may regenerate the signal 1018 to obtain the signal 1020, and may transmit the signal 1020 in the direction of the UE 1008.

Referring back to FIG. 4, in some aspects of the disclosure, a control node (e.g., the control node 424 in FIG. 4) associated with an assisting node (e.g., the third assisting node 410 in FIG. 4) may communicate with one or more network nodes (e.g., network nodes 402, 434) to indicate the availability of the assisting node. For example, the control node may indicate to one or more network nodes whether the assisting node is currently assisting a network node and/or whether the assisting node has been assigned to a network node.

In some aspects, a control node (e.g., the control node 424 in FIG. 4) associated with an assisting node (e.g., the third assisting node 410 in FIG. 4) may facilitate communications between a first network node (e.g., network node 402) and a second network node (e.g., network node 434) in a wireless communication network. For example, the assisting node may be associated with the first network node and the control node may indicate to the second network node that the assisting node is associated with the first network node. In some aspects of the disclosure, the first network node may transmit a message to the control node including a request to communicate with the second network node. The control node may transmit a message to the second network node indicating that the first network node requests to communicate with the second network node and that the second network node may communicate with the first network node via the assisting node.

In some aspects of the disclosure, a first network node (e.g., network node 402) may communicate with a second network node (e.g., network node 434), either directly or indirectly, to employ an assisting node (e.g., the third assisting node 410 in FIG. 4) and facilitate communications between the first and second network nodes. In one example, the first network node may request the second network node to transmit a reference signal in a specific direction and may listen for the reference signal. If the first network node receives the reference signal, the first network node may determine that the first network node may communicate with the second network node through the assisting node. This is described in detail with reference to FIG. 11.

Figure 11:
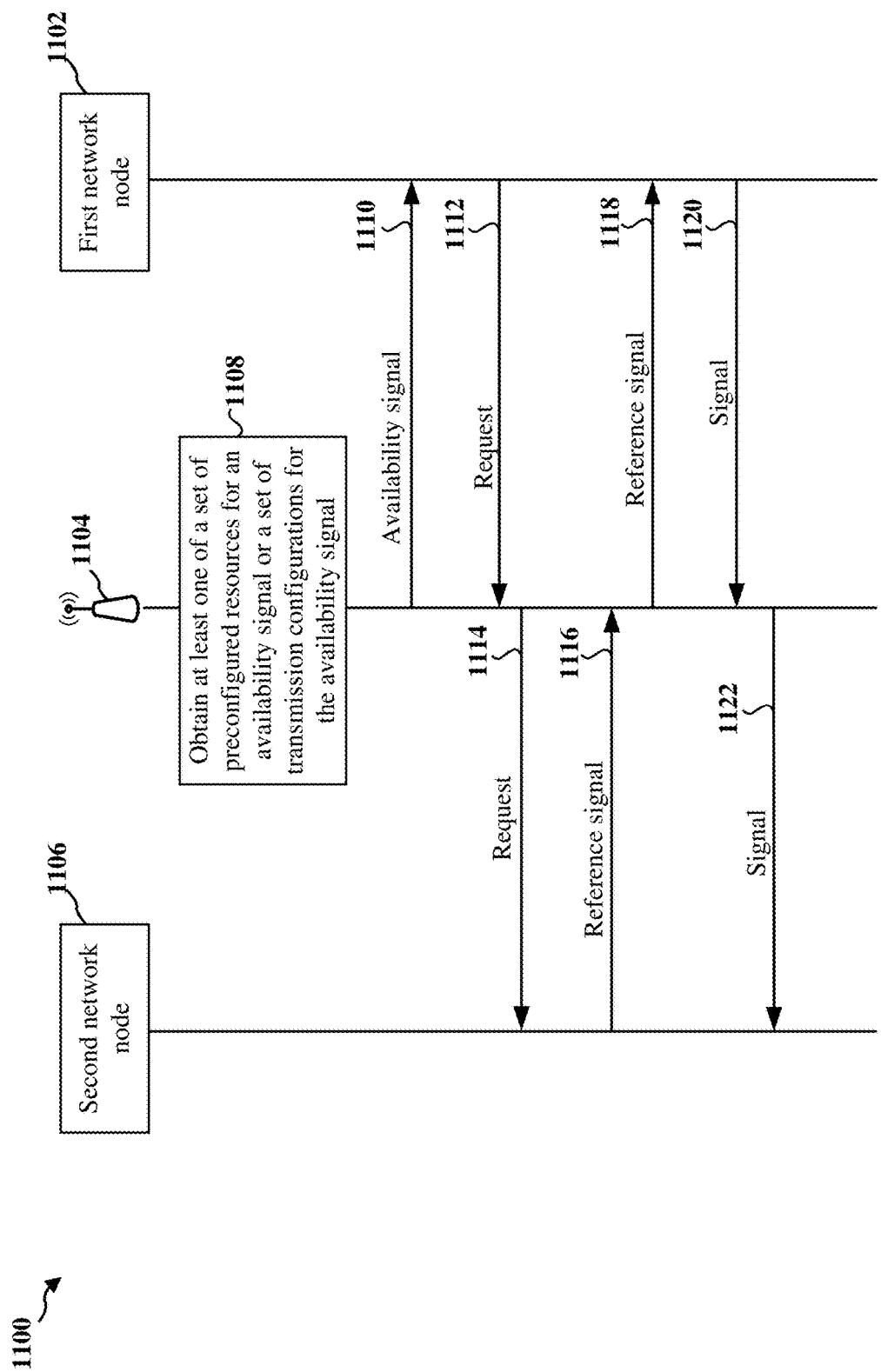
FIG. 11 illustrates a signal flow diagram in accordance with various aspects of the disclosure.

FIG. 11 illustrates a signal flow diagram 1100 in accordance with various aspects of the disclosure. The signal flow diagram 1100 includes a first network node 1102, an assisting node 1104, and a second network node 1106. In some examples, the first network node 1102 may be the network node 402 in FIG. 4, the assisting node 1104 may be the third assisting node 410 in FIG. 4, and the second network node 1106 may be the network node 434 in FIG. 4.

At 1108, the assisting node 1104 may obtain at least one of a set of preconfigured resources (e.g., time-frequency resources) for an availability signal or a set of transmission configurations for the availability signal. The assisting node 1104 may transmit an availability signal 1110 based on the set of preconfigured resources and/or the set of transmission configurations. For example, the availability signal 1110 may be the availability signal 428 in FIG. 4.

The first network node 1102 may receive the availability signal 1110 and may transmit a request signal 1112 to the second network node 1106 in response to the availability signal 1110. For example, the request signal 1112 may request the second network node 1106 to transmit a reference signal in a specific direction (e.g., toward the assisting node 1104). The assisting node 1104 may provide the request signal 1112 to the second network node 1106 (e.g., via the request signal 1114 in FIG. 11) and may listen for the requested reference signal. The second network node 1106 may transmit a reference signal 1116 toward the assisting node 1104. The assisting node 1104 may receive the reference signal 1116 and may transmit the reference signal 1116 to the first network node 1102 (e.g., via the reference signal 1118 in FIG. 11). If the first network node 1102 receives the reference signal 1118, the first network node 1102 may determine that the first network node 1102 may communicate with the second network node 1106 through the assisting node 1104.

As shown in FIG. 11, the first network node 1102 may transmit a signal 1120 intended for the second network node 1106 toward the assisting node 1004. For example, the assisting node 1104 may receive the signal 1120 from the network node 1102, may regenerate the signal 1120 to obtain the signal 1122, and may transmit the signal 1122 in the direction of the second network node 1106.

Referring back to FIG. 4, in some aspects of the disclosure, the first network node (e.g., the network node 402 in FIG. 4) may receive an availability signal from an assisting node (e.g., the third assisting node 410 in FIG. 4) and may provide an identifier (ID) and one or more wireless communication configurations of the assisting node to a second network node (e.g., the network node 434 in FIG. 4).

In some aspects of the disclosure, an assisting node, such as a network-controlled intelligent node, may receive a command from a network node to transmit one or more off-sync raster SSBs in response to an availability signal from the assisting node. The assisting node may transmit (e.g., broadcast) the one or more off-sync raster SSBs. In some aspects of the disclosure, the assisting node (e.g., a network-controlled intelligent assisting node associated with a control node) may be in a power-saving mode, an idle mode or an inactive mode, while transmitting the off-sync raster SSBs. When the assisting node is needed by a network node, the assisting node may be notified (e.g., with a paging signal, wake-up signal or other appropriate signal) to enter an active mode and follow instructions from the control node.

One or more UEs may be configured to perform radio resource management (RRM) measurements (e.g., reference signal received power (RSRP) measurements) on the off-sync raster SSBs. For example, the UEs may be configured to measure the off-sync raster SSBs with SSB measurement time configuration (SMTC) information, which may provide the UEs with a configuration and windows (e.g., time windows) for searching for the off-sync raster SSBs. It should be understood that the UEs may not attempt to use the off-sync raster SSBs from the assisting node for initial access to the wireless communication network. For example, the UEs may already be connected to the wireless communication network when measuring the off-sync raster SSBs. The UEs may report the measurements to the wireless communication network (e.g., to a network node serving the cell in which the UE is located).

The wireless communication network may use the reported measurements to determine a suitable candidate assisting node for a UE. For example, the wireless communication network may determine that an assisting node is a suitable candidate when the reported RRM measurements of the off-sync raster SSBs from an assisting node exceed a threshold. If a suitable candidate assisting node is found, the wireless communication network can configure the candidate assisting node to assist with communications between a UE and a network node. The network node serving the UE may send a command to the assisting node to transmit one or more reference signals based on a configuration of the network node and/or an identifier (ID) of the network node. The assisting node may then transmit the one or more reference signals, such as an SSB, CSI-RS or other suitable reference signal, on resources (e.g., time-frequency resources) where the UE is configured to perform channel/beam measurements. The UE may measure the one or more reference signals from the assisting node and may report the measurements to the network node. In some examples, if the reported measurements from the UE exceed a threshold, the serving beam of the UE may be changed such that the UE is effectively served by the assisting node.

Figure 12:
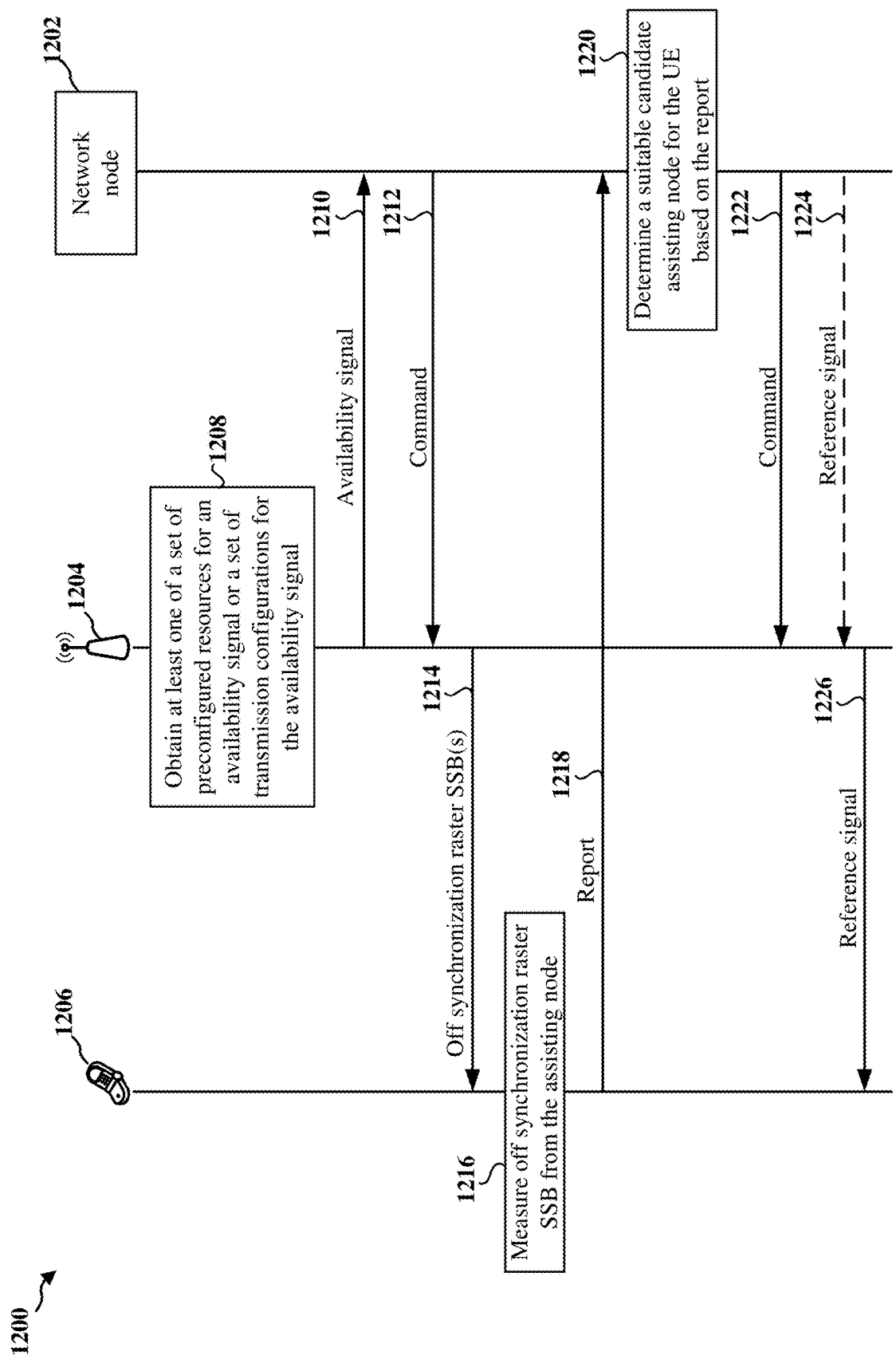
FIG. 12 illustrates a signal flow diagram in accordance with various aspects of the disclosure.

FIG. 12 illustrates a signal flow diagram 1200 in accordance with various aspects of the disclosure. The signal flow diagram 1200 includes a network node 1202, an assisting node 1204, and a UE 1206. In some examples, the network node 1202 may be the network node 402 in FIG. 4, the assisting node 1204 may be the third assisting node 410 in FIG. 4, and the UE 1206 may be the UE 414 in FIG. 4.

At 1208, the assisting node 1204 may obtain at least one of a set of preconfigured resources (e.g., time-frequency resources) for an availability signal or a set of transmission configurations for the availability signal. The assisting node 1204 may transmit an availability signal 1210 based on the set of preconfigured resources and/or the set of transmission configurations. For example, the availability signal 1210 may be the availability signal 428 in FIG. 4. The network node 1202 may receive the availability signal 1210 and may transmit a command signal 1212 including a command to transmit one or more off-sync raster SSBs in response to the availability signal 1210 from the assisting node 1204. The assisting node 1204 may transmit (e.g., broadcast) one or more off-sync raster SSBs 1214 in response to the command signal 1212. The UE 1206 may be configured to measure the one or more of the off-synchronization raster SSBs 1214 from the assisting node 1204. For example, the UE 1206 may perform radio resource management (RRM) measurements (e.g., reference signal received power (RSRP) measurements) on the one or more off-sync raster SSBs 1214.

The UE 1206 may report a measurement of at least one off-sync raster SSB 1214 to the network node 1202. At 1220, the network node 1202 may determine a suitable candidate assisting node for the UE 1206 based on the report 1218. For example, the network node 1202 may determine that the assisting node 1204 is a suitable candidate for the UE 1206 if the reported RRM measurements of the off-sync raster SSBs 1214 exceed a threshold. If the network node 1202 determines that the assisting node 1202 is a suitable candidate for assisting the UE 1206, the network node 1202 may configure the assisting node 1204 to assist with communications between the UE 1206 and the network node 1202. In some examples, the network node 1202 may transmit a command signal 1222 to the assisting node 1204 to transmit one or more reference signals based on a configuration of the network node 1202 and/or an identifier of the network node 1202. The assisting node 1204 may transmit one or more reference signals 1226 in response to the command signal 1222, such as an SSB, CSI-RS or other suitable reference signal, on resources (e.g., time-frequency resources) where the UE 1206 is configured to perform channel/beam measurements. In some examples, the one or more reference signals 1226 may be received from the network node 1202 (e.g., via the one or more reference signals 1224 from the network node 1202).

In some aspects of the disclosure, the UE 1206 may measure the one or more reference signals 1226 from the assisting node 1204 and may report the measurements to the network node 1202. In some examples, if the reported measurements from the UE 1202 exceed a threshold, the serving beam of the UE 1206 may be changed such that the UE 1202 is effectively served by the assisting node 1204.

Figure 13:
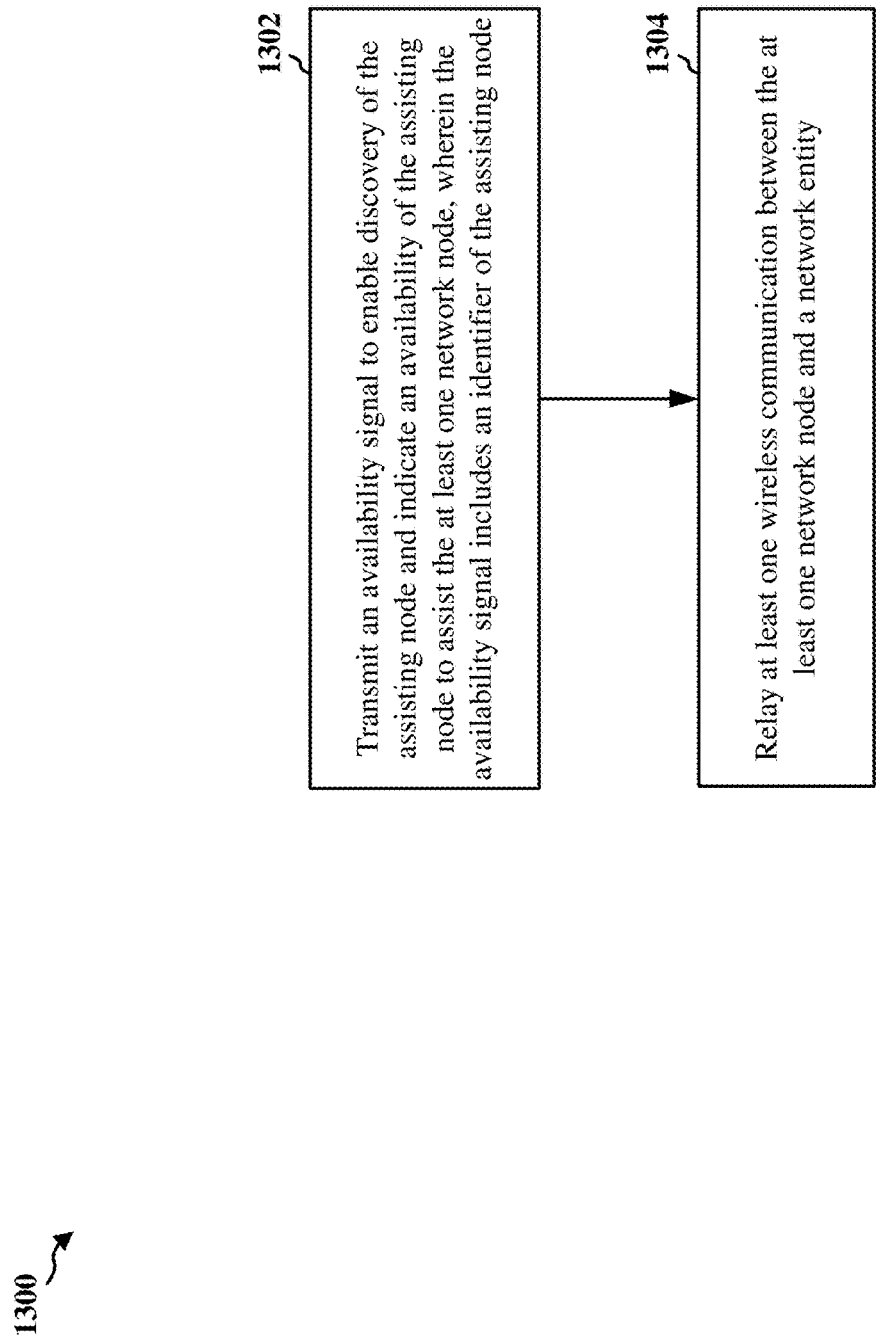
FIG. 13 is a flowchart of a method of wireless communication for an assisting node in accordance with various aspects of the disclosure.

FIG. 13 is a flowchart 1300 of a method of wireless communication in accordance with various aspects of the disclosure. The method may be performed by an assisting node (e.g., the assisting node 406, 408, 410, 504, 604, 704, 804, 904, 1004, 1104, 1204; the apparatus 2202/2202'; the processing system 2314, which may include a memory and which may be the entire assisting node 406, 408, 410, 504, 604, 704, 804, 904, 1004, 1104, 1204 or a component of the assisting node 406, 408, 410, 504, 604, 704, 804, 904, 1004, 1104, 1204, such as a TX processor, RX processor, and/or a controller/processor).

At 1302, the assisting node transmits an availability signal to enable discovery of the assisting node and indicate an availability of the assisting node to assist the at least one network node. The availability signal includes an identifier of the assisting node. In some examples, the availability signal may be the availability signal 510, 610, 710, 810, 910, 1010, 1110, 1210, and the network node may be the network node 502, 602, 702, 802, 902, 1002, 1102, 1202. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the assisting node may obtain a set of preconfigured time-frequency resources or a set of transmission configurations and may transmit the availability signal based on at least one of the set of preconfigured time-frequency resources or the set of transmission configurations. In some examples, the set of preconfigured time-frequency resources and/or the set of transmission configurations for the availability signal may be preconfigured at the assisting node, may be indicated to the assisting node by an entity in the wireless communication network, or may be specified in a standard specification implemented by an assisting node. In some examples, the availability of the assisting node is indicated by information included in the availability signal. For example, the information includes an availability parameter set to a first value (e.g., '1') when the assisting node is available to assist the at least one network node or a second value (e.g., '0') when the assisting node is unavailable to assist the at least one network node. In some examples, the assisting node periodically transmits the availability signal until the assisting node is associated with the at least one network node.

In some aspects of the disclosure, the availability signal includes at least one of information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

Finally, at 1304, the assisting node relays at least one wireless communication between the at least one network node and a network entity. In some examples, the network entity may be a second network node (e.g., a base station, UE). In some examples, the at least one wireless communication may include a signal (e.g., a downlink (DL) signal, an uplink (UL), a sidelink signal) intended for the network entity, and the assisting node may relay (e.g., forward) the at least one wireless communication by transmitting the signal intended for the network entity. In some examples, the signal may be a synchronization signal. In some examples, the at least one wireless communication may include the signal 512, 614, 724, 830, 930, 1018, 1120.

Figure 14:
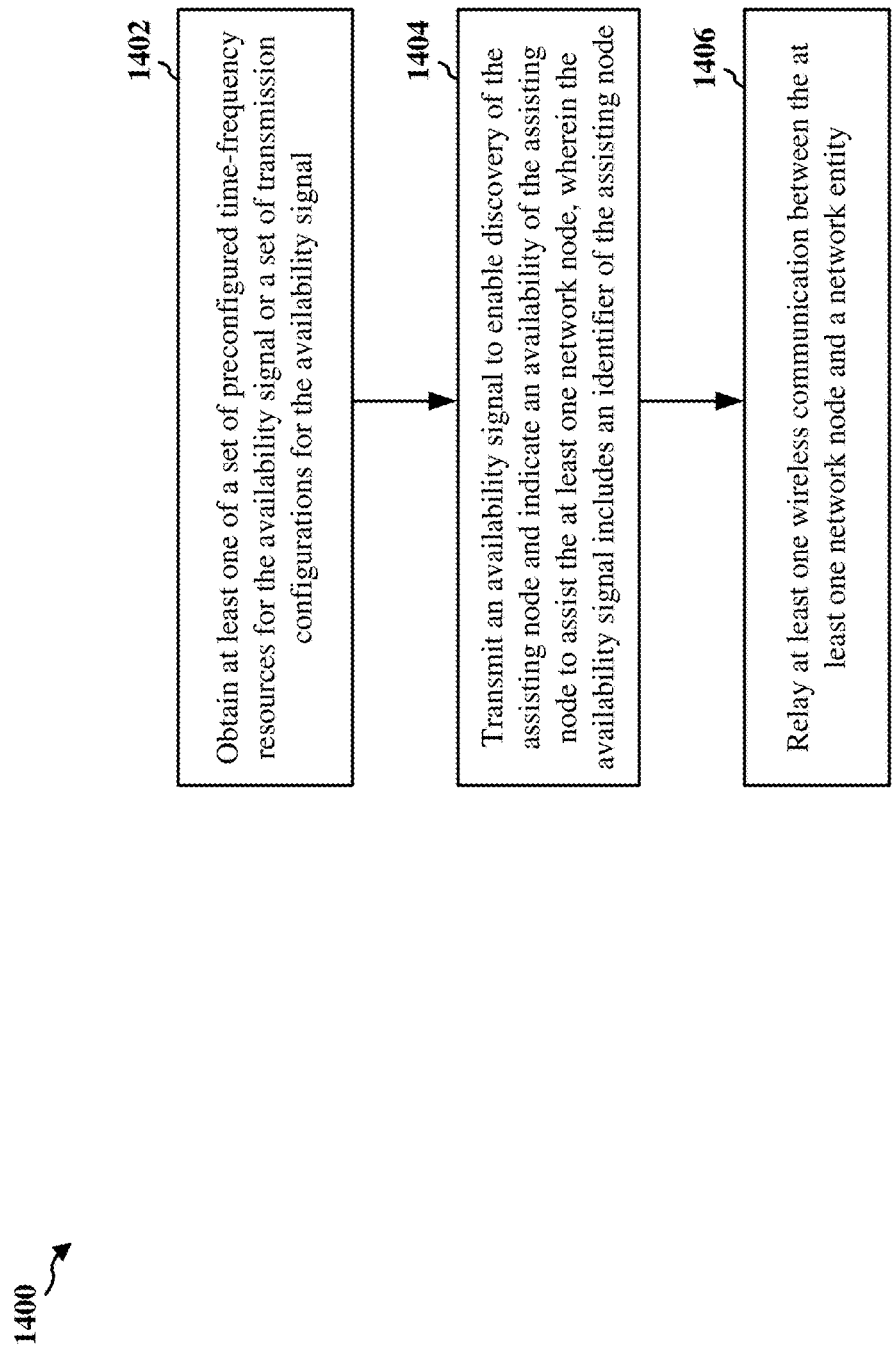
FIG. 14 is a flowchart of a method of wireless communication for an assisting node in accordance with various aspects of the disclosure.

FIG. 14 is a flowchart 1400 of a method of wireless communication in accordance with various aspects of the disclosure. The method may be performed by an assisting node (e.g., the assisting node 406, 408, 410, 504, 604, 704, 804, 904, 1004, 1104, 1204; the apparatus 2202/2202'; the processing system 2314, which may include a memory and which may be the entire assisting node 406, 408, 410, 504, 604, 704, 804, 904, 1004, 1104, 1204 or a component of the assisting node 406, 408, 410, 504, 604, 704, 804, 904, 1004, 1104, 1204, such as a TX processor, RX processor, and/or a controller/processor).

At 1402, the assisting node obtains at least one of a set of preconfigured time-frequency resources for the availability signal or a set of transmission configurations for the availability signal. In some examples, the assisting node may obtain the set of preconfigured time-frequency resources and/or the set of transmission configurations for the availability signal from preconfigured information at the assisting node, an indication to the assisting node by an entity in the wireless communication network, or from information specified in a standard specification implemented by the assisting node.

At 1404, the assisting node transmits an availability signal to enable discovery of the assisting node and indicate an availability of the assisting node to assist the at least one network node. The availability signal includes an identifier of the assisting node. In some examples, the availability signal may be the availability signal 510, 610, 710, 810, 910, 1010, 1110, 1210, and the network node may be the network node 502, 602, 702, 802, 902, 1002, 1102, 1202. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the availability of the assisting node is indicated by information included in the availability signal. For example, the information includes an availability parameter set to a first value (e.g., '1') when the assisting node is available to assist the at least one network node or a second value (e.g., '0') when the assisting node is unavailable to assist the at least one network node. In some examples, the assisting node periodically transmits the availability signal until the assisting node is associated with the at least one network node.

In some aspects of the disclosure, the availability signal includes at least one of information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

Finally, at 1406, the assisting node relays at least one wireless communication between the at least one network node and a network entity. In some examples, the network entity may be a second network node (e.g., a base station, a UE). In some examples, the at least one wireless communication may include a signal (e.g., a downlink (DL) signal, an uplink (UL), a sidelink signal) intended for the network entity, and the assisting node may relay (e.g., forward) the at least one wireless communication by transmitting the signal intended for the network entity. In some examples, the signal may be a synchronization signal. In some examples, the at least one wireless communication may include the signal 512, 614, 724, 830, 930, 1018, 1120.

Figure 15:
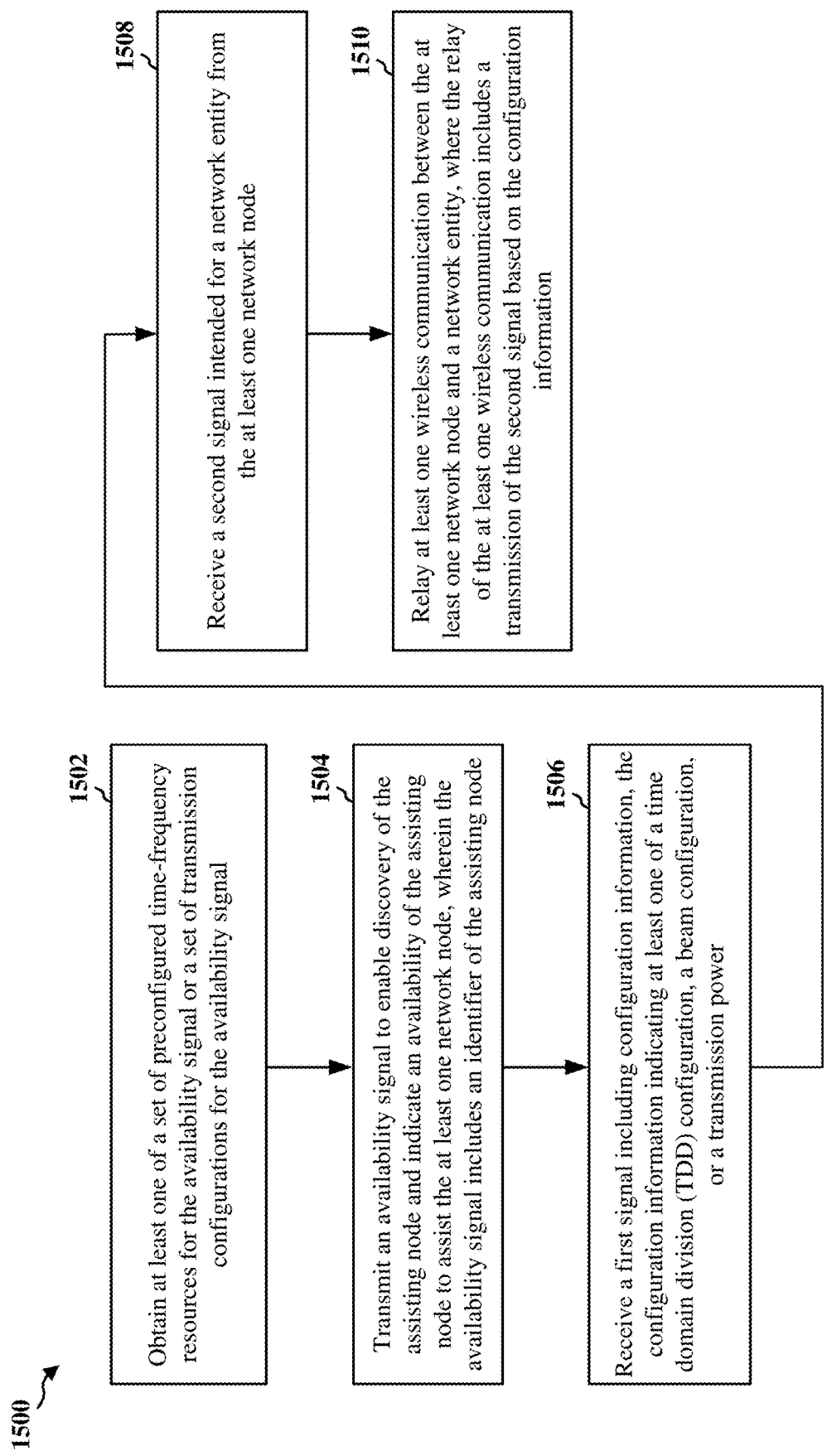
FIG. 15 is a flowchart of a method of wireless communication for an assisting node in accordance with various aspects of the disclosure.

FIG. 15 is a flowchart 1500 of a method of wireless communication in accordance with various aspects of the disclosure. The method may be performed by an assisting node (e.g., the assisting node 604; the apparatus 2202/2202'; the processing system 2314, which may include a memory and which may be the entire assisting node 604 or a component of the assisting node 604, such as a TX processor, RX processor, and/or a controller/processor).

At 1502, the assisting node obtains at least one of a set of preconfigured time-frequency resources for the availability signal or a set of transmission configurations for the availability signal. In some examples, the assisting node may obtain the set of preconfigured time-frequency resources and/or the set of transmission configurations for the availability signal from preconfigured information at the assisting node, an indication to the assisting node by an entity in the wireless communication network, or from information specified in a standard specification implemented by the assisting node.

At 1504, the assisting node transmits an availability signal to enable discovery of the assisting node and indicate an availability of the assisting node to assist the at least one network node. The availability signal includes an identifier of the assisting node. In some examples, with reference to FIG. 6, the availability signal may be the availability signal 610, and the network node may be the network node 602. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the availability of the assisting node is indicated by information included in the availability signal. For example, the information includes an availability parameter set to a first value (e.g., '1') when the assisting node is available to assist the at least one network node or a second value (e.g., '0') when the assisting node is unavailable to assist the at least one network node. In some examples, the assisting node periodically transmits the availability signal until the assisting node is associated with the at least one network node.

In some aspects of the disclosure, the availability signal includes at least one of information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 1506, the assisting node receives a first signal including configuration information. The configuration information indicates at least one of a time domain division (TDD) configuration, a beam configuration, or a transmission power. For example, the first signal may be the configuration signal 612 described with reference to FIG. 6.

At 1508, the assisting node receives a second signal intended for a network entity from the at least one network node. In some examples, the second signal may be the signal 614 described with reference to FIG. 6.

Finally, at 1510, the assisting node relays at least one wireless communication between the at least one network node and a network entity, where the relay of the at least one wireless communication includes a transmission of the second signal based on the configuration information. In some examples, the network entity may be a second network node (e.g., a base station, a UE). In some examples, the at least one wireless communication may include a signal (e.g., a downlink (DL) signal, an uplink (UL), a sidelink signal) intended for the network entity, and the assisting node may relay (e.g., forward) the at least one wireless communication by transmitting the signal intended for the network entity. In some examples, the signal may be a synchronization signal. In some examples, the at least one wireless communication may include the signal 614 in FIG. 6.

Figure 16:
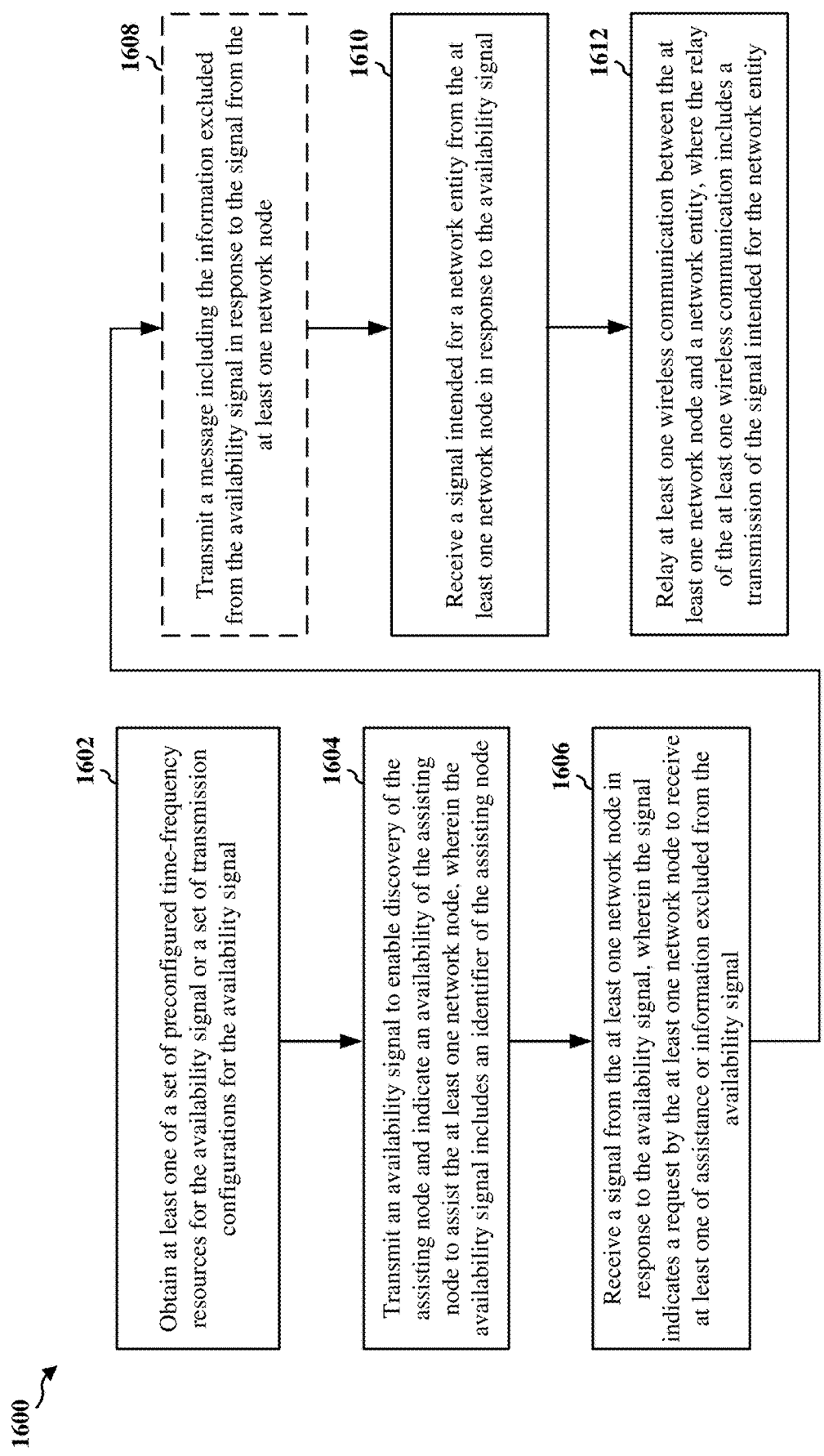
FIG. 16 is a flowchart of a method of wireless communication for an assisting node in accordance with various aspects of the disclosure.

FIG. 16 is a flowchart 1600 of a method of wireless communication in accordance with various aspects of the disclosure. The method may be performed by an assisting node (e.g., the assisting node 704; the apparatus 2202/2202'; the processing system 2314, which may include a memory and which may be the entire assisting node 704 or a component of the assisting node 704, such as a TX processor, RX processor, and/or a controller/processor). In FIG. 16, operations indicated with dashed lines indicate optional operations.

At 1602, the assisting node obtains at least one of a set of preconfigured time-frequency resources for the availability signal or a set of transmission configurations for the availability signal. In some examples, the assisting node may obtain the set of preconfigured time-frequency resources and/or the set of transmission configurations for the availability signal from preconfigured information at the assisting node, an indication to the assisting node by an entity in the wireless communication network, or from information specified in a standard specification implemented by the assisting node.

At 1604, the assisting node transmits an availability signal to enable discovery of the assisting node and indicate an availability of the assisting node to assist the at least one network node, wherein the availability signal includes an identifier of the assisting node. The availability signal includes an identifier of the assisting node. In some examples, with reference to FIG. 7, the availability signal may be the availability signal 710, and the network node may be the network node 702. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the availability of the assisting node is indicated by information included in the availability signal. For example, the information includes an availability parameter set to a first value (e.g., '1') when the assisting node is available to assist the at least one network node or a second value (e.g., '0') when the assisting node is unavailable to assist the at least one network node. In some examples, the assisting node periodically transmits the availability signal until the assisting node is associated with the at least one network node.

In some aspects of the disclosure, the availability signal includes at least one of information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 1606, the assisting node receives a signal from the at least one network node in response to the availability signal, wherein the signal indicates a request by the at least one network node to receive at least one of assistance or information excluded from the availability signal. In some examples, the signal may be the request signal 712 previously described with reference to FIG. 7.

At 1608, the assisting node transmits a message including the information excluded from the availability signal in response to the signal from the at least one network node. In some examples, the message including the information excluded from the availability signal may be the message 713 previously described with reference to FIG. 7. For example, the information may include one or more wireless communication configurations of the assisting node.

At 1610, the assisting node receives a signal intended for a network entity from the at least one network node in response to the availability signal. In some examples, the signal intended for the network entity may be the signal 724 described with reference to FIG. 7.

Finally, at 1612, the assisting node relays at least one wireless communication between the at least one network node and a network entity, where the relay of the at least one wireless communication includes a transmission of the signal intended for the network entity. In some examples, the signal may be a synchronization signal. In some examples, the signal intended for the network entity may include the signal 724 in FIG. 7.

Figure 17:
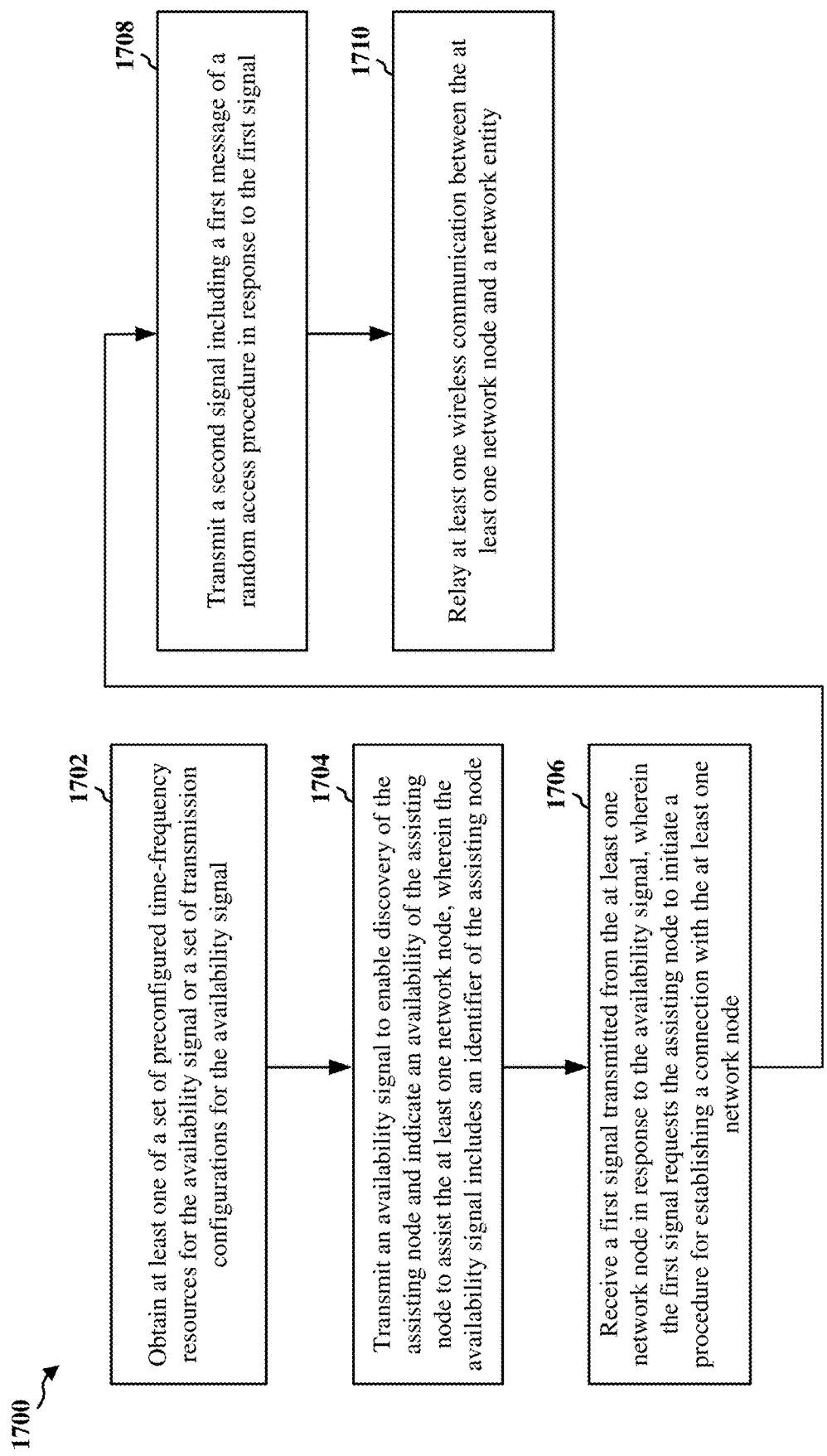
FIG. 17 is a flowchart of a method of wireless communication for an assisting node in accordance with various aspects of the disclosure.

FIG. 17 is a flowchart 1700 of a method of wireless communication in accordance with various aspects of the disclosure. The method may be performed by an assisting node (e.g., the assisting node 704, 804, 904; the apparatus 2202/2202'; the processing system 2314, which may include a memory and which may be the entire assisting node 704, 804, 904 or a component of the assisting node 704, 804, 904, such as a TX processor, RX processor, and/or a controller/processor).

At 1702, the assisting node obtains at least one of a set of preconfigured time-frequency resources for the availability signal or a set of transmission configurations for the availability signal. In some examples, the assisting node may obtain the set of preconfigured time-frequency resources and/or the set of transmission configurations for the availability signal from preconfigured information at the assisting node, an indication to the assisting node by an entity in the wireless communication network, or from information specified in a standard specification implemented by the assisting node.

At 1704, the assisting node transmits an availability signal to enable discovery of the assisting node and indicate an availability of the assisting node to assist the at least one network node. The availability signal includes an identifier of the assisting node. In some examples, with reference to FIGS. 7-9, the availability signal may be the availability signal 710, 812, 912 and the network node may be the network node 702, 802, 902. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the assisting node may obtain a set of preconfigured time-frequency resources or a set of transmission configurations and may transmit the availability signal based on at least one of the set of preconfigured time-frequency resources or the set of transmission configurations. In some examples, the set of preconfigured time-frequency resources and/or the set of transmission configurations for the availability signal may be preconfigured at the assisting node, may be indicated to the assisting node by an entity in the wireless communication network, or may be specified in a standard specification implemented by an assisting node. In some examples, the availability of the assisting node is indicated by information included in the availability signal. For example, the information includes an availability parameter set to a first value (e.g., '1') when the assisting node is available to assist the at least one network node or a second value (e.g., '0') when the assisting node is unavailable to assist the at least one network node. In some examples, the assisting node periodically transmits the availability signal until the assisting node is associated with the at least one network node.

In some aspects of the disclosure, the availability signal includes at least one of information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 1706, the assisting node receives a first signal transmitted from the at least one network node in response to the availability signal. The first signal requests the assisting node to initiate a procedure for establishing a connection with the at least one network node. In some examples, the first signal may be the request signal 712, 814, 914 previously described with reference to FIGS. 7-9.

At 1708, the assisting node transmits a second signal including a first message of a random access procedure in response to the first signal. In some examples, the second signal may be the signal 714, 820, 920 previously described with reference to FIGS. 7-9.

Finally, at 1710, the assisting node relays at least one wireless communication between the at least one network node and a network entity. In some examples, the network entity may be a second network node (e.g., a base station, UE). In some examples, the at least one wireless communication may include a signal (e.g., a downlink (DL) signal, an uplink (UL), a sidelink signal) intended for the network entity, and the assisting node may relay (e.g., forward) the at least one wireless communication by transmitting the signal intended for the network entity. In some examples, the signal may be a synchronization signal. In some examples, the at least one wireless communication may include the signal 724, 830, 930.

Figure 18:
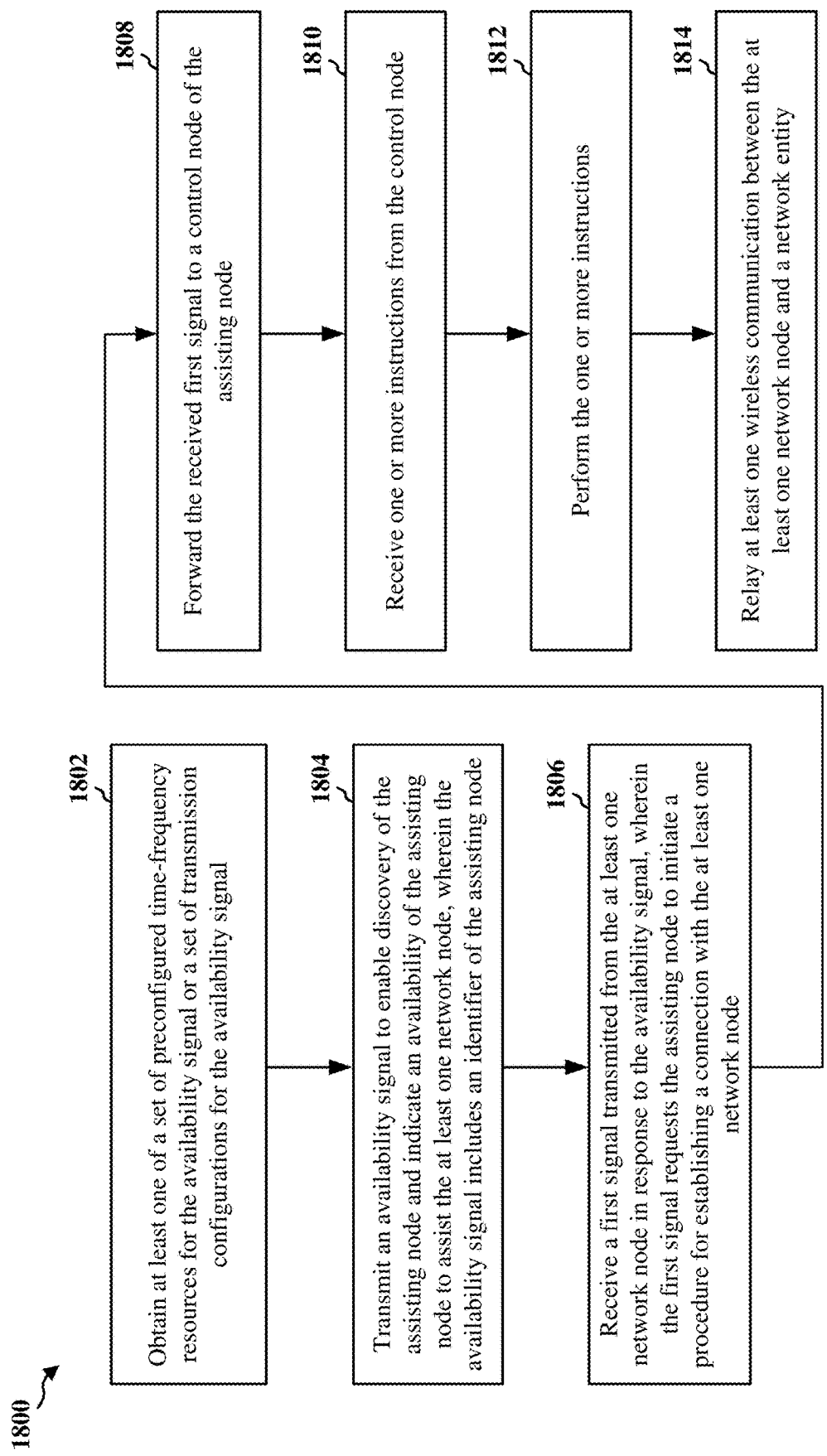
FIG. 18 is a flowchart of a method of wireless communication for an assisting node in accordance with various aspects of the disclosure.

FIG. 18 is a flowchart 1800 of a method of wireless communication in accordance with various aspects of the disclosure. The method may be performed by an assisting node (e.g., the assisting node 804; the apparatus 2202/2202'; the processing system 2314, which may include a memory and which may be the entire assisting node 804 or a component of the assisting node 804, such as a TX processor, RX processor, and/or a controller/processor).

At 1802, the assisting node obtains at least one of a set of preconfigured time-frequency resources for the availability signal or a set of transmission configurations for the availability signal. In some examples, the assisting node may obtain the set of preconfigured time-frequency resources and/or the set of transmission configurations for the availability signal from preconfigured information at the assisting node, an indication to the assisting node by an entity in the wireless communication network, or from information specified in a standard specification implemented by the assisting node.

At 1804, the assisting node transmits an availability signal to enable discovery of the assisting node and indicate an availability of the assisting node to assist the at least one network node. The availability signal includes an identifier of the assisting node. In some examples, with reference to FIG. 8, the availability signal may be the availability signal 812 and the network node may be the network node 802. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the assisting node may obtain a set of preconfigured time-frequency resources or a set of transmission configurations and may transmit the availability signal based on at least one of the set of preconfigured time-frequency resources or the set of transmission configurations. In some examples, the set of preconfigured time-frequency resources and/or the set of transmission configurations for the availability signal may be preconfigured at the assisting node, may be indicated to the assisting node by an entity in the wireless communication network, or may be specified in a standard specification implemented by an assisting node. In some examples, the availability of the assisting node is indicated by information included in the availability signal. For example, the information includes an availability parameter set to a first value (e.g., '1') when the assisting node is available to assist the at least one network node or a second value (e.g., '0') when the assisting node is unavailable to assist the at least one network node. In some examples, the assisting node periodically transmits the availability signal until the assisting node is associated with the at least one network node.

In some aspects of the disclosure, the availability signal includes at least one of information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 1806, the assisting node receives a first signal transmitted from the at least one network node in response to the availability signal. The first signal requests the assisting node to initiate a procedure for establishing a connection with the at least one network node. In some examples, the first signal may be the request signal 814 previously described with reference to FIG. 8.

At 1808, the assisting node forwards the received first signal to a control node of the assisting node. For example, with reference to FIG. 8, the assisting node 804 may forward the request signal 814 by regenerating the request signal to obtain a request signal 816, and transmitting the request signal 816 to the control node 806.

At 1810, the assisting node receives one or more instructions from the control node. For example, with reference to FIG. 8, the assisting node 804 may receive the one or more instructions 818 from the control node 806.

At 1812, the assisting node performs the one or more instructions. For example, with reference to FIG. 8, the one or more instructions 818 may instruct the assisting node 804 to initiate a four-step RACH procedure with the network node 802. The assisting node 804 may initiate the RACH procedure 828 by transmitting the signal 820 including message 1 of the RACH procedure 828.

Finally, at 1814, the assisting node relays at least one wireless communication between the at least one network node and a network entity. For example, with reference to FIG. 8, the assisting node 804 may regenerate the signal 830 from the network node 802 to obtain the signal 832, and may transmit the signal 832 in the direction of the UE 808.

Figure 19:
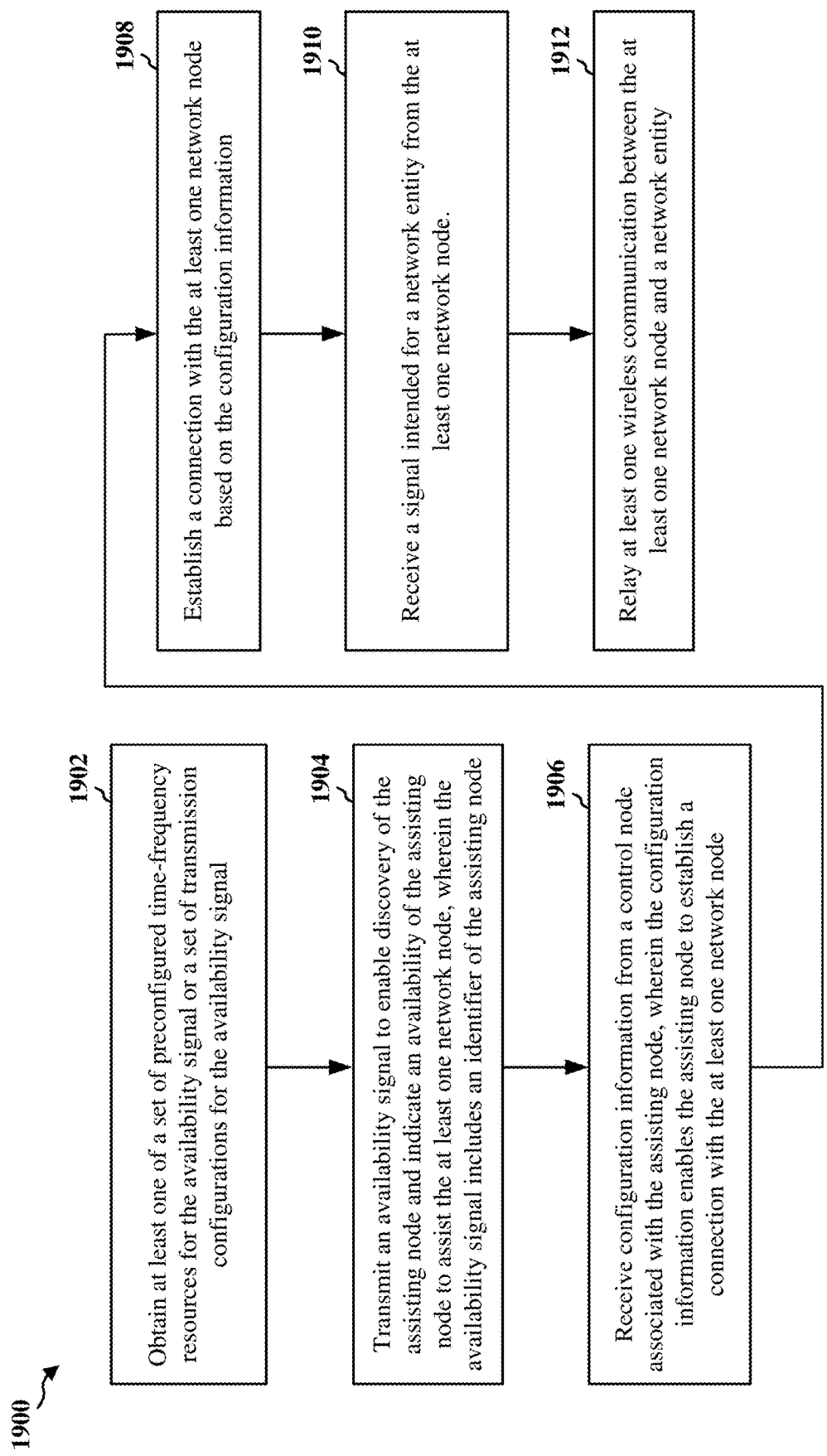
FIG. 19 is a flowchart of a method of wireless communication for an assisting node in accordance with various aspects of the disclosure.

FIG. 19 is a flowchart 1900 of a method of wireless communication in accordance with various aspects of the disclosure. The method may be performed by an assisting node (e.g., the assisting node 904; the apparatus 2202/2202'; the processing system 2314, which may include a memory and which may be the entire assisting node 904 or a component of the assisting node 904, such as a TX processor, RX processor, and/or a controller/processor).

At 1902, the assisting node obtains at least one of a set of preconfigured time-frequency resources for the availability signal or a set of transmission configurations for the availability signal. In some examples, the assisting node may obtain the set of preconfigured time-frequency resources and/or the set of transmission configurations for the availability signal from preconfigured information at the assisting node, an indication to the assisting node by an entity in the wireless communication network, or from information specified in a standard specification implemented by the assisting node.

At 1904, the assisting node transmits an availability signal to enable discovery of the assisting node and indicate an availability of the assisting node to assist the at least one network node. The availability signal includes an identifier of the assisting node. In some examples, with reference to FIG. 9, the availability signal may be the availability signal 912 and the network node may be the network node 902. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the assisting node may obtain a set of preconfigured time-frequency resources or a set of transmission configurations and may transmit the availability signal based on at least one of the set of preconfigured time-frequency resources or the set of transmission configurations. In some examples, the set of preconfigured time-frequency resources and/or the set of transmission configurations for the availability signal may be preconfigured at the assisting node, may be indicated to the assisting node by an entity in the wireless communication network, or may be specified in a standard specification implemented by an assisting node. In some examples, the availability of the assisting node is indicated by information included in the availability signal. For example, the information includes an availability parameter set to a first value (e.g., '1') when the assisting node is available to assist the at least one network node or a second value (e.g., '0') when the assisting node is unavailable to assist the at least one network node. In some examples, the assisting node periodically transmits the availability signal until the assisting node is associated with the at least one network node.

In some aspects of the disclosure, the availability signal includes at least one of information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 1906, the assisting node receives configuration information from a control node associated with the assisting node. The configuration information enables the assisting node to establish a connection with the at least one network node. For example, the assisting node 904 may receive the message 918 including configuration information from the control node 906. The configuration information in the message 918 may enable the assisting node 904 to establish a connection with the network node 902.

At 1908, the assisting node establishes a connection with the at least one network node based on the configuration information. For example, with reference to FIG. 9, the assisting node 904 may initiate a four-step RACH procedure with the network node 902 to establish a connection with the network node 902. The assisting node 904 may initiate the RACH procedure 928 by transmitting the signal 920 including message 1 of the RACH procedure 928.

At 1910, the assisting node receives a signal intended for a network entity from the at least one network node. For example, with reference to FIG. 9, the signal may be the signal 930 received from the network node 902.

Finally, at 1912, the assisting node relays at least one wireless communication between the at least one network node and a network entity. For example, with reference to FIG. 9, the assisting node 904 may relay the signal 930 by regenerating the signal 930 received from the network node 902 to obtain the signal 932, and transmitting the signal 932 in the direction of the UE 908.

Figure 20:
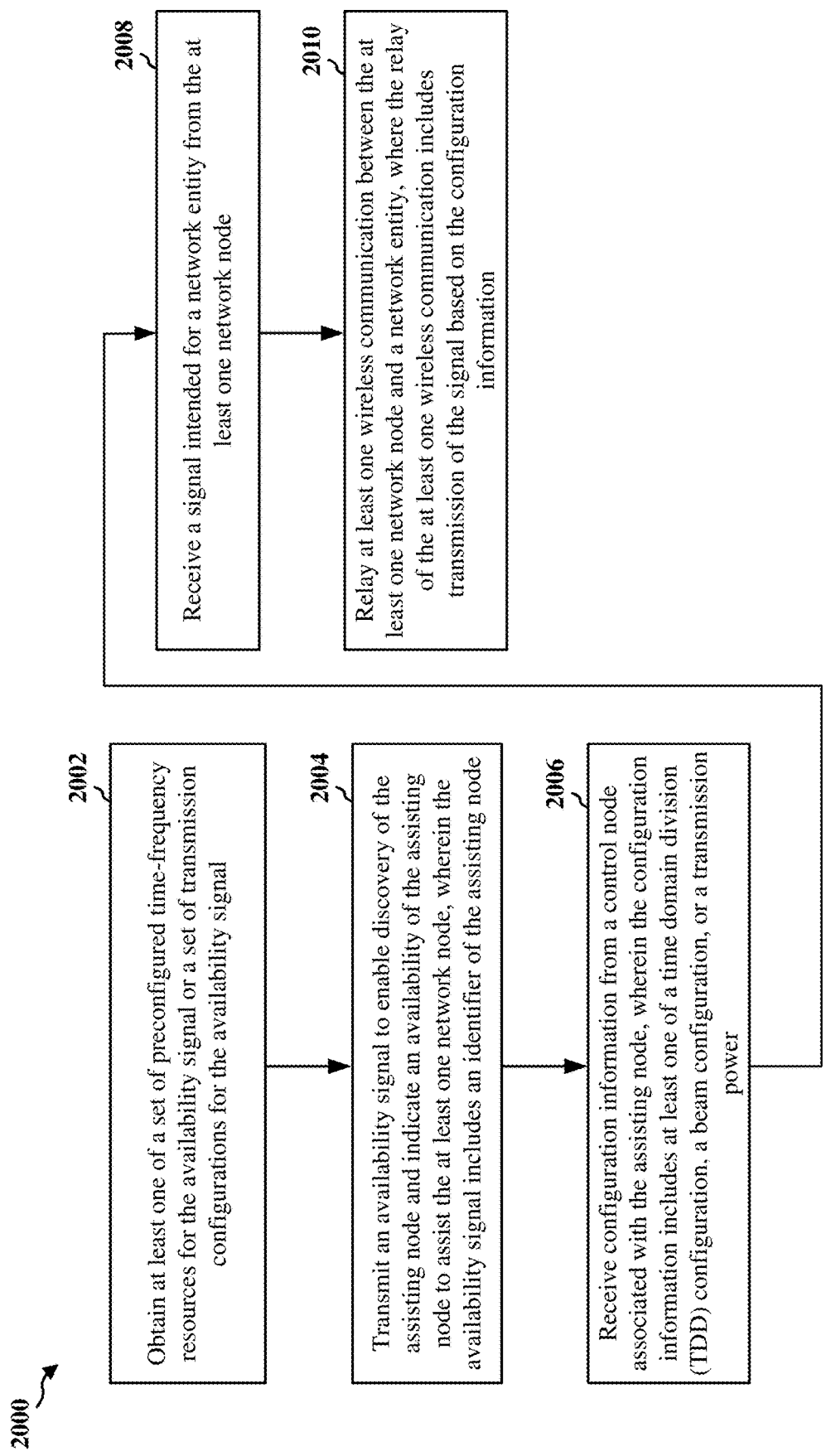
FIG. 20 is a flowchart of a method of wireless communication for an assisting node in accordance with various aspects of the disclosure.

FIG. 20 is a flowchart 2000 of a method of wireless communication in accordance with various aspects of the disclosure. The method may be performed by an assisting node (e.g., the assisting node 1004; the apparatus 2202/2202'; the processing system 2314, which may include a memory and which may be the entire assisting node 1004 or a component of the assisting node 1004, such as a TX processor, RX processor, and/or a controller/processor).

At 2002, the assisting node obtains at least one of a set of preconfigured time-frequency resources for the availability signal or a set of transmission configurations for the availability signal. In some examples, the assisting node may obtain the set of preconfigured time-frequency resources and/or the set of transmission configurations for the availability signal from preconfigured information at the assisting node, an indication to the assisting node by an entity in the wireless communication network, or from information specified in a standard specification implemented by the assisting node.

At 2004, the assisting node transmits an availability signal to enable discovery of the assisting node and indicate an availability of the assisting node to assist the at least one network node, wherein the availability signal includes an identifier of the assisting node. In some examples, with reference to FIG. 10, the availability signal may be the availability signal 1012 and the network node may be the network node 1002. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the assisting node may obtain a set of preconfigured time-frequency resources or a set of transmission configurations and may transmit the availability signal based on at least one of the set of preconfigured time-frequency resources or the set of transmission configurations. In some examples, the set of preconfigured time-frequency resources and/or the set of transmission configurations for the availability signal may be preconfigured at the assisting node, may be indicated to the assisting node by an entity in the wireless communication network, or may be specified in a standard specification implemented by an assisting node. In some examples, the availability of the assisting node is indicated by information included in the availability signal. For example, the information includes an availability parameter set to a first value (e.g., '1') when the assisting node is available to assist the at least one network node or a second value (e.g., '0') when the assisting node is unavailable to assist the at least one network node. In some examples, the assisting node periodically transmits the availability signal until the assisting node is associated with the at least one network node.

In some aspects of the disclosure, the availability signal includes at least one of information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 2006, the assisting node receives configuration information from a control node associated with the assisting node, wherein the configuration information includes at least one of a time domain division (TDD) configuration, a beam configuration, or a transmission power. For example, the TDD configuration may include a UL/DL pattern. For example, with reference to FIG. 10, the assisting node 1004 may receive the configuration information in the message 1016 from the control node 1006.

At 2008, the assisting node receives a signal intended for a network entity from the at least one network node. For example, with reference to FIG. 10, the signal may be the signal 1018.

Finally, at 2010, the assisting node relays at least one wireless communication between the at least one network node and a network entity, where the relay of the at least one wireless communication includes transmission of the signal based on the configuration information. For example, with reference to FIG. 10, the assisting node 1004 may regenerate the signal 1018 from the network node 1002 to obtain the signal 1020, and may transmit the signal 1020 in the direction of the UE 1008.

Figure 21:
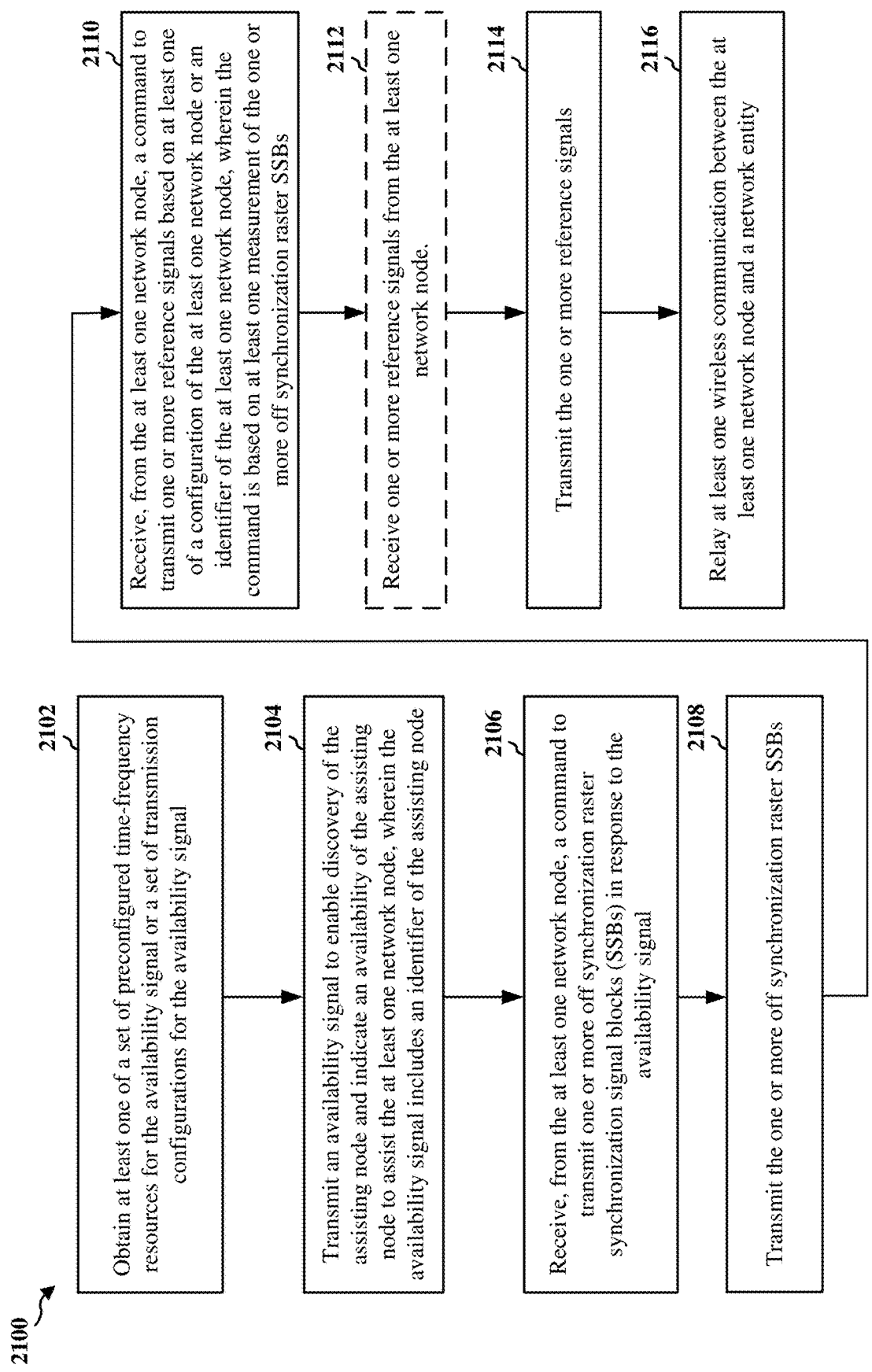
FIG. 21 is a flowchart of a method of wireless communication for an assisting node in accordance with various aspects of the disclosure.

FIG. 21 is a flowchart 2100 of a method of wireless communication in accordance with various aspects of the disclosure. The method may be performed by an assisting node (e.g., the assisting node 1204; the apparatus 2202/ 2202'; the processing system 2314, which may include a memory and which may be the entire assisting node 1204 or a component of the assisting node 1204, such as a TX processor, RX processor, and/or a controller/processor).

At 2102, the assisting node obtains at least one of a set of preconfigured time-frequency resources for the availability signal or a set of transmission configurations for the availability signal. In some examples, the assisting node may obtain the set of preconfigured time-frequency resources and/or the set of transmission configurations for the availability signal from preconfigured information at the assisting node, an indication to the assisting node by an entity in the wireless communication network, or from information specified in a standard specification implemented by the assisting node.

At 2104, the assisting node transmits an availability signal to enable discovery of the assisting node and indicate an availability of the assisting node to assist the at least one network node. The availability signal includes an identifier of the assisting node. In some examples, with reference to FIG. 12, the availability signal may be the availability signal 1210 and the network node may be the network node 1202. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the assisting node may obtain a set of preconfigured time-frequency resources or a set of transmission configurations and may transmit the availability signal based on at least one of the set of preconfigured time-frequency resources or the set of transmission configurations. In some examples, the set of preconfigured time-frequency resources and/or the set of transmission configurations for the availability signal may be preconfigured at the assisting node, may be indicated to the assisting node by an entity in the wireless communication network, or may be specified in a standard specification implemented by an assisting node. In some examples, the availability of the assisting node is indicated by information included in the availability signal. For example, the information includes an availability parameter set to a first value (e.g., '1') when the assisting node is available to assist the at least one network node or a second value (e.g., '0') when the assisting node is unavailable to assist the at least one network node. In some examples, the assisting node periodically transmits the availability signal until the assisting node is associated with the at least one network node.

In some aspects of the disclosure, the availability signal includes at least one of information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 2106, the assisting node receives, from the at least one network node, a command to transmit one or more off-synchronization raster synchronization signal blocks (SSBs) in response to the availability signal. For example, with reference to FIG. 12, the command to transmit one or more off-synchronization raster synchronization signal blocks (SSBs) may be included in the command signal 1212.

At 2108, the assisting node transmits the one or more off-synchronization raster SSBs. For example, as described with reference to FIG. 12, the assisting node 1204 may transmit (e.g., broadcast) one or more off-sync raster SSBs 1214 in response to the command signal 1212.

At 2110, the assisting node receives, from the at least one network node, a command to transmit one or more reference signals based on at least one of a configuration of the at least one network node or an identifier of the at least one network node. The command is based on at least one measurement of the one or more off-synchronization raster SSBs. For example, the command to transmit one or more reference signals may be the command 1222 previously described with reference to FIG. 12.

At 2112, the assisting node receives one or more reference signals from the at least one network node. For example, the one or more reference signals may include an SSB, CSI-RS and/or other suitable reference signals. For example, the at least one network node may include the network node 1202 of FIG. 12.

At 2114, the assisting node transmits the one or more reference signals. In some examples, as described with reference to FIG. 12, the assisting node 1204 may transmit one or more reference signals 1226 in response to the command signal 1222, such as an SSB, CSI-RS or other suitable reference signal, on resources (e.g., time-frequency resources) where the UE 1206 is configured to perform channel/beam measurements.

Finally, at 2116, the assisting node relays at least one wireless communication between the at least one network node and a network entity. The relay of the at least one wireless communication includes transmission of a signal received from the at least one network node (e.g., network node 1202) to the network entity (e.g., the UE 1206) based on the configuration information.

Figure 22:
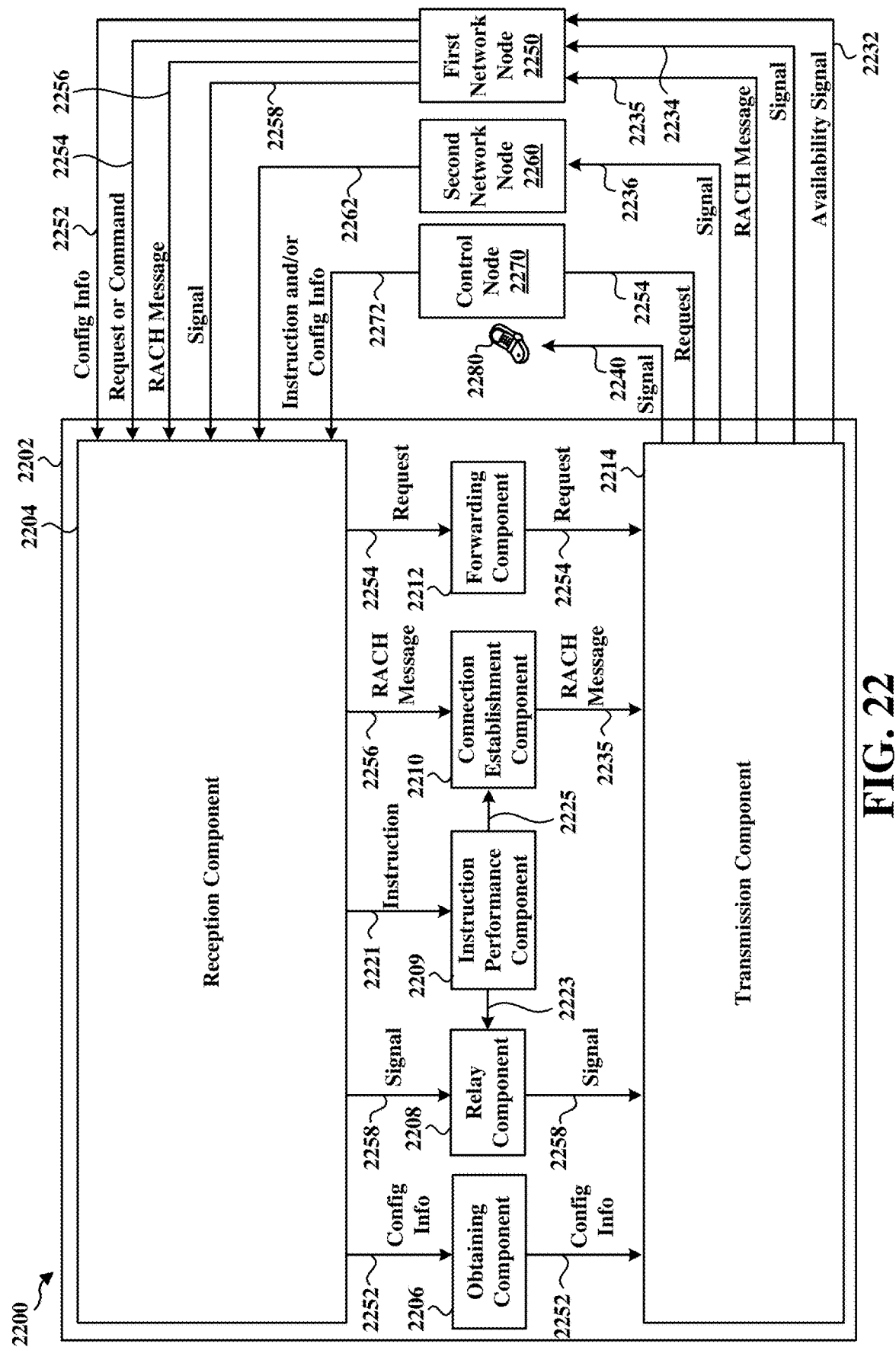
FIG. 22 is a conceptual data flow diagram illustrating the data flow between different means/components in an example apparatus in accordance with various aspects of the disclosure.

FIG. 22 is a conceptual data flow diagram 2200 illustrating the data flow between different means/components in an example apparatus 2202. The apparatus may be an assisting node. The apparatus includes a reception component 2204 that receives a signal 2258 intended for a network entity (e.g., the UE 2280) from the at least one network node (e.g., the first network node 2250) in response to the availability signal 2232, wherein relaying the at least one wireless communication includes transmitting the signal intended for the network entity. The reception component 2204 further receives a signal 2254 from the at least one network node in response to the availability signal, wherein the signal 2254 indicates a request by the at least one network node (e.g., the first network node 2250) to receive at least one of assistance or information excluded from the availability signal 2232.

The reception component 2204 further receives a first signal (e.g., signal 2252) including configuration information, the configuration information indicating at least one of a time domain division (TDD) configuration, a beam configuration, or a transmission power, receives a second signal (e.g., signal 2258) intended for a network entity (e.g., the UE 2280) from the at least one network node, wherein relaying the at least one wireless communication includes transmitting the second signal based on the configuration information. The reception component 2204 further receives a first signal (e.g., signal 2254) transmitted from the at least one network node (e.g., first network node 2250) in response to the availability signal, wherein the first signal requests the apparatus to initiate a procedure for establishing a connection with the at least one network node. The reception component 2204 further receives one or more instructions (e.g., via the signal 2272) from a control node 2270, receives configuration information (e.g., via the signal 2272) from the control node 2270 associated with the apparatus, wherein the configuration information enables the apparatus to establish a connection with the at least one network node.

The reception component 2204 further receives a second signal (e.g., signal 2258) intended for a network entity (e.g., the UE 2280) from the at least one network node, wherein relaying the at least one wireless communication includes transmitting the second signal (e.g., regenerating the signal 2258 to obtain the signal 2240 and transmitting the signal 2240 to the UE 2280). The reception component 2204 further receives configuration information (e.g., via the signal 2272) from the control node 2270 associated with the apparatus, wherein the configuration information includes at least one of a time domain division (TDD) configuration, a beam configuration, or a transmission power.

The reception component 2204 further receives a second signal (e.g., the signal 2258) intended for a network entity (e.g., the UE 2280) from the at least one network node, wherein relaying the at least one wireless communication includes transmitting the second signal (e.g., regenerating the signal 2258 to obtain the signal 2240 and transmitting the signal 2240 to the UE 2280) based on the configuration information. The reception component 2204 further receives, from the at least one network node, a command (e.g., via the signal 2254) to transmit one or more off-synchronization raster synchronization signal blocks (SSBs) in response to the availability signal 2232. The reception component 2204 further receives, from the at least one network node, a command (e.g., via the signal 2254) to transmit one or more reference signals based on at least one of a configuration of the at least one network node or an identifier of the at least one network node, wherein the command is based on at least one measurement of the one or more off-synchronization raster SSBs. The reception component 2204 further receives the one or more reference signals (e.g., via the signal 2258) from the at least one network node. The reception component 2204 further receives a signal 2262 including a reference signal from the second network node 2260.

The apparatus further includes an obtaining component 2206 that obtains at least one of a set of preconfigured time-frequency resources for an availability signal or a set of transmission configurations for the availability signal (e.g., via the signal 2252), wherein the availability signal 2232 is transmitted based on at least one of the set of preconfigured time-frequency resources or the set of transmission configurations.

The apparatus further includes a relay component 2208 that relays at least one wireless communication (e.g., signal 2258) between the at least one network node and a network entity. For example, relay component 2208 may regenerate the signal 2258 to obtain the signal 2240 and may transmit (e.g., via the transmission component) the signal 2240 to the UE 2280.

The apparatus further includes an instruction performance component 2209 that performs one or more instructions (e.g., an instruction from the control node 2270 received via the signal 2221). For example, the instruction performance component 2209 may perform the one or more instructions by operating the relay component via the control signal 2223 and/or by operating the connection establishment component 2210 via the control signal 2225.

The apparatus further includes a connection establishment component 2210 that establishes a connection with the at least one network node (e.g., the first network node 2250) based on the configuration information. For example, the connection establishment component 2210 may receive at least one RACH message in the signal 2256 and may transmit (e.g., via the transmission component 2214) at least one RACH message in the signal 2235 to establish a connection (e.g., an RRC connection) with the first network node 2250.

The apparatus further includes a forwarding component 2212 that forwards the received first signal (e.g., signal 2254 including a request from the first network node 2250) to the control node 2270 of the apparatus.

The apparatus further includes a transmission component 2214 that transmits an availability signal 2232 to enable discovery of the apparatus and indicate an availability of the apparatus to assist the at least one network node, wherein the availability signal includes an identifier of the apparatus. The transmission component 2214 further transmits a second signal (e.g., signal 2253) including a first message of a random access procedure in response to the first signal, transmits one or more off-synchronization raster SSBs (e.g., via the signal 2240), transmits the one or more reference signals (e.g., via the signal 2234). The transmission component 2214 further transmits a signal 2236 including a request or a signal intended for the second network node 2260.

The apparatus may include additional components that perform each of the blocks of the algorithm in the aforementioned flowcharts of FIGS. 13-21. As such, each block in the aforementioned flowcharts of FIGS. 13-21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
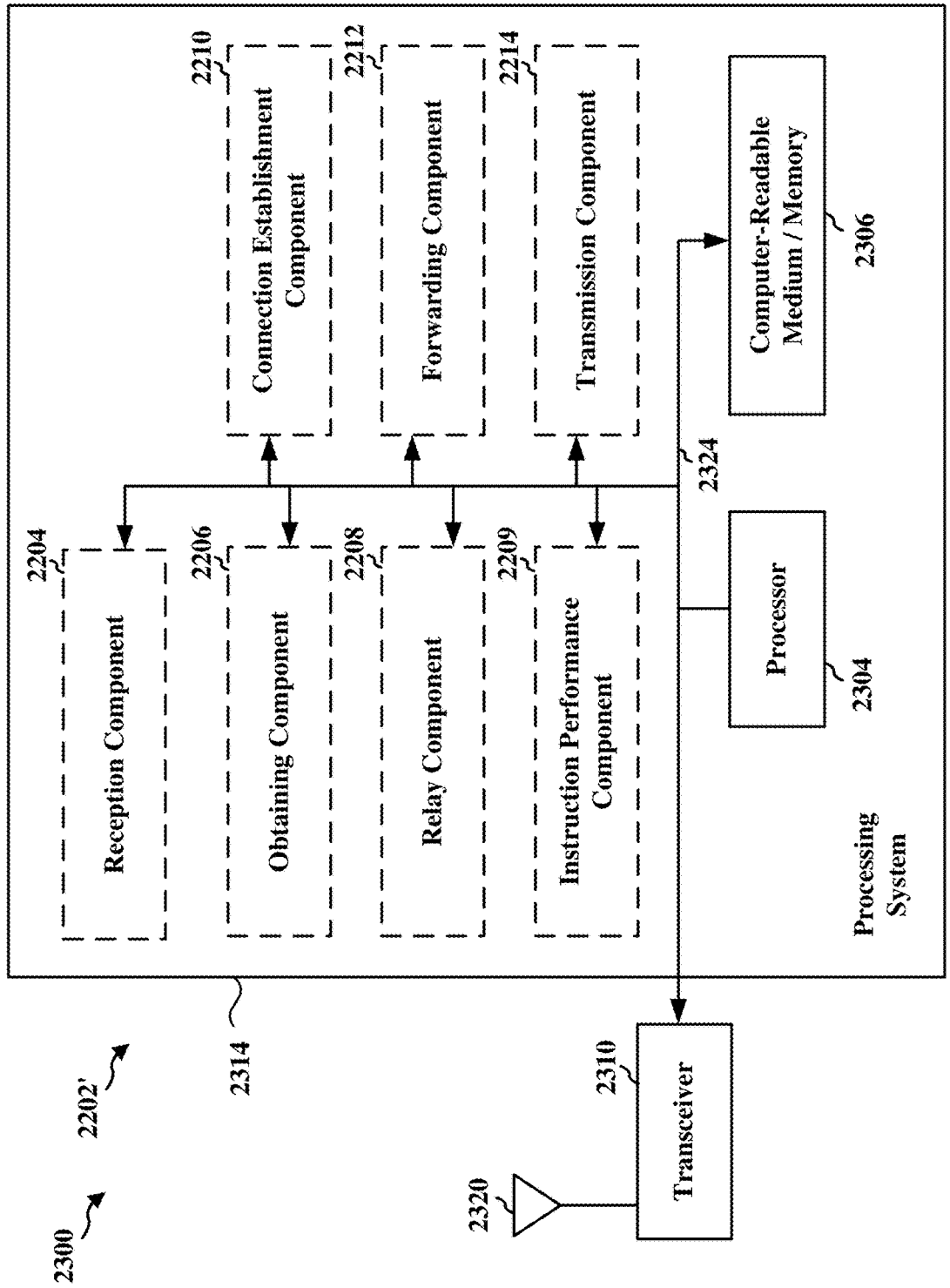
FIG. 23 is a diagram illustrating an example of a hardware implementation for an apparatus employing a processing system in accordance with various aspects of the disclosure.

FIG. 23 is a diagram 2300 illustrating an example of a hardware implementation for an apparatus 2202' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware components, represented by the processor 2304, the components 2204, 2206, 2208, 2209, 2210, 2212, 2214, and the computer-readable medium/memory 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the reception component 2204. In addition, the transceiver 2310 receives information from the processing system 2314, specifically the transmission component 2214, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system 2314 further includes at least one of the components 2204, 2206, 2208, 2209, 2210, 2212, 2214. The components may be software components running in the processor 2304, resident/stored in the computer readable medium/memory 2306, one or more hardware components coupled to the processor 2304, or some combination thereof. The processing system 2314 may be a component of an assisting node.

In one configuration, the apparatus 2202/2202' for wireless communication includes means for transmitting, from the apparatus, an availability signal to enable discovery of the apparatus and indicate an availability of the apparatus to assist the at least one network node, wherein the availability signal includes an identifier of the apparatus, means for relaying at least one wireless communication between the at least one network node and a network entity, means for obtaining at least one of a set of preconfigured time-frequency resources for the availability signal or a set of transmission configurations for the availability signal, wherein the availability signal is transmitted based on at least one of the set of preconfigured time-frequency resources or the set of transmission configurations, means for receiving a signal intended for a network entity from the at least one network node in response to the availability signal, wherein relaying the at least one wireless communication includes transmitting the signal intended for the network entity, means for receiving a signal from the at least one network node in response to the availability signal, wherein the signal indicates a request by the at least one network node to receive at least one of assistance or information excluded from the availability signal, means for receiving a first signal including configuration information, the configuration information indicating at least one of a time domain division (TDD) configuration, a beam configuration, or a transmission power, means for receiving a second signal intended for a network entity from the at least one network node, wherein relaying the at least one wireless communication includes transmitting the second signal based on the configuration information, means for receiving a first signal transmitted from the at least one network node in response to the availability signal, wherein the first signal requests the apparatus to initiate a procedure for establishing a connection with the at least one network node, means for transmitting a second signal including a first message of a random access procedure in response to the first signal, means for forwarding the received first signal to a control node of the apparatus, means for receiving one or more instructions from the control node, means for performing the one or more instructions.

The apparatus 2202/2202' for wireless communication further includes means for receiving configuration information from a control node associated with the apparatus, wherein the configuration information enables the apparatus to establish a connection with the at least one network node, means for establishing a connection with the at least one network node based on the configuration information, means for receiving a second signal intended for a network entity from the at least one network node, wherein relaying the at least one wireless communication includes transmitting the second signal, means for receiving configuration information from a control node associated with the apparatus, wherein the configuration information includes at least one of a time domain division (TDD) configuration, a beam configuration, or a transmission power, means for receiving a second signal intended for a network entity from the at least one network node, wherein relaying the at least one wireless communication includes transmitting the second signal based on the configuration information, means for receiving, from the at least one network node, a command to transmit one or more off synchronization raster synchronization signal blocks (SSBs) in response to the availability signal, means for transmitting the one or more off synchronization raster SSBs, means for receiving, from the at least one network node, a command to transmit one or more reference signals based on at least one of a configuration of the at least one network node or an identifier of the at least one network node, wherein the command is based on at least one measurement of the one or more off synchronization raster SSBs, means for transmitting the one or more reference signals, and means for receiving the one or more reference signals from the at least one network node.

The aforementioned means may be one or more of the aforementioned components of the apparatus 2202 and/or the processing system 2314 of the apparatus 2202' configured to perform the functions recited by the aforementioned means.

Figure 24:
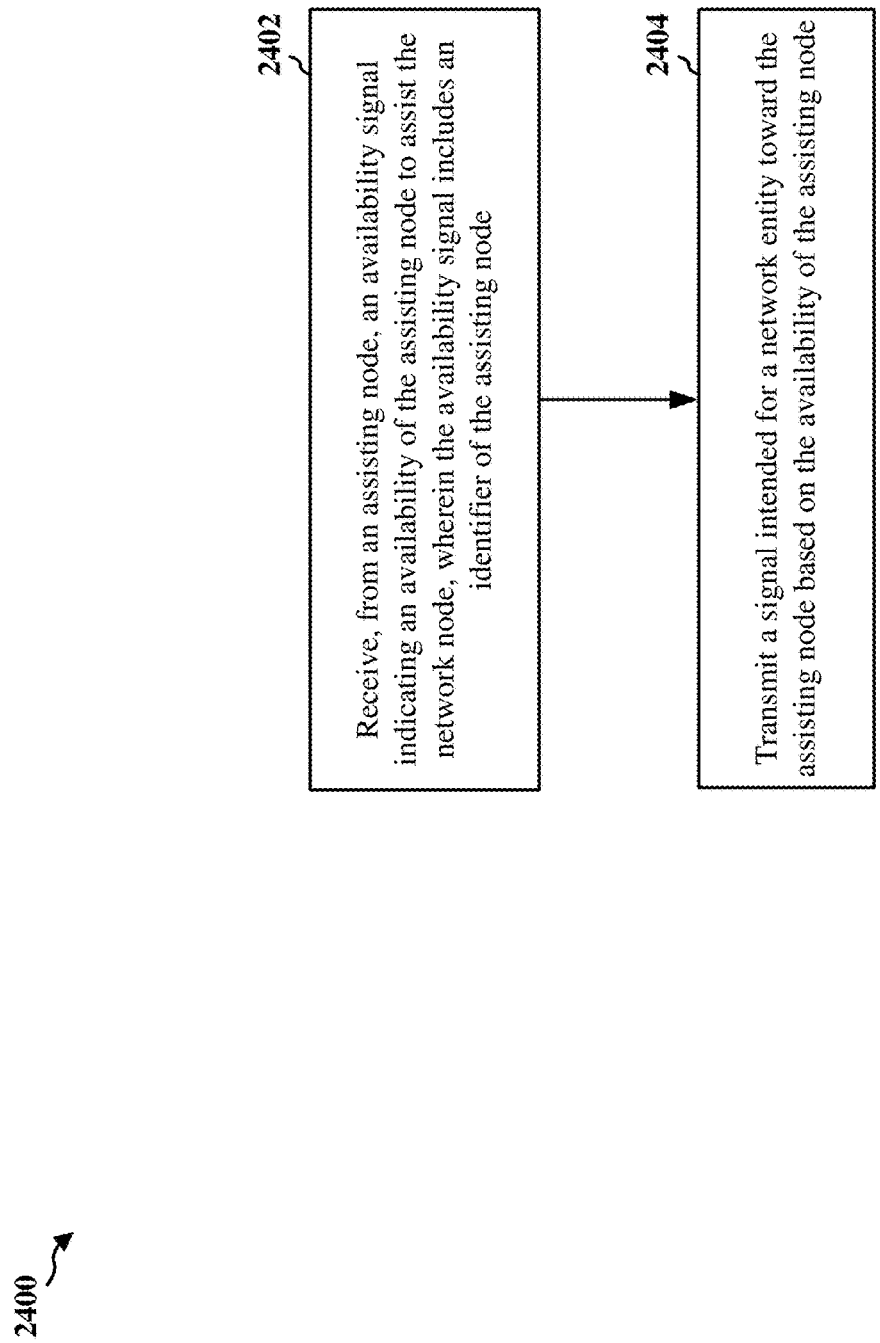
FIG. 24 is a flowchart of a method of wireless communication for a network node in accordance with various aspects of the disclosure.

FIG. 24 is a flowchart 2400 of a method of wireless communication. The method may be performed by a network node (e.g., the network node 402, 502, 602, 702, 802, 902, 1002, 1102, 1202; the apparatus 3202/3202'; the processing system 3314, which may include the memory 376 and which may be the entire network node 402, 502, 602, 702, 802, 902, 1002, 1102, 1202 or a component of the network node 402, 502, 602, 702, 802, 902, 1002, 1102, 1202, such as the TX processor 316, the RX processor 370, and/or the controller/processor 375).

At 2402, the network node receives, from an assisting node, an availability signal indicating an availability of the assisting node to assist the network node. The availability signal includes an identifier of the assisting node. In some examples, the availability signal may be the availability signal 510, 610, 710, 810, 910, 1010, 1110, 1210, and the network node may be the network node 502, 602, 702, 802, 902, 1002, 1102, 1202. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the network node searches a set of preconfigured time-frequency resources for the availability signal. In some examples, the set of preconfigured time-frequency resources may be preconfigured at the network node, may be indicated to the network node by an entity in the wireless communication network, or may be specified in a standard specification implemented by the network node. In some examples, the assisting node is available to assist the network node if the availability signal is received.

In some examples, the availability of the assisting node is indicated by information included in the availability signal. For example, the information includes an availability parameter set to a first value (e.g., '1') when the assisting node is available to assist the network node or a second value (e.g., '0') when the assisting node is unavailable to assist the network node.

In some aspects of the disclosure, the availability signal includes at least one of information indicating whether the assisting node is already assisting a network node assigned to the assisting node, an identifier of a network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

Finally, at 2404, the network node transmits a signal intended for a network entity toward the assisting node based on the availability of the assisting node. In some examples, the transmitted signal is relayed to the network entity through the assisting node. In some examples, the network entity may be a second network node (e.g., a base station, a UE). In some examples, the signal intended for the network entity may include a downlink (DL) signal, an uplink (UL), a sidelink signal), or other suitable type of signal. In some examples, the signal intended for a network entity may be signal 512, 614, 724, 830, 930, 1018, 1120.

Figure 25:
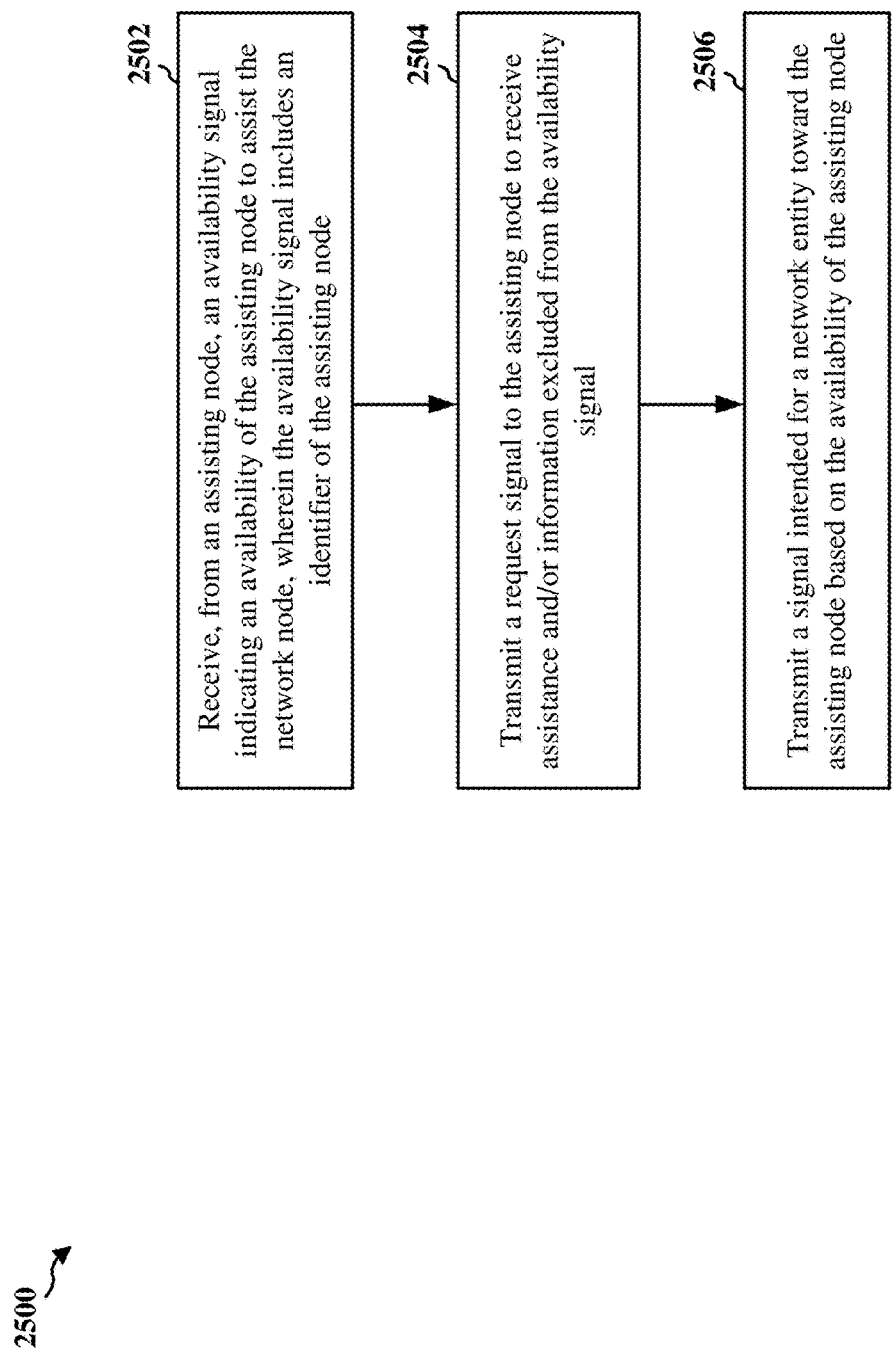
FIG. 25 is a flowchart of a method of wireless communication for a network node in accordance with various aspects of the disclosure.

FIG. 25 is a flowchart 2500 of a method of wireless communication. The method may be performed by a network node (e.g., the network node 702, 802, 902, 1002; the apparatus 3202/3202'; the processing system 3314, which may include the memory 376 and which may be the entire network node 702, 802, 902, 1002 or a component of the network node 702, 802, 902, 1002, such as the TX processor 316, the RX processor 370, and/or the controller/processor 375).

At 2502, the network node receives, from an assisting node, an availability signal indicating an availability of the assisting node to assist the network node, wherein the availability signal includes an identifier of the assisting node. In some examples, the availability signal may be the availability signal 510, 610, 710, 810, 910, 1010, 1110, 1210, and the network node may be the network node 502, 602, 702, 802, 902, 1002, 1102, 1202. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the network node searches a set of preconfigured time-frequency resources for the availability signal. In some examples, the set of preconfigured time-frequency resources may be preconfigured at the network node, may be indicated to the network node by an entity in the wireless communication network, or may be specified in a standard specification implemented by the network node. In some examples, the assisting node is available to assist the network node if the availability signal is received.

In some examples, the availability of the assisting node is indicated by information included in the availability signal. For example, the information includes an availability parameter set to a first value (e.g., '1') when the assisting node is available to assist the network node or a second value (e.g., '0') when the assisting node is unavailable to assist the network node.

In some aspects of the disclosure, the availability signal includes at least one of information indicating whether the assisting node is already assisting a network node assigned to the assisting node, an identifier of a network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 2504, the network node transmits a request signal to the assisting node to receive assistance and/or information excluded from the availability signal. In some examples, the request signal may be the request signal 712, 814, 914, 1014 previously described with reference to FIGS. 7-10.

Finally, at 2506, the network node transmits a signal intended for a network entity toward the assisting node based on the availability of the assisting node. In some examples, the transmitted signal is relayed to the network entity through the assisting node. In some examples, the network entity may be a second network node (e.g., a base station, a UE). In some examples, the signal intended for the network entity may include a downlink (DL) signal, an uplink (UL), a sidelink signal), or other suitable type of signal. In some examples, the signal intended for a network entity may be signal 724, 830, 930, 1018.

Figure 26:
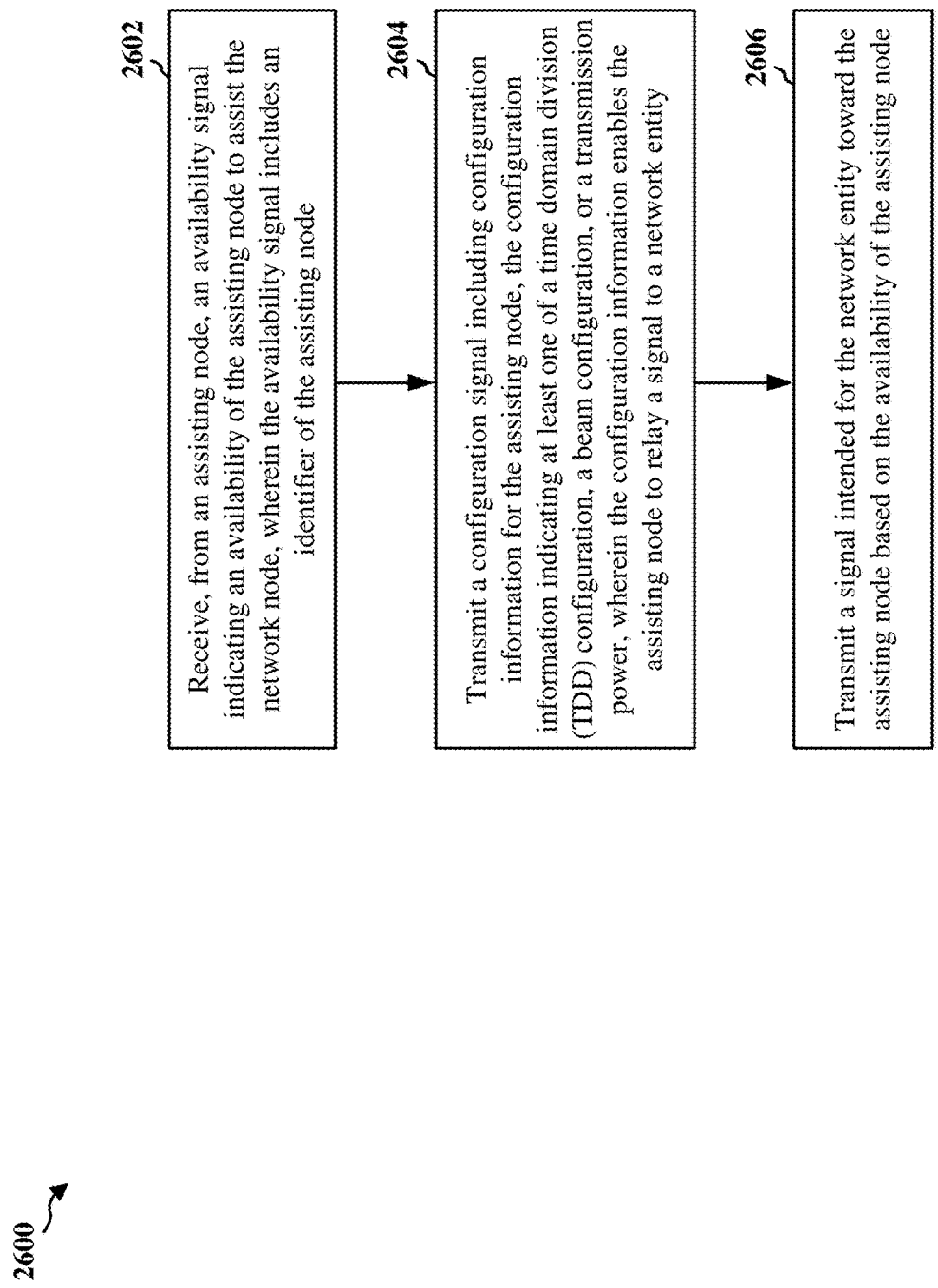
FIG. 26 is a flowchart of a method of wireless communication for a network node in accordance with various aspects of the disclosure.

FIG. 26 is a flowchart 2600 of a method of wireless communication. The method may be performed by a network node (e.g., the network node 602; the apparatus 3202/3202'; the processing system 3314, which may include the memory 376 and which may be the entire network node 602 or a component of the network node 602, such as the TX processor 316, the RX processor 370, and/or the controller/processor 375).

At 2602, the network node receives, from an assisting node, an availability signal indicating an availability of the assisting node to assist the network node. The availability signal includes an identifier of the assisting node. In some examples, the availability signal may be the availability signal 610, and the network node may be the network node 602. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the network node searches a set of preconfigured time-frequency resources for the availability signal. In some examples, the set of preconfigured time-frequency resources may be preconfigured at the network node, may be indicated to the network node by an entity in the wireless communication network, or may be specified in a standard specification implemented by the network node. In some examples, the assisting node is available to assist the network node if the availability signal is received.

In some examples, the availability of the assisting node is indicated by information included in the availability signal. For example, the information includes an availability parameter set to a first value (e.g., '1') when the assisting node is available to assist the network node or a second value (e.g., '0') when the assisting node is unavailable to assist the network node.

In some aspects of the disclosure, the availability signal includes at least one of information indicating whether the assisting node is already assisting a network node assigned to the assisting node, an identifier of a network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 2604, the network node transmits a configuration signal including configuration information for the assisting node, the configuration information indicating at least one of a time domain division (TDD) configuration, a beam configuration, or a transmission power. The configuration information enables the assisting node to relay a signal to the network entity. For example, the configuration signal may be the configuration signal 612 previously described with reference to FIG. 6.

Finally, at 2606, the network node transmits a signal intended for a network entity toward the assisting node based on the availability of the assisting node. For example, with reference to FIG. 6, the network node 602 may then transmit a signal 614 intended for the UE 606. In some examples, the network node transmits the signal intended for the network entity toward the assisting node when the availability signal indicates that the assisting node is available.

Figure 27:
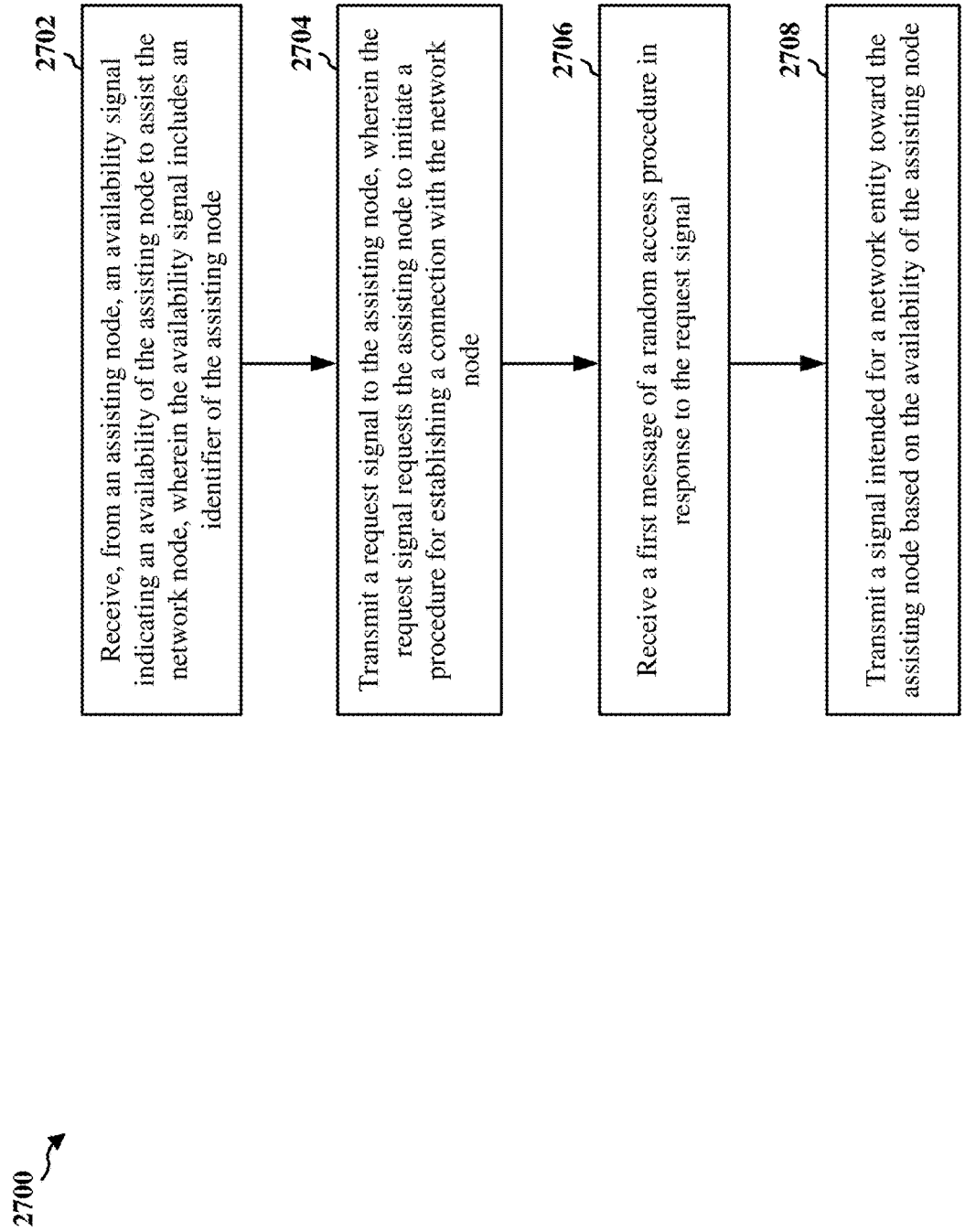
FIG. 27 is a flowchart of a method of wireless communication for a network node in accordance with various aspects of the disclosure.

FIG. 27 is a flowchart 2700 of a method of wireless communication. The method may be performed by a network node (e.g., the network node 702, 802, 902; the apparatus 3202/3202'; the processing system 3314, which may include the memory 376 and which may be the entire network node 702, 802, 902 or a component of the network node 702, 802, 902, such as the TX processor 316, the RX processor 370, and/or the controller/processor 375).

At 2702, the network node receives, from an assisting node, an availability signal indicating an availability of the assisting node to assist the network node. The availability signal includes an identifier of the assisting node. In some examples, the availability signal may be the availability signal 710, 812, 912 and the network node may be the network node 702, 802, 902. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the network node searches a set of preconfigured time-frequency resources for the availability signal. In some examples, the set of preconfigured time-frequency resources may be preconfigured at the network node, may be indicated to the network node by an entity in the wireless communication network, or may be specified in a standard specification implemented by the network node. In some examples, the assisting node is available to assist the network node if the availability signal is received.

In some examples, the availability of the assisting node is indicated by information included in the availability signal. For example, the information includes an availability parameter set to a first value (e.g., '1') when the assisting node is available to assist the network node or a second value (e.g., '0') when the assisting node is unavailable to assist the network node.

In some aspects of the disclosure, the availability signal includes at least one of information indicating whether the assisting node is already assisting a network node assigned to the assisting node, an identifier of a network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 2704, the network node transmits a request signal to the assisting node. The request signal requests the assisting node to initiate a procedure for establishing a connection with the network node. In some examples, the request signal may be request signal 712, 814, 914 previously described with reference to FIGS. 7-9.

At 2706, the network node receives a first message of a random access procedure in response to the request signal. In some examples, the network node may receive the first message in the signal 714, 820, 920 previously described with reference to FIGS. 7-9.

Finally, at 2708, the network node transmits a signal intended for a network entity toward the assisting node based on the availability of the assisting node. In some examples, the signal intended for the network entity may be the signal 724, 830, 930 previously described with reference to FIGS. 7-9.

Figure 28:
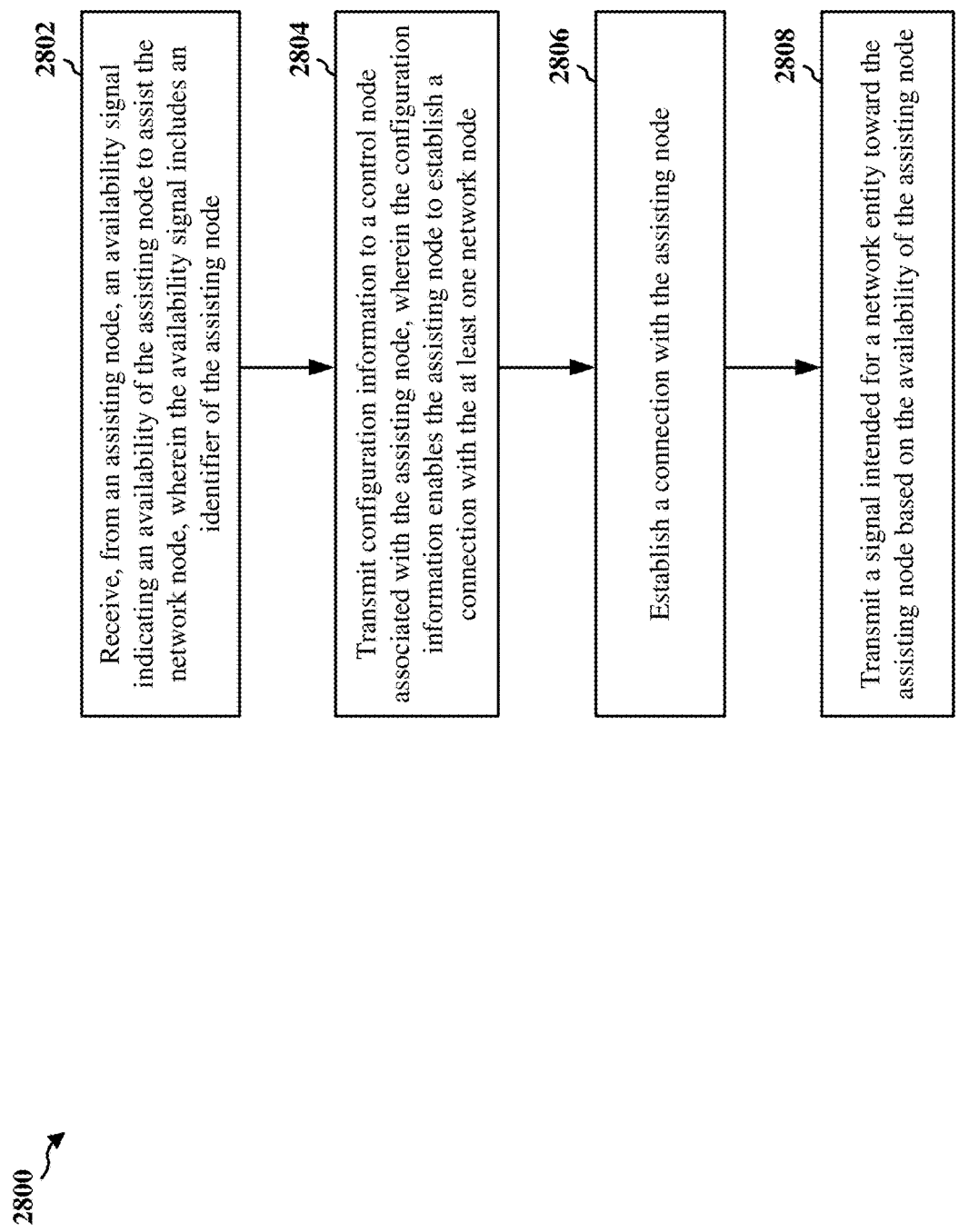
FIG. 28 is a flowchart of a method of wireless communication for a network node in accordance with various aspects of the disclosure.

FIG. 28 is a flowchart 2800 of a method of wireless communication. The method may be performed by a network node (e.g., the network node 902; the apparatus 3202/3202'; the processing system 3314, which may include the memory 376 and which may be the entire network node 902 or a component of the network node 902, such as the TX processor 316, the RX processor 370, and/or the controller/processor 375).

At 2802, the network node receives, from an assisting node, an availability signal indicating an availability of the assisting node to assist the network node. The availability signal includes an identifier of the assisting node. In some examples, the availability signal may be the availability signal 912 and the network node may be the network node 902. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the network node searches a set of preconfigured time-frequency resources for the availability signal. In some examples, the set of preconfigured time-frequency resources may be preconfigured at the network node, may be indicated to the network node by an entity in the wireless communication network, or may be specified in a standard specification implemented by the network node. In some examples, the assisting node is available to assist the network node if the availability signal is received.

In some examples, the availability of the assisting node is indicated by information included in the availability signal. For example, the information includes an availability parameter set to a first value (e.g., '1') when the assisting node is available to assist the network node or a second value (e.g., '0') when the assisting node is unavailable to assist the network node.

In some aspects of the disclosure, the availability signal includes at least one of information indicating whether the assisting node is already assisting a network node assigned to the assisting node, an identifier of a network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 2804, the network node transmits configuration information to a control node associated with the assisting node. The configuration information enables the assisting node to establish a connection with the at least one network node. For example, the network node 902 may transmit the request signal 914 including configuration information to the control node 906. The configuration information in the request signal 914 may enable the assisting node 904 to establish a connection with the network node 902.

At 2806, the network node establishes a connection with the assisting node. For example, with reference to FIG. 9, the assisting node 904 may initiate a four-step RACH procedure (e.g., the RACH procedure 928) with the network node 902 to establish a connection with the network node 902. The network node 902 may perform the RACH procedure 928 with the assisting node 904 in response to the signal 920 including message 1 of the RACH procedure 928.

Finally, at 2808, the network node transmits a signal intended for a network entity toward the assisting node based on the availability of the assisting node. For example, with reference to FIG. 9, the network node 902 may transmit the signal 930 intended for the UE 908.

Figure 29:
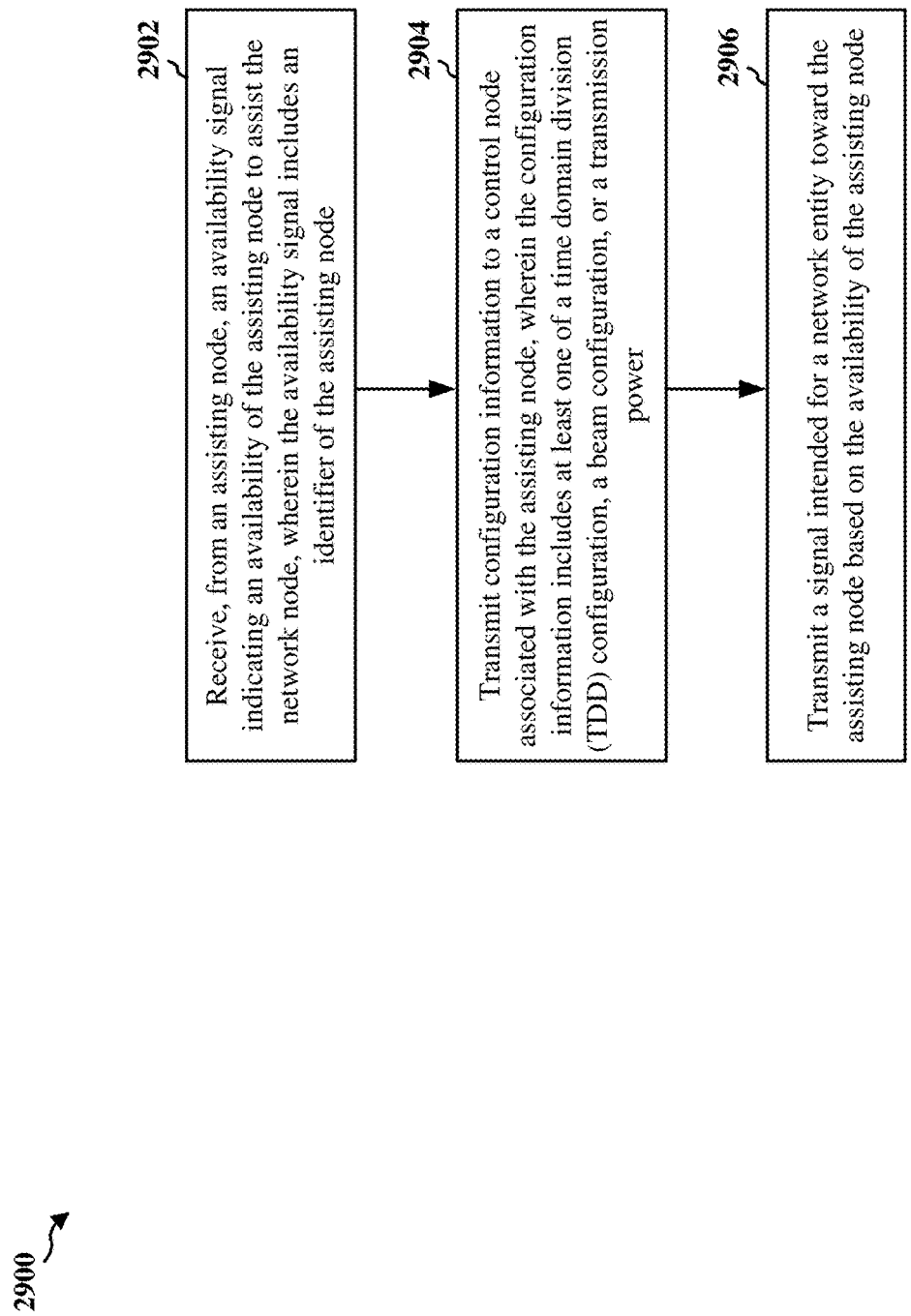
FIG. 29 is a flowchart of a method of wireless communication for a network node in accordance with various aspects of the disclosure.

FIG. 29 is a flowchart 2900 of a method of wireless communication. The method may be performed by a network node (e.g., the network node 1002; the apparatus 3202/3202'; the processing system 3314, which may include the memory 376 and which may be the entire network node 1002 or a component of the network node 1002, such as the TX processor 316, the RX processor 370, and/or the controller/processor 375).

At 2902, the network node receives, from an assisting node, an availability signal indicating an availability of the assisting node to assist the network node. The availability signal includes an identifier of the assisting node. In some examples, the availability signal may be the availability signal 1012 and the network node may be the network node 1002. For example, the availability signal may be a beacon, a reference signal, a synchronization signal, a signal transmitted on a physical data channel, a signal transmitted on a physical control channel, a signal transmitted on a discovery channel, or a combination thereof.

In some aspects of the disclosure, the network node searches a set of preconfigured time-frequency resources for the availability signal. In some examples, the set of preconfigured time-frequency resources may be preconfigured at the network node, may be indicated to the network node by an entity in the wireless communication network, or may be specified in a standard specification implemented by the network node. In some examples, the assisting node is available to assist the network node if the availability signal is received.

In some examples, the availability of the assisting node is indicated by information included in the availability signal. For example, the information includes an availability parameter set to a first value (e.g., '1') when the assisting node is available to assist the network node or a second value (e.g., '0') when the assisting node is unavailable to assist the network node.

In some aspects of the disclosure, the availability signal includes at least one of information indicating whether the assisting node is already assisting a network node assigned to the assisting node, an identifier of a network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

At 2904, the network node transmits configuration information to a control node associated with the assisting node. The configuration information includes at least one of a time domain division (TDD) configuration, a beam configuration, or a transmission power. For example, the TDD configuration may include a UL/DL pattern. For example, with reference to FIG. 10, the network node 1002 may transmit the configuration information in the request signal 1014 to the control node 1006.

Finally, at 2906, the network node transmits a signal intended for a network entity toward the assisting node based on the availability of the assisting node. For example, with reference to FIG. 10, the network node 1002 may transmit the signal 1018 intended for the UE 1008.

Figure 30:
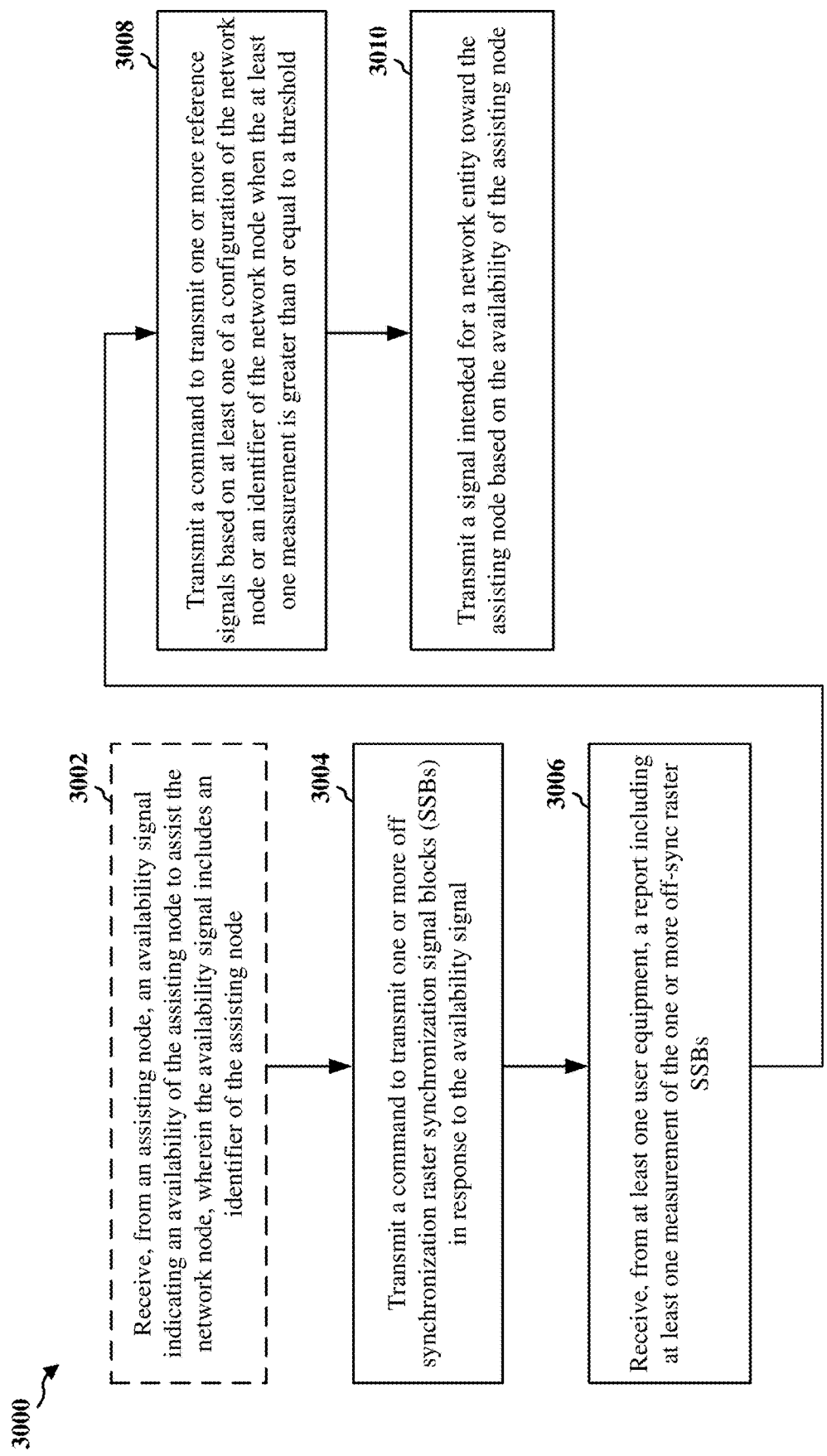
FIG. 30 is a flowchart of a method of wireless communication for a network node in accordance with various aspects of the disclosure.

FIG. 30 is a flowchart 3000 of a method of wireless communication. The method may be performed by a network node (e.g., the network node 1202; the apparatus 3202/3202'; the processing system 3314, which may include the memory 376 and which may be the entire network 1202 or a component of the network node 1202, such as the TX processor 316, the RX processor 370, and/or the controller/processor 375).

At 3002, the network node receives, from an assisting node, an availability signal indicating an availability of the assisting node to assist the network node. The availability signal includes an identifier of the assisting node. In some examples, with reference to FIG. 12, the availability signal may be the availability signal 1210 and the network node may be the network node 1202

At 3004, the network node transmits a command to transmit one or more off-synchronization raster synchronization signal blocks (SSBs) in response to the availability signal. For example, with reference to FIG. 12, the command to transmit one or more off-synchronization raster synchronization signal blocks (SSBs) may be included in the command signal 1212.

At 3006, the network node receives, from at least one user equipment, a report including at least one measurement of the one or more off-sync raster SSBs. For example, with reference to FIG. 12, the report including at least one measurement of the one or more off-sync raster SSBs may be the report 1218.

At 3008, the network node transmits a command to transmit one or more reference signals based on at least one of a configuration of the network node or an identifier of the network node when the at least one measurement is greater than or equal to a threshold. For example, the command to transmit one or more reference signals may be the command 1222 previously described with reference to FIG. 12. For example, the one or more reference signals may include an SSB, CSI-RS and/or other suitable reference signals.

Finally, at 3010, the network node transmits a signal intended for a network entity toward the assisting node based on the availability of the assisting node. For example, with reference to FIG. 12, the network node 1202 may transmit the reference signal 1224 intended for the UE 1206 toward the assisting node 1204.

Figure 31:
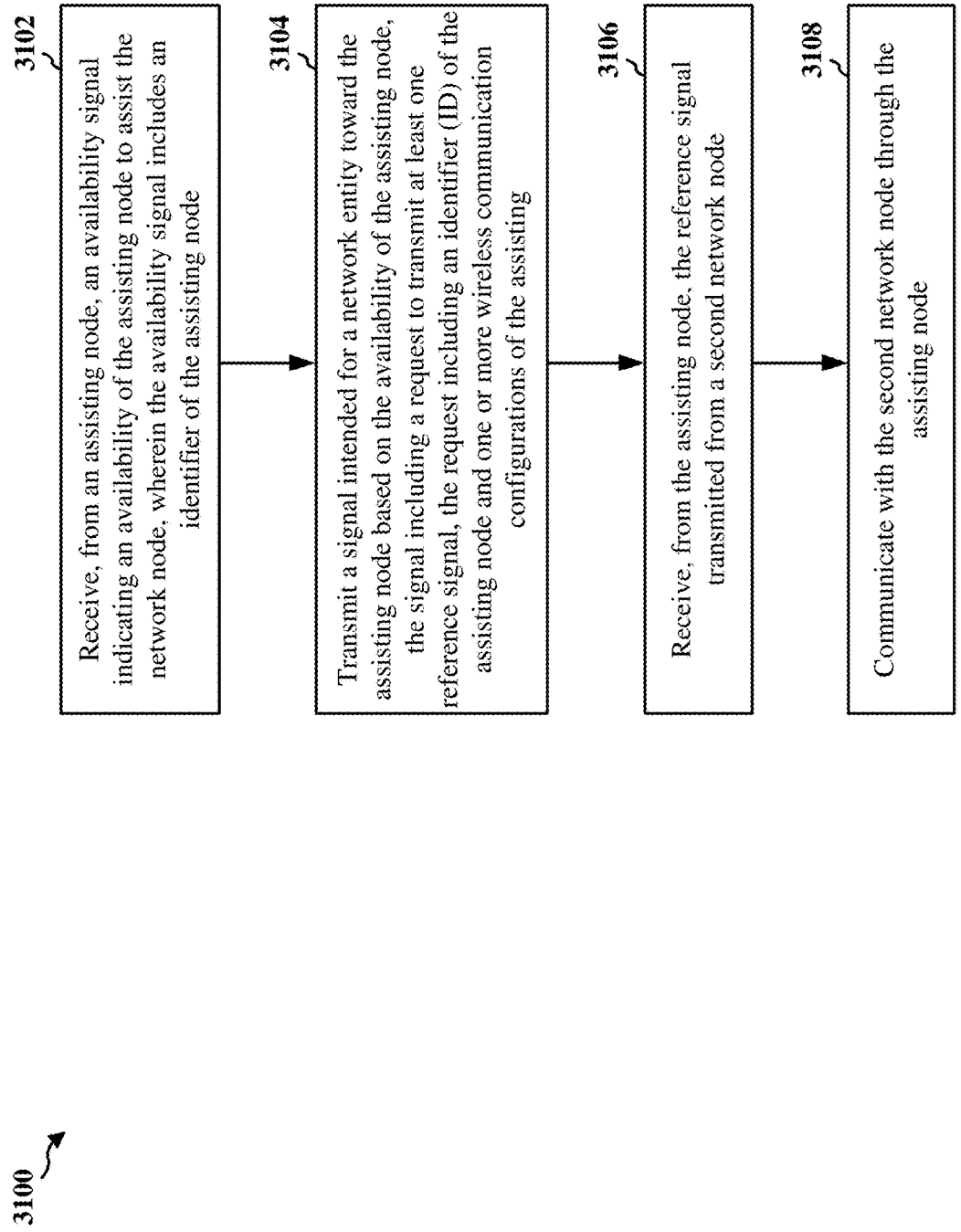
FIG. 31 is a flowchart of a method of wireless communication for a network node in accordance with various aspects of the disclosure.

FIG. 31 is a flowchart 3100 of a method of wireless communication. The method may be performed by a network node (e.g., the network node 1102; the apparatus 3202/3202'; the processing system 3314, which may include the memory 376 and which may be the entire network node 1102 or a component of the network node 1102, such as the TX processor 316, the RX processor 370, and/or the controller/processor 375).

At 3102, the network node receives, from an assisting node, an availability signal indicating an availability of the assisting node to assist the network node, wherein the availability signal includes an identifier of the assisting node. For example, the availability signal may be the availability signal 1110 in FIG. 11.

At 3104, the network node transmits a signal intended for a network entity toward the assisting node based on the availability of the assisting node. The signal includes a request to transmit at least one reference signal, the request including an identifier (ID) of the assisting node and one or more wireless communication configurations of the assisting node. For example, the signal intended for the network entity may be the request signal 1112. For example, the request signal 1112 may request the second network node 1106 to transmit a reference signal in a specific direction (e.g., toward the assisting node 1104).

At 3106, the network node receives, from the assisting node, the reference signal transmitted from a second network node. For example, the first network node 1102 may receive the reference signal 1118, which may be relayed from the second network node 1106 to the first network node 1102 by the assisting node 1104 as previously described with reference to FIG. 11.

Finally, at 3108, the network node communicates with the second network node through the assisting node. For example, with reference to FIG. 11, the first network node 1102 may transmit a signal 1120 intended for the second network node 1106 toward the assisting node 1004.

Figure 32:
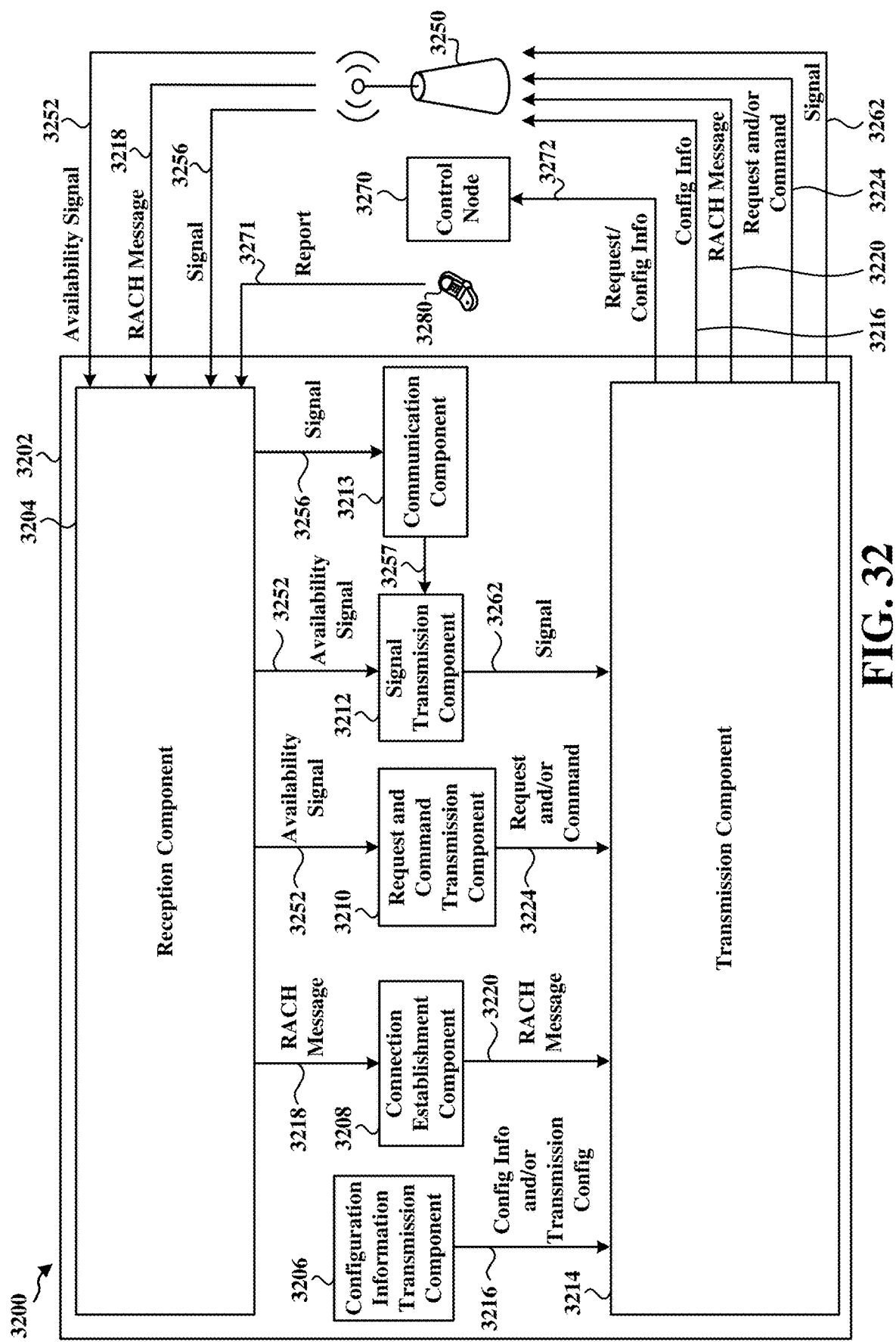
FIG. 32 is a conceptual data flow diagram illustrating the data flow between different means/components in an example apparatus in accordance with various aspects of the disclosure.

FIG. 32 is a conceptual data flow diagram 3200 illustrating the data flow between different means/components in an example apparatus 3202. The apparatus may be a network node.

The apparatus includes a reception component 3204 that receives, from an assisting node (e.g., assisting node 3250), an availability signal 3252 indicating an availability of the assisting node to assist the apparatus, wherein the availability signal includes an identifier of the assisting node, receives a first message of a random access procedure (e.g., a RACH message in the signal 3254) in response to the request signal 3272, 3260. The reception component 3204 further receives, from at least one user equipment 3280, a report 3271 including at least one measurement of the one or more off-sync raster SSBs. The reception component 3204 further receives, from the assisting node 3250, the reference signal (e.g., via signal 3256) transmitted from a second network node.

The apparatus further includes a configuration information transmission component 3206 that transmits (via the transmission component 3214) a configuration signal 3216 including configuration information for the assisting node 3250, the configuration information indicating at least one of a time domain division (TDD) configuration, a beam configuration, or a transmission power, wherein the configuration information enables the assisting node to relay a signal (e.g., the signal 3262) to a network entity. The configuration information transmission component 3206 further transmits configuration information (e.g., in the signal 3272) to a control node 3270 associated with the assisting node 3250, wherein the configuration information enables the assisting node to establish a connection with the at least one network node. The configuration information transmission component 3206 further transmits configuration information (e.g., in the signal 3272) to a control node 3270 associated with the assisting node 3250, wherein the configuration information includes at least one of a time domain division (TDD) configuration, a beam configuration, or a transmission power.

The apparatus further includes a connection establishment component 3208 that establishes a connection with the assisting node 3250. For example, the connection establishment component 3208 may receive at least one RACH message in the signal 3218 and may transmit (e.g., via the transmission component 3214) at least one RACH message in the signal 3220 to establish a connection (e.g., an RRC connection) with the assisting node 3250.

The apparatus further includes a request and command transmission component 3210 that receives an availability signal 3252 and transmits a request signal (e.g., signal 3224) to the assisting node 3250, wherein the request signal requests the assisting node 3250 to initiate a procedure for establishing a connection with the apparatus, transmits, to the assisting node, a command (e.g., via the signal 3224) to transmit one or more off-synchronization raster synchronization signal blocks (SSBs) in response to the availability signal 3252, transmits, to the assisting node 3250, a command (e.g., via the signal 3224) to transmit one or more reference signals based on at least one of a configuration of the apparatus or an identifier of the apparatus when the at least one measurement is greater than or equal to a threshold The apparatus further includes a signal transmission component 3212 that receives the availability signal 3252 and transmits a signal (e.g., signal 322) intended for a network entity toward the assisting node based on the availability of the assisting node 3250.

The apparatus further includes a transmission component 3214 that transmits a request signal (e.g., signal 3224) to the assisting node 3250 to receive assistance and/or information excluded from the availability signal 3252.

The apparatus further includes a communication component 3213 that receives the signal 3256 from the assisting node 3250 and generates a message 3257 for a network node, where the message 3257 may be included in the signal 3262.

The apparatus may include additional components that perform each of the blocks of the algorithm in the aforementioned flowcharts of FIGS. 24-31. As such, each block in the aforementioned flowcharts of FIGS. 24-31 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 33:
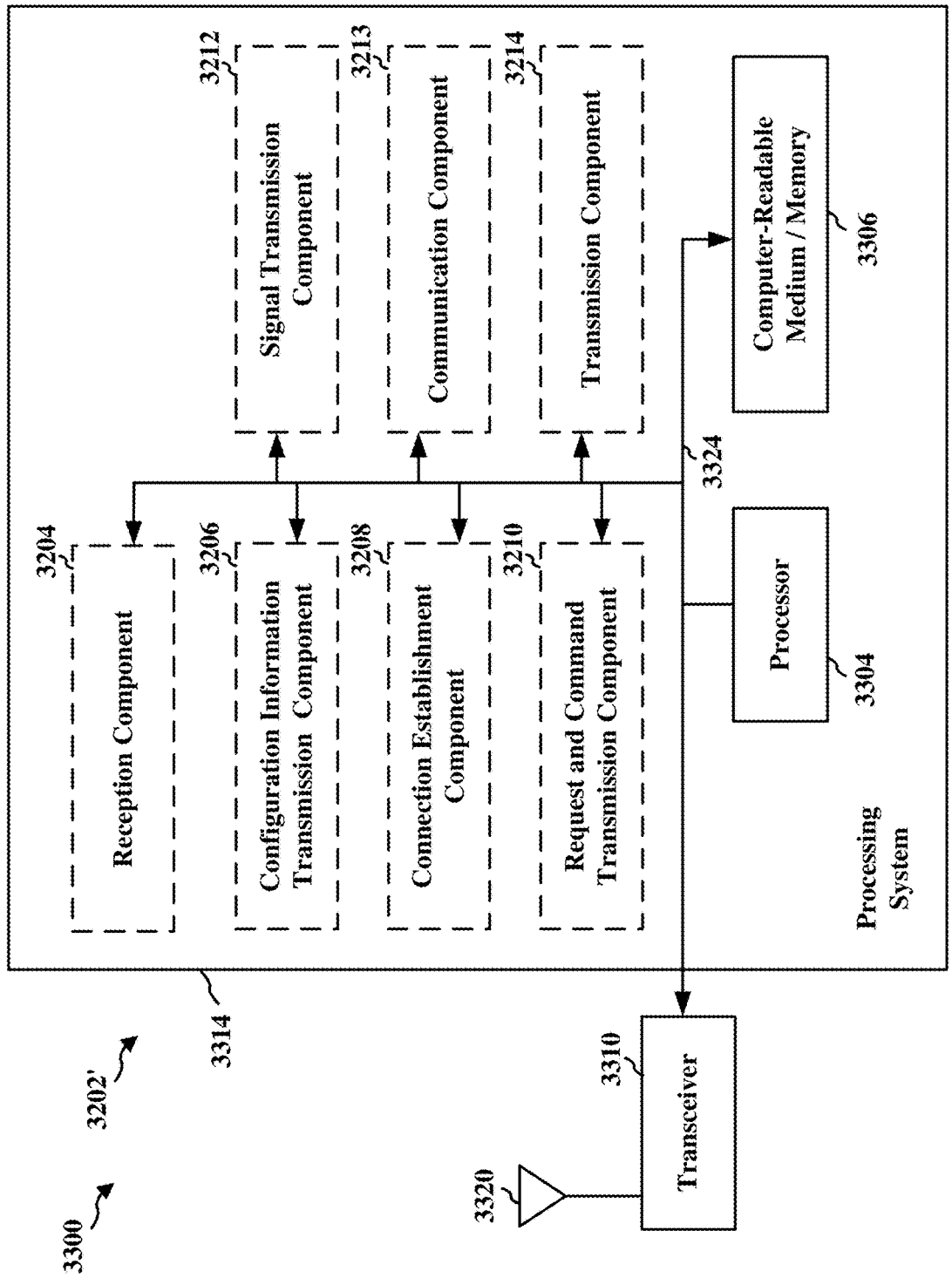
FIG. 33 is a diagram illustrating an example of a hardware implementation for an apparatus employing a processing system in accordance with various aspects of the disclosure.

FIG. 33 is a diagram 3300 illustrating an example of a hardware implementation for an apparatus 3202' employing a processing system 3314. The processing system 3314 may be implemented with a bus architecture, represented generally by the bus 3324. The bus 3324 may include any number of interconnecting buses and bridges depending on the specific application of the processing system 3314 and the overall design constraints. The bus 3324 links together various circuits including one or more processors and/or hardware components, represented by the processor 3304, the components 3204, 3206, 3208, 3210, 3212, 3213, 3214, and the computer-readable medium/memory 3306. The bus 3324 may also link various other circuits such as timing sources, peripherals, voltage regulators, and power management circuits, which are well known in the art, and therefore, will not be described any further.

The processing system 3314 may be coupled to a transceiver 3310. The transceiver 3310 is coupled to one or more antennas 3320. The transceiver 3310 provides a means for communicating with various other apparatus over a transmission medium. The transceiver 3310 receives a signal from the one or more antennas 3320, extracts information from the received signal, and provides the extracted information to the processing system 3314, specifically the reception component 3204. In addition, the transceiver 3310 receives information from the processing system 3314, specifically the transmission component 3214, and based on the received information, generates a signal to be applied to the one or more antennas 3320. The processing system 3314 includes a processor 3304 coupled to a computer-readable medium/memory 3306. The processor 3304 is responsible for general processing, including the execution of software stored on the computer-readable medium/memory 3306. The software, when executed by the processor 3304, causes the processing system 3314 to perform the various functions described supra for any particular apparatus. The computer-readable medium/memory 3306 may also be used for storing data that is manipulated by the processor 3304 when executing software. The processing system 3314 further includes at least one of the components 3204, 3206, 3208, 3210, 3212, 3213, 3214. The components may be software components running in the processor 3304, resident/stored in the computer readable medium/memory 3306, one or more hardware components coupled to the processor 3304, or some combination thereof. The processing system 3314 may be a component of the network node 310 and may include the memory 376 and/or at least one of the TX processor 316, the RX processor 370, and the controller/processor 375. Alternatively, the processing system 3314 may be the entire network node (e.g., see 310 of FIG. 3).

In one configuration, the apparatus 3202/3202' for wireless communication includes means for receiving, from an assisting node, an availability signal indicating an availability of the assisting node to assist the apparatus, wherein the availability signal includes an identifier of the assisting node, means for transmitting a signal intended for a network entity toward the assisting node based on the availability of the assisting node, means for transmitting a request signal to the assisting node to receive assistance and/or information excluded from the availability signal, means for transmitting a configuration signal including configuration information for the assisting node, the configuration information indicating at least one of a time domain division (TDD) configuration, a beam configuration, or a transmission power, wherein the configuration information enables the assisting node to relay the signal to the network entity, means for transmitting a request signal to the assisting node, wherein the request signal requests the assisting node to initiate a procedure for establishing a connection with the apparatus, means for receiving a first message of a random access procedure in response to the request signal, means for transmitting configuration information to a control node associated with the assisting node, wherein the configuration information enables the assisting node to establish a connection with the at least one apparatus, means for establishing a connection with the assisting node, means for transmitting configuration information to a control node associated with the assisting node, wherein the configuration information includes at least one of a time domain division (TDD) configuration, a beam configuration, or a transmission power, means for transmitting, to the assisting node, a command to transmit one or more off synchronization raster synchronization signal blocks (SSBs) in response to the availability signal, means for receiving, from at least one user equipment, a report including at least one measurement of the one or more off-sync raster SSBs; and means for transmitting, to the assisting node, a command to transmit one or more reference signals based on at least one of a configuration of the apparatus or an identifier of the apparatus when the at least one measurement is greater than or equal to a threshold, means for receiving, from the assisting node, the reference signal transmitted from a second apparatus (e.g., a second network node), means for communicating with the second apparatus through the assisting node.

The aforementioned means may be one or more of the aforementioned components of the apparatus 3202 and/or the processing system 3314 of the apparatus 3202' configured to perform the functions recited by the aforementioned means. As described supra, the processing system 3314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The aspects described herein enable network nodes (e.g., base stations, UEs) to efficiently discover (e.g., detect) and use assisting nodes deployed in a wireless communication network. In some examples, a network node may discover an assisting node and may determine the availability of the assisting node from periodic availability signals transmitted from the assisting nodes. In some examples, the aspects described herein may facilitate communication between a network node and an assisting node since the network node may acquire configuration information for the assisting node from an availability signal and may use the configuration information for wireless communications with the assisting node.

The following provides an overview of aspects of the present disclosure:

Aspect 1: A method of wireless communication for an assisting node, wherein the assisting node is included in a wireless communication network to assist at least one network node, the method comprising: transmitting, from the assisting node, an availability signal to enable discovery of the assisting node and indicate an availability of the assisting node to assist the at least one network node, wherein the availability signal includes an identifier of the assisting node; and relaying at least one wireless communication between the at least one network node and a network entity.

Aspect 2: The method of aspect 1, wherein the availability signal is a beacon, a reference signal, a synchronization signal, a signal transmitted on a physical data channel, a signal transmitted on a physical control channel, a signal transmitted on a discovery channel, or a combination thereof.

Aspect 3: The method of aspect 1 or 2, wherein the availability signal is transmitted on preconfigured time-frequency resources.

Aspect 4: The method of aspect 1 or 2, further comprising: obtaining at least one of a set of preconfigured time-frequency resources for the availability signal or a set of transmission configurations for the availability signal, wherein the availability signal is transmitted based on at least one of the set of preconfigured time-frequency resources or the set of transmission configurations.

Aspect 5: The method of any one of aspects 1 through 4, wherein the availability signal is periodically transmitted until the assisting node is associated with the at least one network node.

Aspect 6: The method of any one of aspects 1 through 5, wherein the availability of the assisting node is indicated by information included in the availability signal.

Aspect 7: The method of aspect 6, wherein the information includes an availability parameter set to a first value when the assisting node is available to assist the at least one network node or a second value when the assisting node is unavailable to assist the at least one network node.

Aspect 8: The method of any one of aspects 1 through 7, wherein the availability signal includes at least one of: information indicating whether the assisting node is already assisting a network node assigned to the assisting node, an identifier of the network node assigned to the assisting node, one or more wireless communication configurations of the assisting node or the network node assigned to the assisting node, a type of the assisting node or the network node assigned to the assisting node, one or more capabilities of the assisting node or the network node assigned to the assisting node, one or more beamforming configurations of the assisting node or the network node assigned to the assisting node, a power configuration of the assisting node or the network node assigned to the assisting node, or one or more resources to be used for communication with the assisting node.

Aspect 9: The method of any one of aspects 1 through 8, further comprising: receiving a signal intended for a network entity from the at least one network node in response to the availability signal, wherein relaying the at least one wireless communication includes transmitting the signal intended for the network entity.

Aspect 10: The method of aspect 9, wherein the signal is a synchronization signal.

Aspect 11: The method of any one of aspects 1 through 8, further comprising: receiving a signal from the at least one network node in response to the availability signal, wherein the signal indicates a request by the at least one network node to receive at least one of assistance or information excluded from the availability signal.

Aspect 12: The method of aspect 11, wherein the first signal includes a message of a random access procedure.

Aspect 13: The method of any one of aspects 1 through 8, further comprising: receiving a first signal including configuration information, the configuration information indicating at least one of a time domain division (TDD) configuration, a beam configuration, or a transmission power; and receiving a second signal intended for a network entity from the at least one network node, wherein relaying the at least one wireless communication includes transmitting the second signal based on the configuration information.

Aspect 14: The method of any one of aspects 1 through 8, further comprising: receiving a first signal transmitted from the at least one network node in response to the availability signal, wherein the first signal requests the assisting node to initiate a procedure for establishing a connection with the at least one network node.

Aspect 15: The method of aspect 14, further comprising: transmitting a second signal including a first message of a random access procedure in response to the first signal.

Aspect 16: The method of aspect 14, wherein the first signal includes at least one of: an identifier associated with the at least one network node, or configuration information associated with the at least one network node, wherein the configuration information enables the assisting node to establish a connection with the at least one network node.

Aspect 17: The method of aspect 14, further comprising: forwarding the received first signal to a control node of the assisting node; receiving one or more instructions from the control node; and performing the one or more instructions.

Aspect 18: The method of aspect 17, wherein the one or more instructions includes an instruction to transmit a second signal including a first message of a random access procedure.

Aspect 19: The method of aspect 14, wherein the first signal transmitted from the at least one network node is received from a control node associated with the assisting node.

Aspect 20: The method of any one of aspects 1 through 8, further comprising: receiving configuration information from a control node associated with the assisting node, wherein the configuration information enables the assisting node to establish a connection with the at least one network node; establishing a connection with the at least one network node based on the configuration information; and receiving a signal intended for a network entity from the at least one network node, wherein relaying the at least one wireless communication includes transmitting the signal.

Aspect 21: The method of any one of aspects 1 through 8, further comprising: receiving configuration information from a control node associated with the assisting node, wherein the configuration information includes at least one of a time domain division (TDD) configuration, a beam configuration, or a transmission power; and receiving a signal intended for a network entity from the at least one network node, wherein relaying the at least one wireless communication includes transmitting the signal based on the configuration information.

Aspect 22: The method of any one of aspects 1 through 8, further comprising: receiving, from the at least one network node, a command to transmit one or more off synchronization raster synchronization signal blocks (SSBs) in response to the availability signal; transmitting the one or more off synchronization raster SSBs; receiving, from the at least one network node, a command to transmit one or more reference signals based on at least one of a configuration of the at least one network node or an identifier of the at least one network node, wherein the command is based on at least one measurement of the one or more off synchronization raster SSBs; and transmitting the one or more reference signals.

Aspect 23: The method of aspect 22, further comprising: receiving the one or more reference signals from the at least one network node.

Aspect 24: An apparatus for wireless communication, comprising: a memory; and at least one processor coupled to the memory and configured to perform a method of any one of aspects 1 through 23.

Aspect 25: An apparatus for wireless communication comprising at least one means for performing a method of any one of aspects 1 through 23.

Aspect 26: A computer-readable medium storing computer executable code, the code when executed by a processor cause the processor to perform a method of any one of aspects 1 through 23.

Aspect 27: A method of wireless communication for a network node, the method comprising: receiving, from an assisting node, an availability signal indicating an availability of the assisting node to assist the network node, wherein the availability signal includes an identifier of the assisting node; and transmitting a signal intended for a network entity toward the assisting node based on the availability of the assisting node.

Aspect 28: The method of aspect 27, wherein receiving the availability signal includes searching a set of preconfigured time-frequency resources for the availability signal.

Aspect 29: The method of aspect 27 or 28, wherein the assisting node is available to assist the network node if the availability signal is received.

Aspect 30: The method of any one of aspects 27 through 29, wherein the availability of the assisting node is indicated by information included in the availability signal.

Aspect 31: The method of aspect 30, wherein the information includes an availability parameter set to a first value when the assisting node is available to assist the network node or a second value when the assisting node is unavailable to assist the network node.

Aspect 32: The method of any one of aspects 27 through 31, wherein the transmitted signal is relayed to the network entity through the assisting node.

Aspect 33: The method of any one of aspects 27 through 32, further comprising: transmitting a request signal to the assisting node to receive assistance and/or information excluded from the availability signal.

Aspect 34: The method of aspect 33, wherein the request signal includes a message of a random access procedure.

Aspect 35: The method of any one of aspects 27 through 34, further comprising: transmitting a configuration signal including configuration information for the assisting node, the configuration information indicating at least one of a time domain division (TDD) configuration, a beam configuration, or a transmission power, wherein the configuration information enables the assisting node to relay the signal to the network entity.

Aspect 36: The method of any one of aspects 27 through 32, further comprising: transmitting a request signal to the assisting node, wherein the request signal requests the assisting node to initiate a procedure for establishing a connection with the network node.

Aspect 37: The method of aspect 36, further comprising: receiving a first message of a random access procedure in response to the request signal.

Aspect 38: The method of aspect 36, wherein the request signal includes at least one of: an identifier associated with the at least one network node, or configuration information associated with the at least one network node, wherein the configuration information enables the assisting node to establish a connection with the at least one network node.

Aspect 39: The method of aspect 36, wherein the request signal transmitted to a control node associated with the assisting node.

Aspect 40: The method of any one of aspects 27 through 32, further comprising: transmitting configuration information to a control node associated with the assisting node, wherein the configuration information enables the assisting node to establish a connection with the at least one network node; and establishing a connection with the assisting node.

Aspect 41: The method of any one of aspects 27 through 32, further comprising: transmitting configuration information to a control node associated with the assisting node, wherein the configuration information includes at least one of a time domain division (TDD) configuration, a beam configuration, or a transmission power, wherein the configuration information enables the assisting node to relay the signal to the network entity.

Aspect 42: The method of any one of aspects 27 through 32, further comprising: transmitting, to the assisting node, a command to transmit one or more off synchronization raster synchronization signal blocks (SSBs) in response to the availability signal; receiving, from at least one user equipment, a report including at least one measurement of the one or more off-sync raster SSBs; and transmitting, to the assisting node, a command to transmit one or more reference signals based on at least one of a configuration of the network node or an identifier of the network node when the at least one measurement is greater than or equal to a threshold.

Aspect 43: The method of any one of aspects 27 through 32, wherein the signal includes a request to transmit at least one reference signal, the request including an identifier (ID) of the assisting node and one or more wireless communication configurations of the assisting, the method further comprising: receiving, from the assisting node, the reference signal transmitted from a second network node; and communicating with the second network node through the assisting node.

Aspect 44: An apparatus for wireless communication, comprising: a memory; and at least one processor coupled to the memory and configured to perform a method of any one of aspects 27 through 43.

Aspect 45: An apparatus for wireless communication comprising at least one means for performing a method of any one of aspects 27 through 43.

Aspect 46: A computer-readable medium storing computer executable code, the code when executed by a processor cause the processor to perform a method of any one of aspects 27 through 43.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for an assisting node, where the assisting node is included in a wireless communication network to assist at least one network node, the method comprising:
   obtaining at least one of a set of preconfigured time-frequency resources for an availability signal or a set of transmission configurations for the availability signal;
   transmitting, from the assisting node, the availability signal to enable discovery of the assisting node and indicate an availability of the assisting node to assist the at least one network node, wherein the availability signal includes an identifier of the assisting node, and wherein the availability signal is transmitted based on the at least one of the set of preconfigured time-frequency resources or the set of transmission configurations; and
   relaying at least one wireless communication between the at least one network node and a network entity.

2. The method of claim 1, wherein the availability of the assisting node is indicated by information included in the availability signal, and wherein the information includes an availability parameter set to a first value when the assisting node is available to assist the at least one network node or a second value when the assisting node is unavailable to assist the at least one network node.

3. The method of claim 1, wherein the availability signal includes at least one of:
   information indicating whether the assisting node is already assisting a network node assigned to the assisting node,
   an identifier of the network node assigned to the assisting node,
   one or more wireless communication configurations of the assisting node or the network node assigned to the assisting node,
   a type of the assisting node or the network node assigned to the assisting node,
   one or more capabilities of the assisting node or the network node assigned to the assisting node,
   one or more beamforming configurations of the assisting node or the network node assigned to the assisting node,
   a power configuration of the assisting node or the network node assigned to the assisting node, or
   one or more resources to be used for communication with the assisting node.

4. The method of claim 1, further comprising:
   receiving a signal intended for a network entity from the at least one network node in response to the availability signal, wherein relaying the at least one wireless communication includes transmitting the signal intended for the network entity.

5. The method of claim 1, further comprising:
   receiving a signal from the at least one network node in response to the availability signal, wherein the signal indicates a request by the at least one network node to receive at least one of assistance or information excluded from the availability signal.

6. The method of claim 1, further comprising:
   receiving a first signal including configuration information, the configuration information indicating at least one of a time domain division (TDD) configuration, a beam configuration, or a transmission power; and
   receiving a second signal intended for a network entity from the at least one network node, wherein relaying the at least one wireless communication includes transmitting the second signal based on the configuration information.

7. The method of claim 1, further comprising:
   receiving a first signal transmitted from the at least one network node in response to the availability signal, wherein the first signal requests the assisting node to initiate a procedure for establishing a connection with the at least one network node.

8. The method of claim 7, further comprising:
   transmitting a second signal including a first message of a random access procedure in response to the first signal.

9. The method of claim 7, wherein the first signal includes at least one of:
   an identifier associated with the at least one network node, or
   configuration information associated with the at least one network node, wherein the configuration information enables the assisting node to establish a connection with the at least one network node.

10. The method of claim 7, further comprising:
    forwarding the received first signal to a control node of the assisting node;
    receiving one or more instructions from the control node; and
    performing the one or more instructions.

11. The method of claim 1, further comprising:
receiving configuration information from a control node associated with the assisting node, wherein the configuration information enables the assisting node to establish a connection with the at least one network node;
establishing a connection with the at least one network node based on the configuration information; and
receiving a signal intended for a network entity from the at least one network node, wherein relaying the at least one wireless communication includes transmitting the signal.

12. The method of claim 1, further comprising:
receiving configuration information from a control node associated with the assisting node, wherein the configuration information includes at least one of a time domain division (TDD) configuration, a beam configuration, or a transmission power;
receiving a signal intended for a network entity from the at least one network node, wherein relaying the at least one wireless communication includes transmitting the signal based on the configuration information.

13. The method of claim 1, further comprising:
receiving, from the at least one network node, a command to transmit one or more off-synchronization raster synchronization signal blocks (SSBs) in response to the availability signal;
transmitting the one or more off-synchronization raster SSBs;
receiving, from the at least one network node, a command to transmit one or more reference signals based on at least one of a configuration of the at least one network node or an identifier of the at least one network node, wherein the command is based on at least one measurement of the one or more off-synchronization raster SSBs; and
transmitting the one or more reference signals.

14. The method of claim 13, further comprising:
receiving the one or more reference signals from the at least one network node.

15. An apparatus for wireless communication, comprising:
a memory; and
at least one processor coupled to the memory and configured to:
obtain at least one of a set of preconfigured time-frequency resources for an availability signal or a set of transmission configurations for the availability signal;
transmit the availability signal to enable discovery of the apparatus and indicate an availability of the apparatus to assist the at least one network node, wherein the availability signal includes an identifier of the apparatus, and wherein the availability signal is transmitted based on the at least one of the set of preconfigured time-frequency resources or the set of transmission configurations; and
relay at least one wireless communication between the at least one base station and a network entity.

16. A method of wireless communication for a network node, the method comprising:
receiving, from an assisting node, an availability signal indicating an availability of the assisting node to assist the network node, wherein the availability signal includes an identifier of the assisting node, wherein the availability of the assisting node is indicated by information included in the availability signal, and wherein the information includes an availability parameter set to a first value when the assisting node is available to assist the network node or a second value when the assisting node is unavailable to assist the network node; and
transmitting a signal intended for a network entity toward the assisting node based on the availability of the assisting node.

17. The method of claim 16, wherein the assisting node is available to assist the network node if the availability signal is received.

18. The method of claim 16, wherein the transmitted signal is relayed to the network entity through the assisting node.

19. The method of claim 16, further comprising:
transmitting a request signal to the assisting node to receive assistance and/or information excluded from the availability signal.

20. The method of claim 16, further comprising:
transmitting a configuration signal including configuration information for the assisting node, the configuration information indicating at least one of a time domain division (TDD) configuration, a beam configuration, or a transmission power, wherein the configuration information enables the assisting node to relay the signal to the network entity.

21. The method of claim 16, further comprising:
transmitting a request signal to the assisting node, wherein the request signal requests the assisting node to initiate a procedure for establishing a connection with the network node.

22. The method of claim 21, further comprising:
receiving a first message of a random access procedure in response to the request signal.

23. The method of claim 16, further comprising:
transmitting configuration information to a control node associated with the assisting node, wherein the configuration information enables the assisting node to establish a connection with the at least one network node; and
establishing a connection with the assisting node.

24. The method of claim 16, further comprising:
transmitting configuration information to a control node associated with the assisting node, wherein the configuration information includes at least one of a time domain division (TDD) configuration, a beam configuration, or a transmission power,
wherein the configuration information enables the assisting node to relay the signal to the network entity.

25. The method of claim 16, further comprising:
transmitting, to the assisting node, a command to transmit one or more off-synchronization raster synchronization signal blocks (SSBs) in response to the availability signal;
receiving, from at least one user equipment, a report including at least one measurement of the one or more off-sync raster SSBs; and
transmitting, to the assisting node, a command to transmit one or more reference signals based on at least one of a configuration of the network node or an identifier of the network node when the at least one measurement is greater than or equal to a threshold.

26. The method of claim 16, wherein the signal includes a request to transmit at least one reference signal, the request including an identifier (ID) of the assisting node and one or more wireless communication configurations of the assisting, the method further comprising:

receiving, from the assisting node, the reference signal transmitted from a second network node; and communicating with the second network node through the assisting node.

27. An apparatus for wireless communication, comprising:
- a memory; and
- at least one processor coupled to the memory and configured to:
  - receive, from an assisting node, an availability signal indicating an availability of the assisting node to assist the network node, wherein the availability signal includes an identifier of the assisting node, wherein the availability of the assisting node is indicated by information included in the availability signal, and wherein the information includes an availability parameter set to a first value when the assisting node is available to assist the network node or a second value when the assisting node is unavailable to assist the network node; and
  - transmit a signal intended for a network entity toward the assisting node based on the availability of the assisting node.

* * * * *